US008309622B2

(12) United States Patent
Schmidt et al.

(10) Patent No.: US 8,309,622 B2
(45) Date of Patent: *Nov. 13, 2012

(54) ENHANCED OXYGEN-SCAVENGING POLYMERS, AND PACKAGING MADE THEREFROM

(75) Inventors: Steven L. Schmidt, Bedford, NH (US); Brian Lynch, Merrimack, NH (US); Keith Barker, Candia, NH (US); Ronald Adams, Sr., Goffstown, NH (US); Amit S. Agrawal, Merrimack, NH (US)

(73) Assignee: Graham Packaging PET Technologies Inc., York, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/349,069

(22) Filed: Jan. 12, 2012

(65) Prior Publication Data
US 2012/0183709 A1 Jul. 19, 2012

Related U.S. Application Data

(63) Continuation-in-part of application No. 09/169,439, filed on Oct. 9, 1998, now abandoned, and a continuation-in-part of application No. 09/018,217, filed on Feb. 3, 1998, now abandoned.

(51) Int. Cl.
B32B 27/34 (2006.01)
C08K 3/10 (2006.01)
(52) U.S. Cl. ....... 523/100; 524/435; 524/606; 428/35.7; 428/36.6
(58) Field of Classification Search ................ 428/35.7, 428/36.6; 523/100; 524/435, 606
See application file for complete search history.

(56) References Cited

U.S. PATENT DOCUMENTS

| | | |
|---|---|---|
| 3,586,514 A | 6/1971 | Vijibrie |
| 3,686,069 A | 8/1972 | Winkler et al. |
| 4,018,746 A | 4/1977 | Brinkmann et al. |
| 4,038,228 A | 7/1977 | Taylor |
| RE29,340 E | 8/1977 | Matsunami et al. |
| 4,048,361 A | 9/1977 | Valyi |
| 4,101,720 A | 7/1978 | Taylor et al. |
| 4,104,466 A | 8/1978 | Tsuchida et al. |
| 4,172,069 A | 10/1979 | Cordes et al. |
| 4,198,792 A | 4/1980 | Frosch et al. |
| 4,206,100 A | 6/1980 | Kyo et al. |
| 4,237,034 A | 12/1980 | Tomka et al. |
| 4,261,473 A | 4/1981 | Yamada et al. |
| 4,392,804 A | 7/1983 | Pushes et al. |
| 4,398,642 A | 8/1983 | Okudaira et al. |
| 4,401,805 A | 8/1983 | Weemes et al. |
| 4,500,668 A | 2/1985 | Shimizu et al. |
| 4,501,781 A | 2/1985 | Kushida et al. |
| 4,535,901 A | 8/1985 | Okudaira et al. |
| 4,567,227 A | 1/1986 | Kiss |
| 4,702,966 A | 10/1987 | Farrell et al. |
| 4,728,549 A | 3/1988 | Shimizu et al. |
| 4,800,129 A | 1/1989 | Deak et al. |
| 4,818,782 A | 4/1989 | Bissot |
| 4,908,272 A | 3/1990 | Harada et al. |
| 4,957,980 A | 9/1990 | Kobayashi et al. |
| 4,980,211 A | 12/1990 | Kushida et al. |
| 4,983,432 A | 1/1991 | Bissot |
| 5,021,515 A | 6/1991 | Cochran et al. |
| 5,028,226 A | 7/1991 | De'ath et al. |
| 5,028,462 A | 7/1991 | Matlack et al. |
| 5,034,252 A | 7/1991 | Nilsson et al. |
| 5,049,624 A | 9/1991 | Adams et al. |
| 5,068,136 A | 11/1991 | Yoshida et al. |
| 5,077,111 A | 12/1991 | Collette |
| 5,159,005 A | 10/1992 | Frandsen et al. |
| 5,194,478 A | 3/1993 | Frandsen et al. |
| 5,202,052 A | 4/1993 | Zenner et al. |
| 5,211,875 A | 5/1993 | Speer et al. |
| 5,239,016 A | 8/1993 | Cochran et al. |
| 5,246,753 A | 9/1993 | Koyama et al. |
| 5,281,360 A | 1/1994 | Hong et al. |
| 5,302,430 A | 4/1994 | Ardechir et al. |
| 5,310,497 A | 5/1994 | Ve Speer et al. |
| 5,314,987 A | 5/1994 | Kim et al. |
| 5,346,644 A | 9/1994 | Speer et al. |
| 5,350,622 A | 9/1994 | Speer et al. |
| 5,352,499 A | 10/1994 | Willard |

(Continued)

FOREIGN PATENT DOCUMENTS

AU 199934976 A1 12/1999

(Continued)

OTHER PUBLICATIONS

Derwent abstract 1987-226702 of RD 279004-A, Jul. 10, 1987.
Kayumova et al., Catalytic Properties of Polymers Containing Co(II) and Cu(II) in Liquid-Phase Oxidation of Ethyl Benzol, Kinetics and Catalysis, vol. XXV, No. 6, 1984.
Chemical Abstract, vol. 100, p. 60, Abstract No. 193165x, Published 1984.
Chemical Abstract, vol. 107, No. 10, p. 14, Abstract No. 78465C, published Sep. 7, 1987.
Chemical Abstract, vol. 118, No. 4, p. 42, Abstract No. 23225w, Published Jan. 25, 1993.
Chemical Abstract, vol. 91, p. 38, Abstract No. 58055s, Published 1979.

Primary Examiner — Vickey Nerangis
(74) Attorney, Agent, or Firm — Rissman Hendricks & Oliverio, LLP

(57) ABSTRACT

Oxygen-scavenging polymers and packaging for holding oxygen-sensitive products. A heat treatment process has been found to significantly increase the oxygen-scavenging performance of the polymer. The enhanced scavenging polymer can be effectively incorporated into various packaging, including transparent multilayer containers for beer and juice. In one embodiment, a multilayer package made from the scavenger provides an actual reduction in oxygen content of a contents of the package, over a long period of time (e.g., 24 weeks). The package can be stored unfilled for an extended period (without significant loss of scavenging capability) and will scavenge substantially immediately upon filling with a liquid product. The package may incorporate a relatively low weight percentage of the scavenger, thus providing enhanced scavenging in a cost-effective manner.

27 Claims, 24 Drawing Sheets

U.S. PATENT DOCUMENTS

| | | |
|---|---|---|
| 5,364,555 A | 11/1994 | Zenner et al. |
| 5,492,742 A | 2/1996 | Zenner et al. |
| 5,498,364 A | 3/1996 | Speer et al. |
| 5,506,014 A | 4/1996 | Minnick |
| 5,529,833 A | 6/1996 | Speer et al. |
| 5,539,078 A | 7/1996 | Burkett et al. |
| 5,576,415 A | 11/1996 | Tanaka |
| 5,627,239 A | 5/1997 | Ching et al. |
| 5,639,815 A | 6/1997 | Cochran et al. |
| 5,641,825 A | 6/1997 | Bacskai et al. |
| 5,660,761 A | 8/1997 | Katsumoto et al. |
| 5,700,554 A | 12/1997 | Speer et al. |
| 5,736,616 A | 4/1998 | Ching et al. |
| 5,759,653 A | 6/1998 | Collette et al. |
| 5,776,361 A | 7/1998 | Katsumoto et al. |
| 5,820,956 A | 10/1998 | Hatakeyama et al. |
| 5,866,649 A | 2/1999 | Hong et al. |
| 6,239,210 B1 | 5/2001 | Kim et al. |
| 6,365,247 B1 | 4/2002 | Cahill et al. |
| 8,097,662 B2 * | 1/2012 | Schmidt et al. ............... 523/100 |

FOREIGN PATENT DOCUMENTS

| | | |
|---|---|---|
| DE | 1933 997 | 2/1970 |
| DE | 15 70 609 B2 | 3/1970 |
| DE | 2341895 | 8/1973 |
| DE | 26 43 204 A1 | 4/1978 |
| EP | 083826 A1 | 7/1983 |
| EP | 174265 A2 | 3/1986 |
| EP | 186154 A2 | 7/1986 |
| EP | 0212339 A2 | 3/1987 |
| EP | 0288972 B1 | 11/1988 |
| EP | 0301719 A1 | 2/1989 |
| EP | 033520 A1 | 10/1989 |
| EP | 367835 A1 | 5/1990 |
| EP | 0380319 A1 | 8/1990 |
| EP | 0394751 A2 | 10/1990 |
| EP | 0451762 A2 | 10/1991 |
| EP | 0454437 A1 | 10/1991 |
| EP | 0507207 A2 | 10/1992 |
| EP | 0519616 A1 | 12/1992 |
| EP | 0520257 A2 | 12/1992 |
| EP | 0527902 B1 | 2/1993 |
| EP | 0527903 B1 | 2/1993 |
| FR | 1.522.109 | 4/1968 |
| GB | 1146157 | 3/1969 |
| GB | 1.469396 | 4/1977 |
| GB | 2119741 A | 11/1983 |
| GB | 2212102 A | 7/1989 |
| JP | 49-53945 | 9/1972 |
| JP | 48-20220 | 6/1973 |
| JP | 53-125460 | 1/1978 |
| JP | 57-185349 | 11/1982 |
| JP | 58-160344 | 9/1983 |
| JP | 58-197050 | 11/1983 |
| JP | 59-87132 | 5/1984 |
| JP | 1272660 A | 10/1989 |
| WO | WO90/00504 | 1/1990 |
| WO | WO90/00578 | 1/1990 |
| WO | WO94/09069 | 4/1994 |
| WO | WO96/18685 | 6/1996 |
| WO | WO96/18686 | 6/1996 |
| WO | WO98/13266 | 4/1998 |

* cited by examiner

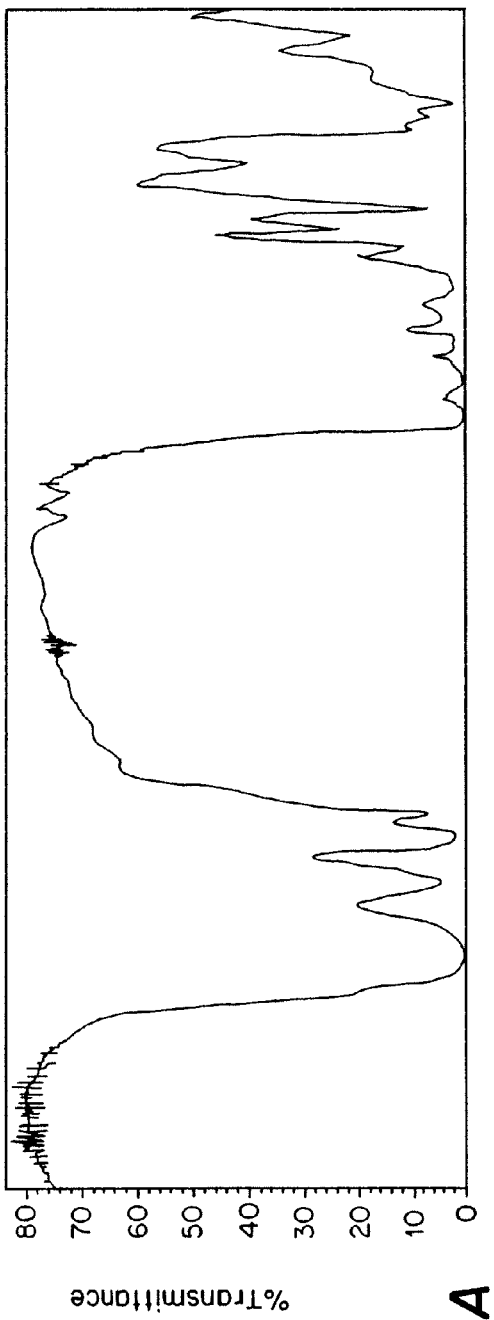
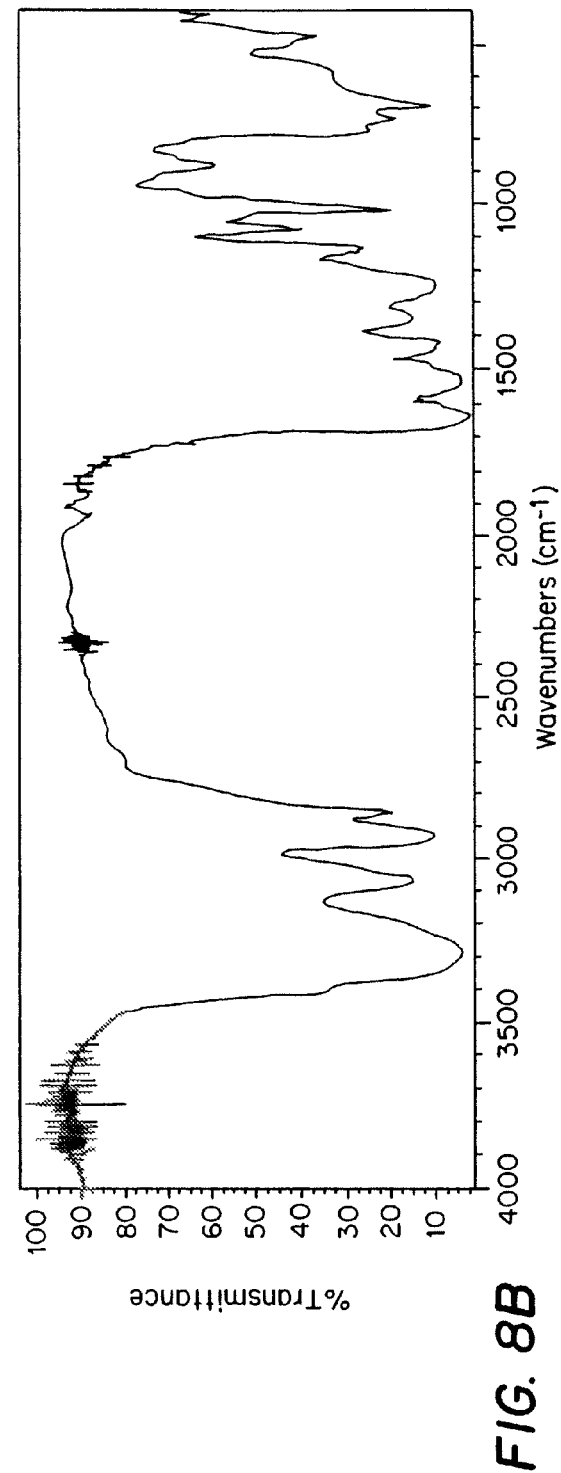
FIG. 8A
FIG. 8B

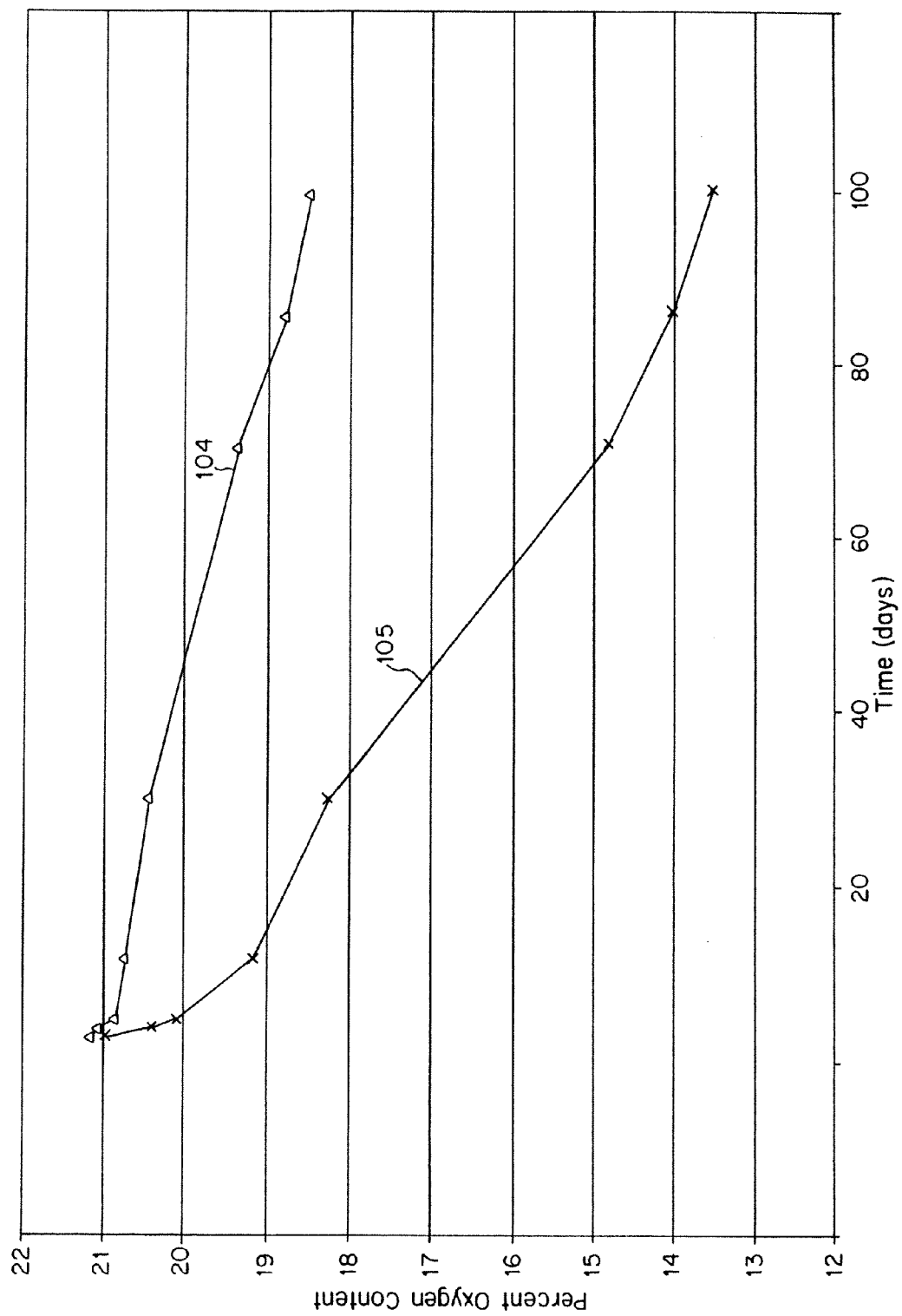

ENHANCED OXYGEN-SCAVENGING POLYMERS, AND PACKAGING MADE THEREFROM

PRIOR APPLICATIONS

This is a continuation-in-part of U.S. Ser. No. 09/169,439 filed Oct. 9, 1998 now abandoned, entitled "Enhanced Oxygen-Scavenging Polymers, And Packaging Made Therefrom", and of U.S. Ser. No. 09/018,217 filed Feb. 3, 1998 now abandoned entitled "Solid-Stating Method For Increasing Oxygen-Scavenging Rate of Polymers, And Packaging Made From Such Polymers", both by S. Schmidt et al., and from which priority is claimed and which are hereby incorporated by reference in their entirety.

FIELD OF THE INVENTION

The present invention is directed to enhanced oxygen-scavenging polymers and packaging for holding oxygen-sensitive products, and in particular embodiments to multi-layer articles incorporating such polymers which are transparent and utilize a relatively low weight percent (cost-effective) amount of the enhanced scavenging polymer.

BACKGROUND OF THE INVENTION

Plastic packaging has certain inherent benefits over glass and metal packaging, such as light weightability, increased variability in package design, non-breakability, and reduced cost. However, plastic packaging may have greater permeability to certain gases (oxygen and carbon dioxide) and liquids (water) than glass or metal; these gases/liquids permeate the plastic and reduce the shelf life of the product contained therein. Various specialty polymers and layer structures have been developed which provide a commercially-acceptable shelf life for some oxygen-sensitive products, such as juice and ketchup.

There are two general types of oxygen-barrier materials—passive and active. A "passive" barrier retards oxygen permeation into the package. For example, with multi-layer technology it is possible to incorporate thin layers of expensive barrier polymers (e.g., polyvinylidene chloride copolymer (PVDC) or ethylene vinyl alcohol copolymer (EVOH)), in combination with structural layers of bottle-grade plastic resins (e.g., polyethylene terephthalate (PET)), to provide a cost-effective barrier package.

In an "active" barrier package, an oxygen "scavenger" is incorporated into a single or multi-layer plastic structure to theoretically remove the oxygen initially present and/or generated from the inside of the package, as well as to retard the passage of exterior oxygen into the package. Thus, oxygen-scavengers are superior to passive barriers in that they both remove oxygen from inside the package and retard its ingress into the package. However, the performance of the prior active barrier packages is reported in terms of an overall ingress such that the oxygen content continues to increase over time, albeit at a slower rate of increase than with some passive barriers.

Commercially successful hot-fill juice containers (passive barrier) have been developed by Continental PET Technologies, Inc. of Florence, Ky., which provide a 1.5 to 4-time improvement in oxygen barrier property over a standard commercial single-layer PET container. These multi-layer juice containers include two very thin intermediate barrier layers of EVOH positioned between inner and outer layers of virgin PET, and a core layer of either virgin or recycled PET. However, there are products even more "oxygen sensitive" than juice—e.g., beer. The taste of beer deteriorates rapidly in the presence of oxygen and thus beer requires at least a 10-times greater oxygen barrier property than provided by the standard single-layer PET container. Furthermore, beer's oxygen sensitivity is enhanced by increased temperature, i.e., exposure to heat during storage has a multiplicative impact on oxygen's adverse effect on taste. For example, if beer is refrigerated during storage and the amount of oxygen is maintained below a specified parts-per-billion (ppb), a given container may have a shelf life of 4-6 weeks (28-42 days). However, if the same beer container is not refrigerated, then the shelf life may be reduced to 1-2 weeks (7-14 days).

One possible solution for highly oxygen-sensitive products is to utilize higher barrier polymers in packaging. For example, polyethylene naphthalate (PEN) has a 5-time improvement in oxygen barrier property over polyethylene terephthalate (PET). Also, PEN has a significantly higher glass transition temperature ($T_g$) than (PET)—about 120° C. compared to 80° C.—and thus PEN is also desirable for use in thermal-resistant (e.g., pasteurizable) beer containers. However, PEN is more expensive than PET (both as a material and in processing costs), and thus the improvement in properties must be balanced against the increased expense. Also, the increase in passive barrier protection with PEN does not solve the problem of residual oxygen within the package.

One method of achieving a package that is lower in cost than PEN, but with higher barrier and thermal properties, is to provide a blend of PEN and PET. However, blending of these two polymers generally results in an opaque material (incompatible phases). Efforts to produce a clear (transparent) container or film from a PEN/PET blend, and maintain strain hardening (for structural strength) have been ongoing for over ten years but there is still no commercial process in widespread use for producing such articles.

Another possible solution, on which extensive work has been reported, is the use of alleged metal-activated oxidizable organic polymers (e.g., polyamides) as oxygen-scavengers in plastic containers. However, problems again exist with: lack of clarity; time/expense required to activate the scavenging polymer; toxicity of the metal; need to prevent interaction of oxidative reaction byproducts with the package contents and/or environment; and loss of the oxygen-scavenging effect during storage (prior to filling). For example, U.S. Pat. No. 5,034,252 to Nilsson suggests a single-layer container wall consisting of a blend of PET, 1-7% by weight polyamide (e.g., MXD-6 nylon), and 50-1000 ppm (parts-per-million) of a transition metal (e.g., cobalt). Nilsson theorizes that cobalt forms an active metal complex having the capacity to bond with oxygen and to coordinate to the groups or atoms of the polymer. However, Nilsson notes that low-oxygen permeability coefficients are achieved only after an aging (activation) process, which may require exposure of the preform/container to a combination of temperature and humidity. U.S. Pat. No. 5,021,515 to Cochran generally describes the use of a PET/polyamide blend with cobalt. It suggests a multi-layer structure formed by coextrusion lamination using adhesive tie layers, wherein inner and outer layers prevent interaction of a central scavenging layer (containing cobalt) with the package contents and environment. However, Cochran similarly notes the aging effect.

A significant problem with blending polyesters (such as PET) and polyamides (such as MXD-6 nylon) is loss of clarity. Most food manufacturers require the transparency of a PET container, and will not accept a loss of transparency in order to achieve a desired oxygen-barrier property.

Thus, the prior art containers typically suffer from one or more of the following difficulties:

(a) lack of transparency;
(b) inability to process the polymers on commercial injection molding equipment;
(c) only marginal improvement in oxygen-scavenging performance over monolayer PET bottles or multilayer PET/EVOH bottles;
(d) aging or activation requirement to induce oxygen-scavenging performance;
(e) high cost and/or toxicity.

One reference discloses that under test conditions designed to approximate the actual conditions in beverage applications, the scavenging performance of a plastic container having a scavenging polyamide was "comparable" to a glass bottle (see for example, the PET/polyamide blend of U.S. Pat. No. 5,021,515, example 8). In reality, plastic containers having a performance only comparable to glass do not provide a significant incentive for beer producers to give up their substantial investment in glass container bottling operations. Still further, the same blend art states that with increasing concentrations of the metal, the oxygen-scavenging performance actually decreases. Again, this would discourage one from believing that oxidizable polymers (such as polyamide) could provide a commercial container which satisfied the stringent low-oxygen requirements for beer.

The variety of oxygen-barrier systems disclosed in the art is strong evidence of the commercial need for such packaging, and also that the known systems have not solved many of the problems. Thus, there is an ongoing need for oxygen-scavenging polymers having enhanced scavenging capacity and for a process to manufacture transparent articles from such polymers in a cost-effective manner.

SUMMARY OF THE INVENTION

In one embodiment, the present invention is based on a surprising discovery that a certain heat treatment of a scavenging polymer can result in a very significant increase in the oxygen-scavenging performance and furthermore that this enhanced scavenging polymer can be effectively incorporated in a transparent multi-layer container. This new package provides a number of features which prior art packages have been unable to achieve. First (in select embodiments), it enables production of a transparent biaxially-oriented container sidewall when blow-molded (to produce strain orientation) with adjacent layers of aromatic polyesters, such as polyethylene terephthalate (PET). Without transparency, the container would not be commercially acceptable. Secondly (in select embodiments), the container actually provides a reduction in oxygen content of a liquid in the container over an extended period of time, i.e., exceeding 16 weeks. Such performance is quantitatively superior to that of a glass container, which shows a steadily increasing oxygen content of the liquid over time. This net reduction in oxygen content is achievable even when starting with very low initial oxygen concentrations, such as 200 ppb or less. Thirdly (in select embodiments), the new container does not have a significant aging or activation requirement—rather it has a high level of scavenging almost immediately upon filling, which overcomes the prior art requirement of an activation or aging process. Also, it can be stored empty (prior to filling) for extended periods without depletion of scavenging. Fourthly (in select embodiments), the new container incorporates a relatively low weight percentage of the scavenging layer which is helpful in maintaining transparency and in providing a cost-effective container, i.e., utilizing relatively low amounts of the more expensive scavenger material.

Thus, according to one preferred embodiment, a transparent multilayer blow-molded container or sidewall of the container is formed from a multilayer injection-molded preform. The preform/container has a five-layer structure including inner, outer and core structural layers of a polymer, e.g., an aromatic polyester such as PET, and inner and outer intermediate layers of an enhanced oxygen scavenger disposed between the inner, core and outer layers respectively. The container includes a biaxially-expanded sidewall portion in which the PET layers have undergone strain orientation and crystallization for strength. The scavenger layers can be processed at temperatures and stretch ratios suitable for orienting the PET layers, without the scavenger or PET undergoing excessive crystallization which would render the sidewall opaque. The amount of metal in the scavenging layer can be adjusted to enhance the scavenging rate. A preferred amount of the metal is at least 200 ppm based on the scavenging layer, more preferably from 200 to 2000 ppm, more preferably from 300 to 1000 ppm, and still more preferably from 400 to 800 ppm. Optimizing the metal concentration and wall thickness of the scavenging layer(s) and PET in the biaxially-oriented sidewall will enhance the overall scavenging performance of the container.

Surprisingly it was found that the above five-layer structure enables extraction of oxygen from a liquid product, even at initially low levels of oxygen content, resulting in a reduction in oxygen content over time. This is qualitatively different from what occurs in a container that merely slows down a rate of oxygen transmission from an area of higher concentration (i.e., ambient air outside the container having an oxygen concentration of 21%) to an area of lower concentration (i.e., inside the container where the oxygen content is much lower, e.g., 8000 to 9000 ppb dissolved oxygen in water or juice, or 200 ppb dissolved oxygen in beer). In the present invention, the relatively low level of oxygen initially present in the product is actually being removed from the liquid, causing a reduction in the oxygen content. By "reduction" it is meant that more oxygen is leaving the liquid/container than entering the liquid/container.

The prior art fails to teach or suggest this ability to extract oxygen at low concentrations. In contrast, the prior art defines the scavenging performance of a plastic container containing polyamide/metal based on a reduced oxygen transmission rate from the exterior to the interior of the container—i.e., based on an expected flow from an area of higher concentration to one of lower concentration (see U.S. Pat. No. 5,021,515, col. 3). This discussion in the prior art of transmission from the exterior to the interior of the container is however consistent with the performance of a glass container, wherein the prior art found the plastic container to have a performance "comparable" to that of a glass container.

Furthermore, in certain applications it has now been found that adjusting the intrinsic viscosity (IV) and/or melt viscosity of the scavenging material will assist in providing a desired material distribution or wall thickness of the scavenger in a multi-layer structure. Generally, the intrinsic viscosity and/or melt viscosity can be correlated with a melt index for the polymer, e.g., the melt index defined by ASTM D1238-94a. In providing a melt index of the scavenger compatible with a melt index of an adjacent structural layer, one can increase the amount of scavenger material which ends up for example in a relatively thin sidewall portion of a multi-layer container, as opposed to a thicker neck finish portion (where less or no scavenging is required). For example, using a low IV scavenger, more scavenger may end up in the neck finish, as opposed to the sidewall. Adding a metal (such as cobalt) may reduce the IV or melt viscosity of a scavenging polymer, such as a polyamide, thus further aggravating the problem of insufficient scavenger in the sidewall. Although it may be possible to increase the thickness of the scavenger layer by increasing the total amount of scavenger material, this produces an increase in cost and, in certain instances, a relatively greater percentage of the scavenger material ending up in the neck finish where it may not be required.

Thus, the thickness of the scavenger layer in the sidewall-forming portion of an injection-molded article (preform) may be increased by adjusting the melt index of the scavenger material. This greater thickness of scavenger does not lead to problems of delamination, as may occur with prior art barrier materials such as EVOH, because the polyamide adheres better to adjacent PET layers. Also, by increasing the amount of scavenger in the sidewall (as compared to the neck finish), other problems can be avoided, such as delamination in the finish during blowing, and sealing defects (i.e., breakthrough of the inner polyamide layer at the top sealing surface of the container which interferes with the formation of a tight seal between a foil liner and the top sealing surface of the container). Still further, there is the economic benefit of providing relatively more scavenger material at the location of greatest need, i.e., in the thinnest section of the container.

Thus, the following aspects of the invention may be used independently or in various combinations to provide an enhanced oxygen-scavenging composition or article.

In one aspect, a heat treatment under reduced pressure conditions is provided which is described herein as "solid stating". This solid-stating process increases the oxygen-scavenging capability of a polymer, such as a polymer having a repeat unit including a carbonyl.

In another aspect of the invention, a scavenger layer is provided which is melt-compatible with an adjacent structural polymer layer. This may be used to achieve a substantially uniform thickness of the scavenger layer throughout an article or in a particular portion of an article.

According to a further aspect of the invention, a package is provided which enables immediate scavenging when filled with a product. This avoids the problems of the prior art with aging and activation. According to one embodiment, a multi-layer package is provided having an oxygen-scavenging layer consisting essentially of a polymer and a metal, the polymer having a repeat unit including a carbonyl and at least one hydrogen atom alpha to the carbonyl, a structural layer between the oxygen-scavenging layer and an aqueous-containing liquid product in the package, and wherein upon filling of the package with the product the water in the product permeates the structural and oxygen-scavenging layers and the oxygen content of the liquid product is reduced.

In another aspect a package for an aqueous liquid is provided wherein the package has a wall comprising an oxygen-scavenging polymeric composition, a thickness of the wall adapted to achieve oxygen removal from the liquid.

In another aspect, a multi-layer package is provided for enclosing an aqueous liquid having an oxygen content, the package comprising at least one oxygen-scavenging layer comprising a polyamide and cobalt in an amount of at least 200 ppm in the polyamide and wherein the package enclosing the liquid has an oxygen-removal rate greater than an oxygen-removal rate of a dry package.

In another aspect, an oxygen-scavenging layer comprises a polyamide and cobalt in an amount of at least 200 ppm in the polyamide, and a structural polymer layer is positioned adjacent the oxygen-scavenging layer, wherein the structural layer is permeable to water.

According to one aspect, a method of removing oxygen from an aqueous liquid having an oxygen content is provided which includes the steps of providing a package having a wall comprising at least one oxygen-scavenging layer comprising a polymeric composition, and selecting a thickness of the wall to achieve a reduction in the oxygen content of the liquid.

In another aspect, a method of reducing an oxygen content of a liquid in a multilayer container is provided which includes the steps of providing a transparent sidewall portion of the container, the sidewall portion including an oxygen-scavenging layer of a polyamide and cobalt in an amount of at least 200 ppm and a structural polymer layer positioned between the scavenging layer and the liquid, and allowing a component of the liquid to permeate the structural layer to contact the scavenging layer and cause a reduction in oxygen content of the liquid.

According to another aspect, a method of enhancing the oxygen-scavenging capability of an oxygen-scavenging composition is provided comprising solid-stating a polyamide, and adding cobalt to the polyamide in an amount of at least 200 ppm in the polyamide.

In another aspect, a method of reducing the oxygen content of a volume of a liquid comprises providing a sealed multi-layer container containing a volume of liquid, the container comprising at least one oxygen-scavenging layer, the at least one oxygen-scavenging layer comprising a polymer and cobalt, the polymer having a repeat unit including a carbonyl and at least one hydrogen atom alpha to the carbonyl, the cobalt being present in an amount of at least 200 ppm in the layer, and at least one structural polymer layer positioned between the at least one oxygen-scavenging layer and the volume of the liquid, wherein the oxygen content of the volume of the liquid in the sealed multi-layer container is maintained for a period of time below the oxygen content of a same volume of the liquid stored in a sealed glass container for the same period of time.

In another aspect a method for reducing a melt index of a polyamide comprises adding a metal to the polyamide to achieve the reduced melt index, and forming the polyamide in a layer structure with other polymers.

In another aspect, a method of making a multi-layer oxygen-scavenging article comprises providing a layer of an oxygen scavenger including a polyamide and a metal, and a layer of a structural polymer, and adjusting a melt index of the scavenger compatible with a melt index of the structural polymer.

In another aspect, a method for making a transparent multi-layer article having an oxygen-scavenging layer comprises heating a polyamide under a low oxygen content atmosphere to increase the oxygen-scavenging performance of the polyamide with a given metal content by a factor of at least 1.3, and forming the multi-layer article including at least one oxygen-scavenging layer formed of the polyamide and metal.

In another aspect, an injection-molded multi-layer preform is provided for making a multi-layer oxygen-scavenging container having a transparent sidewall, the preform comprises a neck finish, a sidewall-forming portion and a base-forming portion, the sidewall-forming portion having at least one layer of an oxygen scavenger comprising a polyamide and cobalt in an amount of at least 200 ppm in the polymer, and the preform having a substantially uniform thickness of the scavenging layer in the sidewall-forming portion.

In another aspect, a method is provided for making an injection-molded preform for a multi-layer oxygen-scavenging container having a transparent sidewall, wherein the preform includes a sidewall-forming portion having at least one oxygen-scavenging layer including a polyamide and cobalt to provide the scavenging function, the method including adjusting a melt index of the polyamide to provide a substantially uniform scavenging layer in the sidewall-forming portion of the preform.

In another aspect, a method is provided for enhancing the oxygen-scavenging performance of a polyamide, the method comprising heating the polyamide, and wherein a plaque formed of the heat-treated polyamide has a greater oxygen-removal rate when exposed to moisture than when not exposed to moisture.

In another aspect, a transparent multilayer bottle is provided for packaging an aqueous liquid containing oxygen, the bottle having a wall comprising an inner layer or layers of an oxygen-scavenging composition having an activity on a wet plaque test of reducing an oxygen content from 21% to 19% or less in 54 days.

In another aspect, a composition for use as an oxygen scavenger is provided which comprises a xylidene-substituted polyamide which has been treated so that the ratio of wet to dry plaque tests when the polyamide is mixed with 500 ppm of cobalt is greater then 2:1, and more preferably 3:1.

In another aspect, a transparent multilayer bottle is provided for packaging an aqueous liquid containing oxygen, the bottle comprising an inner layer or layers of an oxygen-scavenging composition and the inner layer or layers being between outer layers of a structural polymer or polymers and wherein the oxygen-scavenging performance as measured on the aqueous liquid filled bottle is greater then the scavenging rate measured on the unfilled bottle.

One further aspect is a xylidene-substituted polyamide for use as an oxygen scavenger which has been treated under solid-stating conditions and mixed with from 250 to 850 ppm of cobalt.

Another aspect is a transparent multilayer bottle for beer comprising two inner layers of a xylidene-substituted polyamide and 250 to 850 ppm of cobalt, and a core layer and two outer layers of biaxially-oriented PET, where the thicknesses of each of the polyamide layers is in the range of 0.00254-0.0254 mm and each core and each outer layer is in the range of 0.0254 to 0.0508 mm, and the polyamide has been treated under solid-stating conditions.

Yet another aspect is a container for enclosing an aqueous liquid, the container having a wall comprising at least one layer of a solid-stated polymer having a repeat unit containing a carbonyl, the polymer containing at least 200 ppm of a transition metal.

Yet another aspect is a container for enclosing an aqueous liquid, the container having a wall comprising at least one layer of a solid-stated polymer having a repeat unit containing a carbonyl, wherein the wall has a haze of less than 10%.

Yet another aspect is a container for enclosing an aqueous liquid, the container having a wall comprising at least one layer of a polymer having a repeat unit containing a carbonyl, the polymer containing at least 200 ppm of a transition metal, wherein the wall has a haze of less than 10%.

Yet another aspect is a container for enclosing an aqueous liquid, the container having a wall comprising at least one layer of a solid-stated polymer having a repeat unit containing a carbonyl, the polymer containing at least 200 ppm of a transition metal, wherein the wall has a haze of less than 10%.

These and other features of the present invention will be more particularly understood with regard to the following detailed description and drawings.

BRIEF DESCRIPTION OF THE FIGURES

FIGS. 8A and 8B are two graphs of percent transmittance (ordinate) versus wavenumbers in $cm^{-1}$ (abscissa) showing a substantial similarity in transmittance between MXD-6 which has not been solid-stated (8A), and enhanced MXD-6 which has been solid-stated for 60 hours (8B);

FIGS. 15A-15D are graphs of percent oxygen content (ordinate) versus time in days (ordinate) for various injection-molded plaque samples made from polyamide and cobalt, with and without solid-stating;

DETAILED DESCRIPTION

Figure 1:
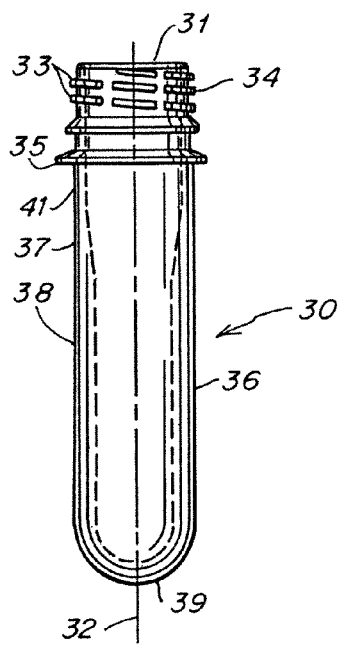
FIG. 1 is a side elevational view of a multi-layer preform incorporating two layers of an enhanced scavenging polymer according to one embodiment of the present invention.

The present invention relates in various aspects to enhanced oxygen-scavenging materials, a solid-stating process for enhancing the oxygen-scavenging rate of such materials, and plastic containers that incorporate such materials whereby an actual reduction in the enclosed oxygen content is achieved.

With prior art glass containers, because glass is effectively impermeable to oxygen, any oxygen ingress is believed to occur through the interface been the glass container and the lid or cap. The rate of oxygen ingress due to cap leakage in a glass beverage container is believed to be about 2.1 ppb $O_2$ per day (see FIG. 5).

Because polymers that are completely impermeable to oxygen are largely unknown, some oxygen will always enter a plastic container through the polymer wall, causing an increase in the oxygen concentration within the container over time. The rate of increase is related to the oxygen barrier property of the polymer. In the prior art, improvements in performance with either active or passive barrier polymers are reported in terms of an overall increase in oxygen content over time.

According to a preferred embodiment, one advantageous feature of the present invention over prior art oxygen-scavenging materials is that packages made from the enhanced scavenger of the present invention are actually capable of removing oxygen from the inside of the package faster than external oxygen is allowed to enter the package. Thus, "oxygen-scavenging" as now defined herein refers to any process by which oxygen is "removed" from an enclosed environment. For example, oxygen-scavenging results in a reduction of oxygen in a closed package. A material capable of oxygen-scavenging, i.e., an "oxygen-scavenger", can remove oxygen from the defined environment chemically and/or by physical absorption. Chemical removal of oxygen molecules can occur by oxidation of the scavenger (e.g., forming a chemical bond between at least one oxygen atom of the oxygen molecule and a molecule of the scavenger). Physical removal of oxygen typically refers to a physical absorption by the scavenger, for example, where the oxygen molecules are physically entrapped within the scavenger itself.

An "enclosed oxygen content" refers to an amount of oxygen present in a sealed package, e.g., container. In some applications, e.g., for storing an oxygen-sensitive solid product, the relevant enclosed oxygen content may be the oxygen concentration of the atmosphere within the container. In other applications, e.g., where the container is used for storing a liquid, the relevant enclosed oxygen content may be the oxygen concentration of the liquid. The oxygen enclosed within a container can depend on factors other than transmission through a plastic wall. For example, there can be leakage through the connection between the cap and bottle. Generally it is desirable to minimize any such leakage by selection of a specific bottle and cap pair. For example, an "Alcoa aluminum cap" having a non-reactive lining (i.e., compatible with the composition of the bottle) is widely used to minimize leakage of oxygen into plastic containers (available from Silgan Containers Mfg. Corp., 1701 Williamsburg Pike, Richmond, Ind., USA, product R034831, liner EVA300, 28 mm rolled on pilfer-proof cap).

In one embodiment, a package is provided for an aqueous liquid product, the package having a wall including an oxygen-scavenging polymeric composition such that an enclosed oxygen content is reduced. "Aqueous liquid" refers to any liquid having a substantial concentration of water. Examples of aqueous liquids include juice, tomato sauce, soy sauce, and an alcoholic beverage that contains a significant portion of water, e.g., beer, wine or other liquor.

A "wall" comprises a single layer or multiple layers (multilayer) and the thickness of the wall is the thickness of the single layer or a total thickness of the multiple layers. In one embodiment, the wall comprises a multi-layer which includes at least one oxygen-scavenging layer. Preferably each layer in the multi-layer comprises a polymer and the multi-layer article is injection-molded. In a preferred embodiment, the oxygen-scavenging layer is an internal layer between exterior structural polymer layers. The structural layers provide niechanical strength and in preferred embodiments act as an "oxygen barrier" to limit the transmission of oxygen through the container, at least from the exterior.

Exposing the oxygen-scavenging layer to air may cause degradation and/or depletion of the oxygen-scavenger. By embedding the scavenger between oxygen-barrier layers, the barrier can serve to prevent a significant amount of oxygen from contacting the oxygen-scavenger, at least prior to filling the container with the intended product. Once filled, interior oxygen can permeate through the inner structural layer(s) and be removed by the scavenger.

Solid-Stating Process

As used herein, "solid-stating" refers to a process where a polymer is exposed to heat under an atmosphere having a low oxygen content (i.e., an oxygen content less than that of air) in order to enhance the oxygen removal rate (hereinafter referred to as "oxygen scavenging performance") of the polymer. The solid-stating process should preferably enhance the oxygen-scavenging performance of the polyamide by a factor of 1.3 for a given metal content and a given period of time. During solid stating, a low oxygen-content atmosphere can be provided by flushing the environment around the polymer with an inert gas, or by subjecting the polymer to reduced pressure conditions (e.g., by subjecting the polymer to a vacuum). Because the polymer is exposed to heat during the solid-stating process, the presence of excess oxygen may cause the polymer to undergo oxidation reactions. These oxidation reactions may result in thermal degradation of the polymer and this degradation may be observed as a discoloration of the polymer. Thus, performing the solid-stating process under a low oxygen-content atmosphere can reduce the amount of polymer degradation by reducing the extent of oxidation. In addition, the polymer can be heated at a higher temperature when in a low oxygen-content atmosphere, which can provide a greater rate of enhancement of the oxygen-scavenging performance. Preferably, the low oxygen content environment is no greater than 10% oxygen.

In one embodiment, the solid-stating process involves heating the polymer to a temperature greater than the glass transition temperature of the polymer and less than the melting point temperature of the polymer. Where the polymer is a crystalline aromatic polyamide (such as MXD-6), the solid-stating process involves heating the polyamide to a temperature from 150° C. to 210° C. In one embodiment, the upper temperature for the solid-stating process is a temperature at which the polymer begins to coagulate or form lumps. For example, it has been found that MXD-6 may coagulate at a temperature of 210° C. In another embodiment, the upper temperature for the solid-stating process is a temperature at which the polymer starts to decompose.

In one embodiment, the solid-stating process involves heating the polymer in an inert gas such as argon or nitrogen. In another embodiment, the polymer can be heated under a vacuum comprising a pressure of no greater than 15 torr, preferably a pressure of no greater than 10 torr, more preferably a pressure of no greater than 1 torr, and even more preferably a pressure of no greater than 0.1 torr.

In one embodiment, the solid-stating process occurs over a time period of at least 4 hours (h), preferably at least 8 h, more preferably at least 24 h, and still more preferably at least 48 h.

Other processes can be used to treat the polymer in combination with the solid-stating process. For example, prior to solid-stating, the polymer can be air dried or vacuum dried or both. Air drying typically involves flushing the polymer with air. Vacuum drying involves subjecting the polymer to a vacuum. The vacuum drying can be accompanied by a mild heating process where the polymer is heated to a temperature of less than the glass transition temperature. For example, a polyamide can be vacuum dried in a temperature range of 50° C. to 150° C.

It is understood that the solid-stating conditions can depend on a combination of factors such as temperature, time and a particular pressure to achieve a desired oxygen-scavenging performance. For example, with a polymer such as MXD6, solid-stating at 0.1 torr for 6 hours at 205° C. can provide a scavenger with moderately enhanced scavenger capabilities. Alternatively, moderately enhanced scavenging performance can also be obtained by solid-stating MXD-6 at 0.1 torr for 48 hours at 150° C. (a combination of lower temperature but longer time). Various factors such as cost, equipment, etc., may dictate which parameters should be minimized (e.g., solid-stating time, temperature, or oxygen-scavenging performance) and accordingly, the appropriate solid-stating parameters can be determined to achieve the desired results.

The solid-stating method can provide several advantages. In one embodiment, solid-stating results in the polymer having a higher crystalline form. "Crystalline form," as used herein refers to a state where substantial portions of the polymer have atoms arranged in a regular, ordered array, as understood by those of ordinary skill in the art. Typically, a polymer in a crystalline form has a higher melting temperature than an amorphous polymer, and this higher melting temperature allows the polymer to be solid-stated at a higher temperature, where higher temperature solid-stating processes can provide an even greater enhancement of the oxygen-scavenging performance. When the polymer is an amorphous polymer, the crystalline form can be induced prior to solid-stating by heating; this pre-solid-stating heating step may also be performed under a vacuum.

Other advantages of the solid-stating process may involve purifying the oxygen-scavenging polymer by removing volatile compounds, such as water or organic compounds, that were initially present in the polymer.

The Metal

The enhanced oxygen-scavenging performance of certain polymers depends on the presence of a metal (although the metal need not be present during solid stating). The metal can be added in the form of the metal itself, as a salt or as a metal compound. In a preferred embodiment, the oxygen-scavenger comprises a polymer and a metal where the metal is added as a metal compound. Metal compounds typically comprise two components: a metal and a ligand which bonds to the metal and generally a substantial portion of the ligand is organic.

In one embodiment, the metal can be added to the polymer as a liquid, a solution mixture, in a crystalline form, as a pastille, or as a powder depending on factors such as processing conditions. Typically, the metal is mixed with the polymer to create a physical blend. The oxygen-scavenger, however, can eventually comprise a chemical bond between the metal and the scavenger or the ligand of the metal compound and the scavenger where a chemical reaction occurs in the physical blend of the metal compound and the scavenging polymer. In other words, once the metal compound is processed with a polymer, the metal compound can be present in the oxygen-scavenging polymer as the same initial metal compound, a new metal compound, a salt or a metal atom. A new metal compound can occur where at least a portion of the ligand no longer forms a chemical bond with the metal and a new ligand bonds to the metal. The new ligand can be the oxygen-scavenging polymer, or any other components such as water, or any other organic component such as an organic component that results as a by-product of scavenging polymer degradation. Preferably, the initial metal compound is available in a stable form, i.e., the metal compound is unreactive towards oxygen before addition of the compound to the oxygen-scavenging polymer.

Figure 20:
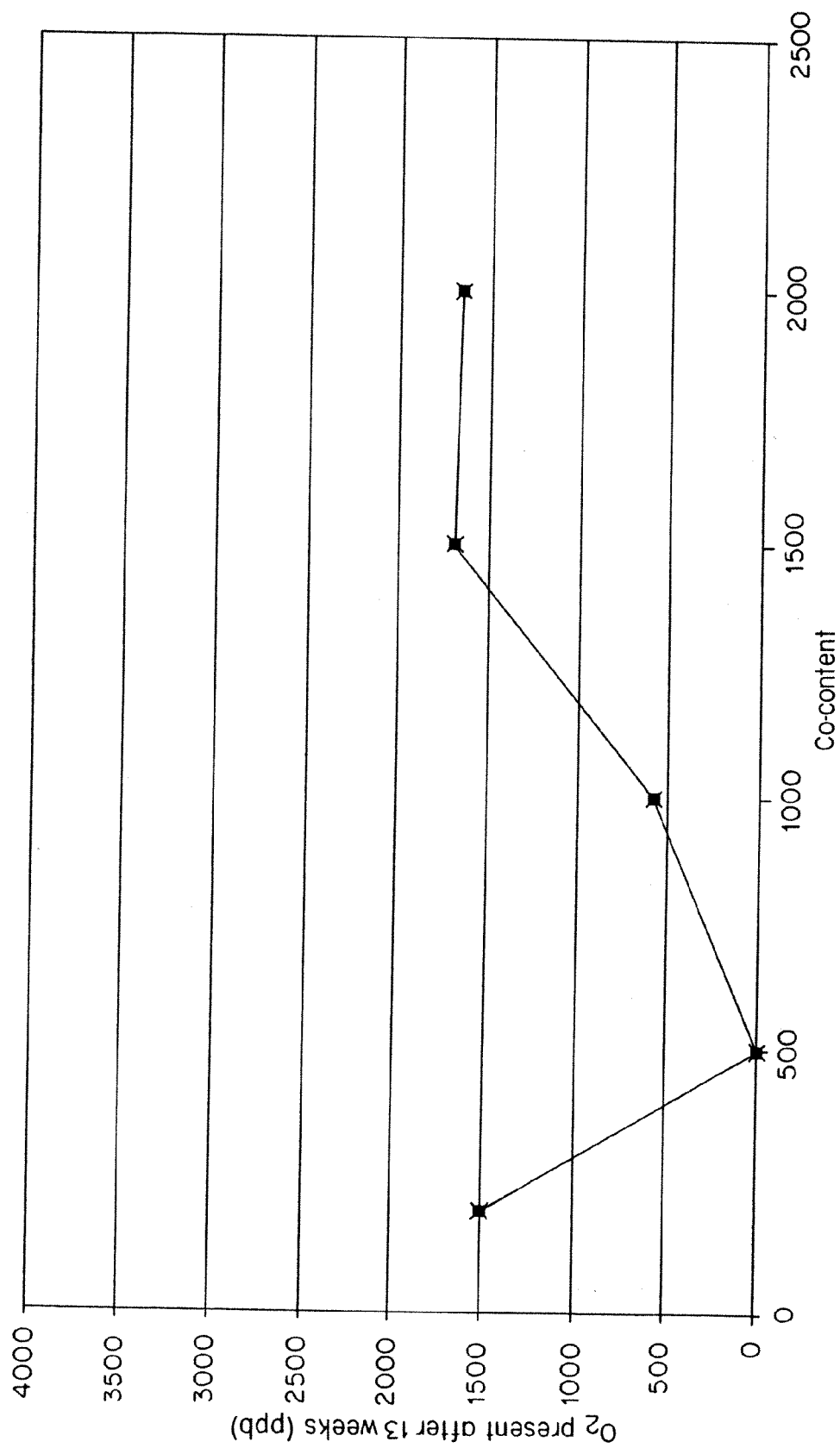
FIG. 20 is a graph showing the effect of cobalt concentration on oxygen content for 5-layer bottles made according to the present invention.

The amount of metal present in the polymer is defined relative to the amount by weight in the polymer. It is understood that the desired metal concentration can depend on a variety of factors or a combination of these factors such as molecular weight of the metal, molecular weight of the entire metal compound, polymer type or molecular weight of the polymer. In one embodiment, the metal (e.g., cobalt) is present in an amount of at least 200 ppm based on the scavenging polymer, more preferably from 200 ppm to 2000 ppm, even more preferably from 300 ppm to 1000 ppm, and still more preferably from 400 ppm to 800 ppm. The lower limits of the metal concentration may be determined by a desired level of oxygen-scavenging performance (i.e., insufficient concentrations of metal may not achieve a desired scavenging performance for a given application) and processability. The upper limit may be determined by factors such as cost, toxicity, transparency, color, or processability, depending on the particular application. See for example the plaque test results in Example 12 and the 5-layer bottle results in FIG. 20.

In one embodiment, the polymer is solid-stated in the presence of the metal. In another embodiment, the metal is added to (blended with) the solid-stated polymer, after solid stating. Preferably, the metal is added in a manner to prevent the incorporation of excess oxygen and water to the solid-stated polymer. Thus, the metal in solid form (e.g., powder, pellets, pastilles) can be dry tumbled in a sealed container with the solid-stated polymer. In one embodiment the metal is added after solid stating but in the same vessel used to solid-state the polymer; this reduces the opportunity for moisture to be added when mixing the metal and polyamide. During a tumbling or agitation process, the solid-stated polymer and metal can be heated, and the heating step can be coupled with subjecting the polymer and metal to a vacuum. This heating step can facilitate uniform distribution of the metal about the polymer, and further enhancements in scavenging performance. The temperature of this optional post solid-stating heating step is less than the temperature that would cause decomposition of the metal and polymer and more preferably less than $T_g$. For example, when combining a nylon (such as MXD-6) and cobalt, this temperature is no greater than 130° C. and more preferably no greater than 70° C.

In one embodiment, the metal is a transition metal. The transition metal can be selected from the group consisting of iron, cobalt, nickel, ruthenium, rhodium, palladium, osmium, iridium, platinum, copper, manganese and zinc. In a preferred embodiment, the metal is cobalt and more preferably is added as a cobalt carboxylate compound. One example of a cobalt carboxylate compound is cobalt neodecanoate.

Performance Tests

One screening test ("the wet plaque test") to determine an effective oxygen-scavenging composition of the present invention involves preparing injection-molded plaques of the composition. Each plaque has dimensions of 6.25 inches (158.75 mm) long by 1.75 inches (44.45 m) wide and having five equal sections with increasing stepped thicknesses of 0.04 in (1 mm), 0.07 in (1.78 mm), 0.10 in (2.54 mm), 0.13 in (3.3 mm), 0.16 in (4.06 mm). Seven plaques are enclosed in a 32-ounce glass jar and one ounce of water added under ambient air (21% oxygen at 23° C.). The plaques rest on a platform above the water in the jar. The jar is capped with a standard canning jar lid, having a rubber septum. A syringe is inserted through the septum to withdraw a gas sample from the jar; the gas sample is injected into a Mocon model PacCheck 450 Head Space Analyzer to measure the oxygen content (available from Mocon Modern Controls, 7500 Boone Ave North, Minneapolis, Minn. 55428 USA). After measuring an initial oxygen content (typically 21.3%), subsequent measurements should be taken over a period of several weeks. Effective oxygen scavengers will reduce the oxygen concentration in the jar to 19% or less within 54 days (see Table 6B).

Another screening test for effective oxygen-scavenging performance as encompassed by the present invention involves the same wet plaque test described above, but the results are analyzed in terms of slopes. A graph of measured oxygen content vs. time is prepared. The slopes of these plots provide an index (slope) to compare relative rates of oxygen-scavenging. For example, when a solid-stated oxygen-scavenger exhibits an enhanced oxygen-scavenging performance over its non-solid-stated counterpart, its slope is at least 1.3 times greater than that of the non-solid-stated counterpart.

The enhanced oxygen-scavenging performance may alternatively be determined in select embodiments by finding an oxygen-scavenging performance for a solid-stated polymer with a given metal content that is greater than that of the corresponding non-solid-stated polymer/metal by a factor of at least 1.3, preferably by a factor of at least 2, and more preferably 4 times or more.

Package Storage and Shelf Life

It is a surprising feature that certain oxygen-scavenging articles of the present invention are capable of being stored in the presence of an excess of oxygen, such as air, for a significant period of time (e.g., 3 months, preferably 6 months) without substantial loss of scavenging performance when thereafter filled with a product. Thus, another aspect of the present invention provides a multi-layer package that is substantially free of degradation under ambient conditions for a time of at least three months. "Substantially free of degradation" refers to a package that maintains a designated scavenging performance (when filled) to reduce the oxygen content within a defined environment, such as the oxygen content enclosed within the package. Degradative effects can arise from oxidative or other unwanted processes. In one embodiment, the multi-layer package has at least one oxygen-scavenging layer embedded within two biaxially-oriented structural polymer layers, an arrangement which helps withstand degradative effects. The package is capable of being stored under ambient conditions and being substantially free of degradation within a time of at least three months and more preferably at least six months. "Ambient conditions" refers to an atmosphere of 21% oxygen (air) and a relative humidity of 50% at 23° C.

Another aspect of the present invention provides a package for enclosing an aqueous liquid that provides the package with an enhanced oxygen-removal rate upon being filled with the liquid. While not wishing to be bound by any theory, it appears that a component of the aqueous liquid is capable of activating the enhanced oxygen-scavenging performance of the scavenging layer. This non-limiting theory may reconcile two seemingly contradictory events: that a package incorporating an oxygen-scavenging layer can be stored for at least three months in air while being substantially free of degradation, and yet upon being filled with an aqueous liquid, exhibit scavenging activity. In one embodiment, the package enclosing the aqueous liquid has an oxygen-removal rate greater than an oxygen-removal rate of a dry package (see FIGS. 18-19).

In one embodiment, a structural layer is positioned between the oxygen-scavenging layer and the liquid; the structural layer is permeable to a component of the aqueous liquid, allowing the aqueous liquid to activate the oxygen-scavenger.

In another embodiment, the present invention provides a composition comprising an oxygen-scavenging layer positioned adjacent a polymeric structural layer, the structural layer being water-saturated. "Water-saturated" refers to a polymeric composition that is permeable to water upon contact with a source of water, such as an aqueous beverage.

In one embodiment, the component of the aqueous liquid capable of enhancing oxygen-scavenging performance is selected from the group consisting of water, carbon dioxide, nitrogen, volatile organic compounds, low molecular weight oligomers and trace impurities. In a preferred embodiment, the component is water.

Layer Compatibility

According to another feature of the invention, the solid-stating method provides an enhanced oxygen-scavenging polymer that can be processed to form a variety of multi-layer articles. One indication of processability is intrinsic viscosity, which in turn affects melt viscosity (another process parameter). Intrinsic viscosity (IV) reflects the molecular weight and may reflect the shape of the polymer molecule itself. For example, rod-shaped polymer molecules have a different intrinsic viscosity than spherical molecules for molecules of the same molecular weight, as is well-known in the art.

Intrinsic viscosity can be determined from inherent viscosity measurements for resins, such as polyester resins. For example, applying the procedure of ASTM D-4603-91, and employing PET soluble at 0.50% concentration in a 60/40 phenol/1,1,2,3-tetrachloroethane solution at 30° C., the inherent viscosity data can be determined and then converted to intrinsic viscosity using the Billmeyer relationship (see ASTM 4603-91, section 11). Polyethylene terephthalate (PET) having an intrinsic viscosity of about 0.8 is widely used in the carbonated soft drink (CSD) industry. Polyester resins for various applications may range from about 0.55 to about 1.04, and more particularly from about 0.65 to 0.85 dl/g. As used herein PET is meant to include PET homopolymers and copolymers.

A conventional parameter for processability is melt viscosity, as indicated by a melt index. "Melt index" can generally be defined as a number of grams of polymer that can be forced through an orifice of a standard unit at a specified temperature and pressure over a defined period of time. The melt index can be measured according to ASTM Method D-1238-94a. For example, using a 2.16 kg load and at 215° C., Shell 8006 virgin PET has a melt index of 29 g/10 minutes (available from Shell Chemical Co., Houston, Tex.). The polymers as used herein (oxygen-scavenging polymers and biaxially-oriented polyester polymers) are high molecular weight polymers, having a molecular weight of at least about 45,000, for which the melt viscosity is an important process parameter. If the melt viscosity is too high, it is not possible to push the polymer through an injection manifold fast to produce commercially acceptable preforms. Another important parameter reflected by melt index is melt strength; if the melt strength is too low, it is not possible to maintain layer integrity in a multi-layer structure having one or more relatively thin layers. Generally, as the molecular weight of the polymer increases, both the melt viscosity and melt strength increase. For multi-layer applications, those skilled in the art can determine an appropriate combination of melt viscosity and melt strength for a scavenging polymer layer positioned adjacent layers of other polymer-types.

In the situation where a structural layer is positioned adjacent an oxygen-scavenging layer in the absence of an adhesive, it is preferable that the two layers be "compatible." Compatibility implies that the multi-layer article, having at least two layers positioned adjacent each other, have the structural integrity to withstand delamination, observable deformation from a desired shape, or any kind of degradation of a layer caused by a chemical or other process initiated by an adjacent layer during the article-forming process or in the final product during expected use. Compatibility can be enhanced by selecting intrinsic viscosities, melt viscosities, melt indices and solubility parameters that allow one of ordinary skill in the art to achieve desired bottle characteristics. If a recyclable bottle is desired, then the layers should readily separate when the bottle is cut to enable separate processing of the different materials.

For a multi-layer article incorporating an oxygen-scavenger and a structural polymer, it is preferred that the melt index of the scavenger, e.g., polyamide, is less than that of the structural polymer, e.g., PET. The melt index of the scavenger should also take into account the increase in melt index that can occur for example when a metal (e.g., cobalt) is added. Thus, one aspect of the present invention provides a method for adjusting a melt index of a polymer such as a polyamide, by adding a metal to the polyamide in a specified amount to achieve a polyamide having an increased melt index. The method presents an advantageous feature of adjusting a melt index of the polyamide to allow it to be compatible with other polymers especially in a multi-layer article. In one embodiment, the metal is cobalt.

In one example, the melt index of PET going into the injection mold is 30 g/10 min. and the melt index of MXD-6 with cobalt is 20 g/10 min. Before the addition of cobalt, the melt index of the MXD-6 is 10 g/10 min. The melt index of the scavenger can increase further in the injection molding machine. The extent of this increase depends on factors that may vary for different injection mold units, such as the residence time of the scavenger in the injection mold and the temperature that the scavenger is subjected to in the injection mold. In one embodiment, a polyamide oxygen-scavenging polymer has a melt index of from 10 g/10 min. to 15 g/10 min before the addition of cobalt, when used with adjacent PET layers.

It is further noted that solid-stating can provide enhanced-oxygen scavenging independent of any substantial increase in intrinsic viscosity. As discussed in greater detail in Example 10 below, an initially large increase in oxygen-scavenging performance can be observed within the initial 8 h of the oxygen-scavenger being exposed to the solid-stating process. During this time interval, the increase in IV is relatively small compared to the improvement in oxygen-scavenging performance.

In one embodiment, the solid-stating process causes an increase in intrinsic viscosity of the scavenging polymer. For use in a sequential injection molding process with adjacent layers of PET, the scavenging polymer can be a polyamide such as MXD-6; the polyamide should preferably have an intrinsic viscosity from 1.7 to 2.0, more preferably from 1.73 to 2.0, more preferably still from 1.75 to 1.9, and even more preferably still from 1.80 to 1.86; all of these values are obtained when the intrinsic viscosity measurements are performed with m-cresol solvent. These desired IV values for MXD-6 are before the addition of the metal. When a metal such as cobalt is added to the solid-stated polymer, the IV may be reduced. A skilled person can select a desired IV range for the particular scavenger (polymer and metal) when injected or extruded with adjacent layers of particular structural polymers.

In addition to a match of IV, the process compatibility of the scavenging polymer and an adjacent polymer can further be indicated by the respective glass transition temperatures ($T_g$) of the two polymer-types, whereby the polymers can be processed in the same temperature range without loss of transparency. Solubility parameters can provide another factor in considering compatibility.

Transparency

Another advantageous feature of the oxygen-scavenging package of the present invention is transparency. In one embodiment, only a portion of a package need be transparent. For example, in a beverage container the container should at least have a transparent sidewall because typically a consumer views the contents of the bottle through the sidewall (as opposed to the base or the neck finish). Of course, completely transparent bottles including a transparent base and neck finish are also encompassed by the present invention.

In some applications, the package may include coloring dyes which reduce the transparency. As used herein, a "transparent" wall or article refers to the wall or article without dyes.

As used herein transparency is determined by the percent haze for transmitted light through the wall ($H_T$) which is given by the following formula:

$$H_T = [Y_d \div (Y_d + Y_s)] \times 100$$

where $Y_d$ is the diffuse light transmitted by the thickness of the specimen, and $Y_s$ is the specular light transmitted by the thickness of the specimen. The diffuse and specular light transmission values are measured in accordance with ASTM Method D 1003, using any standard color difference meter such as model D25D3P manufactured by Hunterlab, Inc., Reston, Va., U.S.A. In one embodiment, at least a portion of the package and preferably at least the sidewall should have a percent haze (through the wall) of no greater than 10%, more preferably no greater than 7% and more preferably still, no greater than 5%.

Scavenging Polymers

A preferred class of oxygen-scavenging polymers is defined as a polymer having a repeat unit including a carbonyl. The repeat unit of the oxygen-scavenging polymer can also include aromatic or aliphatic groups in the polymer backbone or a side chain; "backbone" is defined as the longest, continuous bond pathway in the polymer. The repeat unit preferably has at least one hydrogen atom alpha to the carbonyl. The oxygen-scavenging polymer can be a homopolymer, a random copolymer, an alternating copolymer, a block copolymer, or a blend. Preferably, the scavenging polymer will form a transparent layer. The scavenger may include other functional groups as long as the compatibility with other polymers is maintained when the oxygen-scavenging polymer is incorporated in a multi-layer article.

In one embodiment, the oxygen-scavenging polymer has a repeat unit including an amide group, also known as a polyamide. An amide is defined as having a unit —RN—C(O)— where R can be hydrogen, alkyl or aryl. In a preferred embodiment, the polyamide is a nylon where the backbone includes aromatic and/or aliphatic groups. Examples include MXD-6, nylon 6, or nylon 6,6. In one preferred embodiment, the backbone includes aromatic groups derived from xylidenc monomers which include m-xylidene, i.e., MXD-polyamides. One example of an MXD-polyamide can be formed by polymerizing meta-xylylene-diamine ($H_2NCH_2$-m-$C_6H_4$—$CH_2NH_2$) with adipic acid ($HO_2C(CH_2)_4CO_2H$), to produce the polymer MXD-6 (sold by Mitsubishi Chemicals, Japan). Another example of an aromatic polyamide is obtained by the polymerization of meta-xylilene-diamine and adipic acid (same as MXD-6) but with the addition of 11 mole percent isophthalic acid ($C_6H_4$—$(COOH)_2$). This polymer is sold by EMS of Domat/EMS, Switzerland. An example of an aliphatic polyamide is nylon-6 (PA 6) (see FIG. 15D). Typically, amorphous polyamides have a $T_g$ of from 90° C. and 150° C.

In one embodiment, the oxygen-scavenging polymer is a polyester. A preferred aromatic ester scavenging polymer is described in commonly-owned and copending PCT Application No. US97/16826 filed Sep. 24, 1997, entitled "Transparent Oxygen-scavenging Article Including Biaxially-Oriented Polyester, And Method Of Making The Same," published on Apr. 2, 1998 as WO 98/13266, which is hereby incorporated by reference in its entirety.

In one embodiment, the oxygen-scavenging polymer is a polyketone, also referred to as polyolefin-ketones), which are linear, alternating copolymers having a repeat unit including the group:

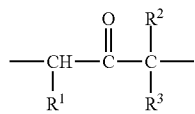

where $R^1$-$R^3$ can be the same or different and each can be selected from the group consisting of hydrogen, an organic side chain, or a silicon-containing side chain. The simplest member of this class of polyketones is the alternating copolymer of ethylene and carbon monoxide (E/CO). It is possible to introduce a second olefinic monomer into the polymerization, such as propylene, which will substitute randomly for ethylene, and in alternation with carbon monoxide, to produce the terpolymer poly(ethylene-alt-carbon monoxide)-stat-(propylene-alt-carbon monoxide) (hereinafter E/P/CO terpolymer).

Structural Polymers

Generally, at least one other layer will function as a structural polymer layer in the situation where the oxygen-scavenging layer by itself cannot maintain the desired structural integrity of the article. Desirable features of structural polymers include any one or a combination of the following: unreactive towards oxygen, water or any organic component; suitable for contact with food; permeable to oxygen under select conditions; functional as a passive barrier layer to prevent a substantial amount of oxygen from the outer environment (outside of the package) reaching the oxygen-scavenging layer. In one embodiment, the structural polymer is selected from the group consisting of polyesters and polyolefins. In a preferred embodiment, the structural polymer is an aromatic polyester. An important feature of the structural polymer is biaxial orientation which in addition to improving the mechanical strength may also improve the oxygen barrier property. In one embodiment, the structural polymer is PET and is biaxially stretched (for example in a bottle sidewall) at a planar stretch ratio of from 7× to 14×, preferably from 8× to 12×. The ability to affect permeability properties through biaxial orientation may have an effect on the overall scavenging performance of a multi-layer article where the structural layers form outer and inner exterior layers and the scavenging layer is an interior layer, i.e., the overall performance is based on the rate of oxygen removal from the interior of the container (where oxygen can permeate the inner structural layer to reach the scavenging layer and where the rate of removal exceeds a rate at which exterior oxygen can permeate to the interior of the package).

Generally, the glass transition temperature $T_g$ of a polyester used in a commercial plastic container is at least 5° C. above the ambient use temperature, e.g., if a beverage bottle will be used in an environment where the temperature may reach 35° C., the polymer should have a $T_g$ of at least 40° C. or the polymer may melt (no longer be a solid article). The $T_g$ also determines the temperature above which an aromatic polyester can be heated to enable biaxial stretching. For example, PET has a $T_g$ of 70° C., and PEN has a $T_g$ of 120° C. For ease of processing, the polymers are typically stretched in an orientation temperature range at least 20° C. above $T_g$ (e.g., at least 90° C. for PET, at least 140° C. for PEN, and varying with the copolymer content). It may be desirable for the scavenging polymer to have a $T_g$ below the orientation temperature of the polyester which is to be biaxially oriented (e.g., PET or PEN), but not so far below that the scavenging polymer will crystallize (become nontransparent or opaque) during the orientation process. In such case the $T_g$ of the scavenging polymer would be at least 10° C. below the orientation temperature used to biaxially orient the polyester. A preferred range of $T_g$ for a scavenging polymer having an amorphous nature (i.e., not crystallizing more than 3% under any conditions) is 0-15° C. below the $T_g$ of the polyester, more preferably 3-7° C. below, and most preferably 5° C. below. A preferred range of $T_g$ for a crystallizable scavenging polymer is 0-15° C. above the $T_g$ of the polyester, more preferably 3-7° C. above, and most preferably about 5° C. above. Relative ratios of monomers in a copolymer can be varied to adjust the $T_g$ of the scavenging polymer. In one embodiment, increasing the aromatic groups in the backbone of a polyester scavenging or structural polymer will increase the $T_g$; a desired $T_g$ enables biaxial orientation of adjacent polyester layers while maintaining transparency of the overall article.

Packages and Multi-Layer Articles

Packages of the present invention include articles for storing food or other products; the package can be a blow-molded container, an injection-molded container, and a film (e.g., for wrapping meat, vegetable, fruit). The intended application will dictate the desired package characteristics; for example, a film for wrapping food will not have the same rigidity requirements as a plastic bottle. However, the film thickness may be greater than typical (for nonscavenging applications) in order to provide the desired scavenging performance.

The thicknesses of the oxygen-scavenging and structural layers will generally effect the oxygen-scavenging performance of the package. Generally, multi-layer articles having thicker scavenging layers result in a better scavenging performance. Other factors however, may provide an upper limit to scavenging layer thickness. For example, in commercial applications it is generally desired that the cost of the oxygen-scavenging layer be minimized. The cost of incorporating a polyamide into a multi-layer container can be significant compared to a container made solely of polyethylene terephthalate. The methods and articles of the present invention can be used to achieve a cost reduction by, for example, providing one or more relatively thin scavenging layers (compared to the overall thickness of the article). In one embodiment, by using separate oxygen-scavenging layers as opposed to blends (of the scavenger and other polymers), thinner oxygen-scavenging layers may be used with thicker structural layers and subsequently cost is minimized while processing conditions and/or final bottle characteristics are optimized. Where the oxygen-scavenging layer includes a metal, a relatively high concentration of metal can be incorporated in the separate layer. In contrast, a blend will typically have a lower concentration of metal spread over a thicker layer (but have a higher metal concentration in the overall package).

It has been found that for some applications, optimizing the amount of metal and oxygen-scavenging polymer in a relatively thinner portion of an article optimizes the oxygen-scavenging performance. For example, when two thin intermediate layers of an oxygen-scavenging polymer are incorporated in a 5-layer injection molded preform for making a bottle, as described hereinafter, where the scavenging layers comprise a solid-stated polyamide and cobalt, if the amount of cobalt is greater than 1000 ppm (based on the polyamide weight) and/or the weight of the scavenging polymer in the preform is no greater than 10% by weight, it may be difficult to provide a desired concentration of cobalt and/or amount of oxygen-scavenging polymer in the relatively thin sidewall portion of the container. One reason for this is that cobalt will decrease the IV of the polyamide, thereby affecting the material distribution of the layers during injection. Thus, depending on the scavenger used, the composition of adjacent layers, the thicknesses of the various layers, and the processing technique (simultaneous injection molding, sequential injection molding, extrusion, film-forming, etc.), there may be upper and/or lower limits on the amount of metal used while attempting to achieve a desired oxygen-scavenging performance.

In general, the thicknesses of the scavenging/structural layers are preferably selected to allow the bottle to have a substantial storage period unfilled and a reasonable rate of removal of oxygen from the package when filled, both factors being tailored to the particular food product being stored. The outer layers should be thick enough to prevent oxygen permeating to the scavenging layer in an amount in excess of that which can be removed by the scavenger. The thickness of the inner structural layer (i.e. the layer closest to the food product) must also be thin enough to allow the enclosed oxygen content, often having a low partial pressure of oxygen, to permeate the inner layer at a commercially acceptable rate allowing for reduction of the oxygen content. The more active the oxygen scavenger, the less thickness required of the structural layer. As mentioned previously, structural layers that are too thin may reduce the storage period to unacceptable levels.

In one embodiment, the thickness of the outer and inner structural layers are the same. This arrangement optimizes the balance between storage period and scavenging rate. In addition, the structural layers are preferably permeable to a component of an aqueous liquid when the package is filled and this component is capable of enhancing the scavenging rate of the scavenging layer and/or rate of permeation of oxygen through the inner structural layer.

In a preferred embodiment described below, the multi-layer article can be used as a package, where the package contains a product that requires storage under low oxygen conditions. For example, the product can be a food or beverage (e.g., beer, juice, ketchup) and the multi-layer article can be a bottle having an opening that can be sealed with a standard cap. The product can include a pressurized liquid, e.g., by carbon dioxide or nitrogen, wherein the container maintains the product pressure and maintains a low oxygen content.

Typically, a multi-layer container such as a bottle is a blow-molded article made from an injection-molded multi-layer preform. The preform may comprise a neck finish, a sidewall-forming portion and a base-forming portion. The multiple layers of the preform can be formed by any method known in the art. In one embodiment, the multi-layer preform can be formed by applying or injecting various materials individually (sequentially) into a mold. In another embodiment, the multi-layer preform can be formed by simultaneous injection of the desired layers into the mold. In another embodiment, where the container is a film for wrapping food, the multi-layer can be formed by co-extruding multi-layer sheets. Certain techniques encompassed by at least some of these various embodiments for forming multi-layer articles are described in U.S. Pat. No. 5,281,360 (Hong et al.), which is hereby incorporated by reference in its entirety.

In a preferred embodiment, the preform has a particular multi-layer arrangement such that when the preform is formed into a bottle, a significant portion of the oxygen-scavenging layer is contained in the thinnest portion of the bottle, namely the sidewall. In some applications, substantially the entire container body (below the neck finish) includes a layer of the oxygen-scavenging polymer. As previously discussed, it has been found that the choice of polymers and polymer processing conditions can affect the location of a significant portion of the oxygen-scavenging layer.

In a preferred 5-layer embodiment, the bottle has two intermediate oxygen-scavenging layers (polyimide/cobalt) positioned between inner, core, and outer structural polymer layers (PET)—see e.g., the 5-layer bottle of FIGS. 1-4 described below. Typically, the neck finish and/or base of the container will have a thicker structural layer. Where a portion of the container has a thicker structural layer, a lesser thickness of the scavenger layer (than in the other bottle portions) may prove to be adequate. In the 5-layer embodiment, the oxygen-scavenging polymer/layer is preferably no greater than 15% by weight of the bottle, while providing sufficient scavenger in the sidewall for a desired performance. Preferably, from a cost perspective, the weight percentage of the scavenger is no greater than 10%, e.g., 5-8%. In some applications, the scavenger could be 2-5% by weight.

Surprisingly, it has been found that for storage purposes, it is preferable to store the multi-layer article as a bottle, rather than a preform. In contrast, many prior art teachings recommend storing the article as a preform, and then blow-molding the bottle immediately prior to use (filling). For example, bottles of this invention stored (unfilled) for up to 233 days still maintain excellent scavenging properties when filled with an aqueous liquid, whereas the scavenging performance decreases when preforms of this invention have been stored for a comparable amount of time. While not wishing to be bound by any theory, it is believed that the preform versus bottle effect may arise from the biaxial orientation of the PET structural layers in the bottle which reduces the oxygen permeability.

In a 5-layer beverage bottle application as described herein, a thickness of each of two oxygen-scavenging layers in the sidewall-forming portion of the preform is preferably from 0.001 to 0.01 in. (0.0254 mm to 0.254 mm), and more preferably from 0.004 to 0.005 in. (0.102 mm to 0.127 mm). A total thickness of the preform is preferably from 0.1 to 0.3 in. (2.54 mm to 5.08 mm), and more preferably from 0.14 to 0.17 in. (3.56 mm to 4.32 mm). The thickness of each structural polymer layer (inner, core, outer) is preferably from 0.01 to 0.1 in. (0.254 mm to 2.54 mm), and more preferably from 0.03 to 0.08 in. (0.762 mm to 2.03 mm). Alternatively, the two scavenger layers may be combined into a single scavenger layer in the sidewall (at double the thickness of one scavenger layer).

The resulting bottles (of the 5-layer embodiment) preferably have an average sidewall thickness from 0.01 to 0.02 in. (0.254 mm to 0.508 mm). Each of the two oxygen-scavenging layers in the sidewall has a thickness of preferably from 0.0001 to 0.001 in. (0.00254 mm to 0.0254 mm), and more preferably from 0.0004 to 0.0006 in. (0.0102 mm to 0.0152 mm). Each structural polymer layer (inner, core, outer) in the sidewall preferably has a thickness of from 0.001 to 0.02 in. (0.0254 mm to 0.0508 mm), and more preferably from 0.003 to 0.008 in. (0.0762 mm to 0.203 mm). Again, as an alternative, the two separate scavenger layers can be combined into one (at double the thickness).

The scavenging performance of this bottle can be determined by a method which involves filling the bottle with a volume of a liquid (e.g., water), sealing the bottle, storing the liquid in the bottle for a period of time and monitoring the oxygen content to ascertain the amount/rate by which the oxygen content is reduced in the liquid during the storing (see Example 6). By reason of the enhanced scavenging performance of the present invention, there will be a reduction in the oxygen content of the liquid in the plastic bottle. For the purpose of this test it may take some short time (in hours or one or two days) for the reduction to be measurable; this would still be considered a case where the oxygen scavenging occurs immediately upon filling. The time delay for a measurable reduction may be due to the equipment or measuring process. Preferably, the reduction from the initial oxygen level is sustainable for 16 weeks. In contrast, there is an overall gain in oxygen content in a glass bottle.

By reducing the oxygen content of the package, it can be seen that the shelf life of the product can be increased considerably. A desired reduction of oxygen content (for the desired shelf life) can be effected by for example selecting an appropriate metal concentration in the oxygen-scavenging layer. For example, where the oxygen-scavenging layer comprises a polyamide such as MXD-6 and cobalt, it has been found that a cobalt concentration of at least 200 ppm can achieve this reduction of oxygen in the liquid in the 5-layer embodiment.

For example, when a 500 ml commercial beer bottle is filled with beer (3% headspace), the oxygen content of the beer is typically around 100 ppb. In a multi-layer container of the present invention, this initial oxygen content (100 ppb) can be reduced such that the oxygen content is less than 100 ppb over some extended period of time, more preferably no greater than 50 ppb, and still more preferably no greater than 25 ppb. In one embodiment, the oxygen reducing performance is such that the oxygen content is held at no greater than 25 ppb from the time period of about one week (after filling) and for the following 16 weeks (see FIG. 5).

The method for reducing oxygen content can involve a component of the liquid, such as water, permeating into one or more of the structural and oxygen-scavenging layers. This component may promote transmission of oxygen to the scavenger layer and thus enhance the scavenging performance. In the 5-layer embodiment, the two oxygen-scavenging layers are positioned between three structural polymer layers where one structural layer is an inner layer that is in contact with the liquid, a second structural layer is a core layer having opposing sides positioned adjacent the two oxygen-scavenging layers, and a third structural layer is an outer layer in contact with air. In this embodiment, the liquid can permeate the inner structural polymer layer and consequently, permeate the oxygen-scavenging layer whereby the component of the liquid can help initiate or enhance the oxygen-scavenging. The component can be selected from the group consisting of one or more of water, carbon dioxide, nitrogen, volatile organic compounds, low molecular weight oligomers and trace impurities. The outer polymer layer, which will typically be in contact with the outside environment or air, may not be exposed to this component (from the liquid) that activates the oxygen-scavenging layer, at least not to the same degree. By this method, the outer layer(s) can prevent inward oxygen transmission while the inner scavenger layer(s) of the bottle can be activated to react with oxygen from inside the container. Furthermore, prior to filling, the bottle can be stored for long periods without consuming the scavenger (i.e., when the component is not present).

Thus, the action of filling the container with a liquid can allow the liquid (or a component thereof) to permeate the structural and scavenger layers and provide immediate scavenging. This eliminates the aging requirement noted for certain prior art containers. Thus, the bottles can be stored dry, while preserving their ability for immediate scavenging when filled.

Enhanced Scavenging/Beer Bottle

FIGS. 1-4 illustrate a transparent 5-layer preform and beer container including two solid-stated oxygen-scavenging polymer layers according to the present invention. This multi-layer structure enables use of a relatively low-weight percentage of the scavenging polymer, e.g., about 7½ percent of the total container weight, while providing a high level of scavenging.

An injection-molded multi-layer preform 30 is shown in FIG. 1. The preform is substantially cylindrical, as defined by vertical centerline 32, and includes an upper neck portion or finish 34 integral with a lower body-forming portion 36. The neck portion has a top sealing surface 31 which defines an open top end of the preform, and a generally cylindrical exterior surface with threads 33 and a lowermost flange 35. Below the flange is the body-forming portion 36 which includes an upper cylindrical portion 41, a flared shoulder-forming portion 37 which increases radially inwardly in wall thickness from top to bottom, a cylindrical panel-forming section 38 having a substantially uniform wall thickness, and a substantially hemispherical base-forming section 39.

Preform 30 has a three-material, five-layer (3M, 5L) structure (not shown in FIG. 1) and is substantially amorphous and transparent. The multiple preform layers comprise, in serial order: an outer layer of virgin PET, an outer intermediate layer of a solid-stated oxygen-scavenging polymer, a central core layer of recycled PET, an inner intermediate layer of a solid-stated oxygen-scavenging polymer, and an inner layer of virgin PET. The virgin PET may be any commercially available, bottle-grade PET homopolymer or copolymer having an intrinsic viscosity (IV) of about 0.80 dl/g. The core layer is commercially available post-consumer PET having an IV of 0.73 dl/g. The two intermediate layers are made of solid-stated MXD-6 scavenging polymer as previously described, having an intrinsic viscosity for example of 1.27 dl/g, a $T_g$ of 87° C., and a melting point of 238° C. The scavenging polymer includes 500 micrograms of cobalt per gram of polymer (i.e., 500 ppm cobalt per weight of MXD-6); the cobalt is added as cobalt neodecanoate.

Figure 2:
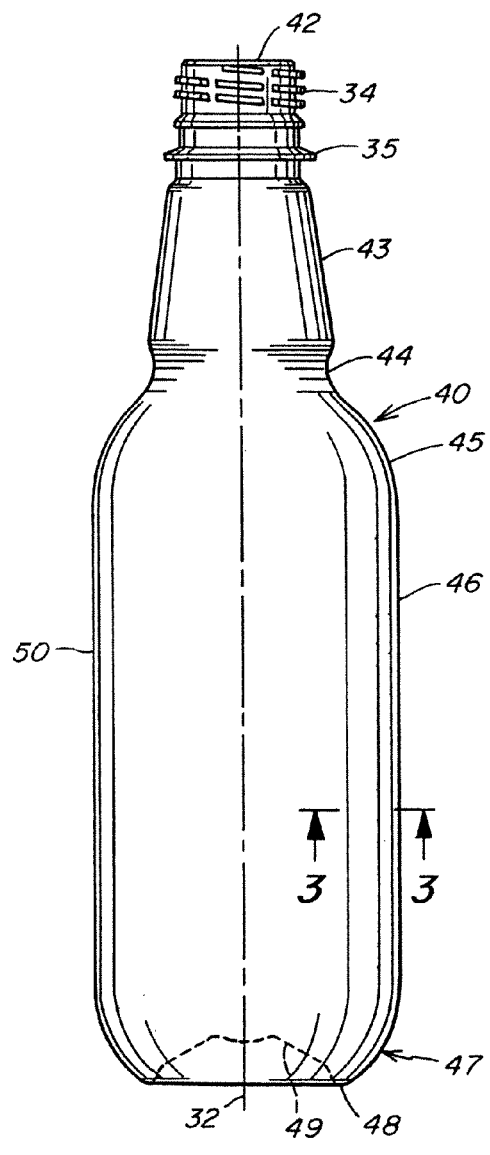
FIG. 2 is a side elevational view of a multi-layer container having a transparent sidewall made from the preform of FIG. 1.

The preform 30 is adapted for making a 0.5 liter (500 ml) pressurized container for beer, as shown in FIG. 2. The preform 30 has a height of about 112 mm, and an outer diameter in the panel-forming section 38 of about 25 mm. The total wall thickness of the panel-forming section 38 is about 4 mm;

the thickness of the various layers in this preform section are: outer and inner layers each about 1.1 mm thick; inner and outer intermediate layers each about 0.11 mm thick; and core layer about 1.6 mm thick. For carbonated beverage containers of about 0.3 to 1.5 liters in volume, having a panel wall thickness of about 0.25 to about 0.38 mm, and filled at about 2.0 to 4.0 volumes of $CO_2$ aqueous solution, the preform panel-forming section 38 preferably undergoes an average planar stretch ratio of about 9-12. The planar stretch ratio is the ratio of the average thickness of the preform panel-forming portion 38 to the average thickness of the container panel 46 (as shown in FIG. 2); the average is taken along the length of the respective preform and container portions. The average panel hoop-stretch is preferably about 4.0 to 4.5, and the average panel axial stretch is about 2 to 3. This produces a container panel 46 with the desired biaxial orientation and visual transparency. The specific panel thickness and stretch ratio selected depend on the dimensions of the bottle, the internal pressure, and the processing characteristics (as determined for example by the intrinsic viscosity of the particular materials employed).

The preform shown in FIG. 1 may be injection molded by a sequential metered process described in U.S. Pat. Nos. 4,550,043; 4,609,516; 4,710,118; 4,781,954; 4,990,301; 5,049,345; 5,098,274; and 5,582,788, owned by Continental PET Technologies, Inc. of Florence, Ky., and hereby incorporated by reference in their entirety. In this process, predetermined amounts of the various materials are introduced into the gate of the preform mold as follows: a first shot of virgin PET which forms partially-solidified inner and outer preform layers as it moves up the cool outer mold and core walls; a second shot of the scavenging polymer which will form the inner and outer intermediate layers; and a third shot of the recycled PET material which pushes the scavenging polymer up the sidewall (to form thin scavenging layers) while the third slot forms a central core layer. A final shot of virgin PET may be used to clear the nozzle and finish the bottom of the preform with virgin PET.

After the mold is filled, the pressure is increased to pack the mold against shrinkage of the preform. After packing, the mold pressure is partially reduced and held while the preform cools. In a standard process, each of the polymer melts are injected into the mold at a rate of about 10-12 grams per second; a packing pressure of about 7500 psi ($50 \times 10^6$ N·m$^{-2}$) is applied for about 4 seconds after filling; the pressure is then dropped to about 4500 psi ($30 \times 10^6$ N·m$^{-2}$) and held for the next 15 seconds, after which the pressure is released and the preform is ejected from the mold. Increasing the pressure above these levels may force higher levels of interlayer bonding, which may include chain entanglement, hydrogen bonding, low-level interlayer crystallization and layer penetration; these may be useful in particular applications to increase the resistance to layer separation in both the preform and container. In addition, increased pressure holds the preform against the cold mold walls to solidify the preform without haze, i.e., loss of transparency, at the minimum possible cycle time. Still further, faster injection rates may yield higher melt temperatures within the injection cavity, resulting in increased polymer mobility which improves migration and entanglement during the enhanced pressure portion of the injection cycle, and thus increases the delamination resistance. As an additional option, increasing the average preform temperature and/or decreasing the temperature gradient through the preform wall may further reduce layer separation by minimizing shear at the layer boundaries during preform expansion.

Figure 4:
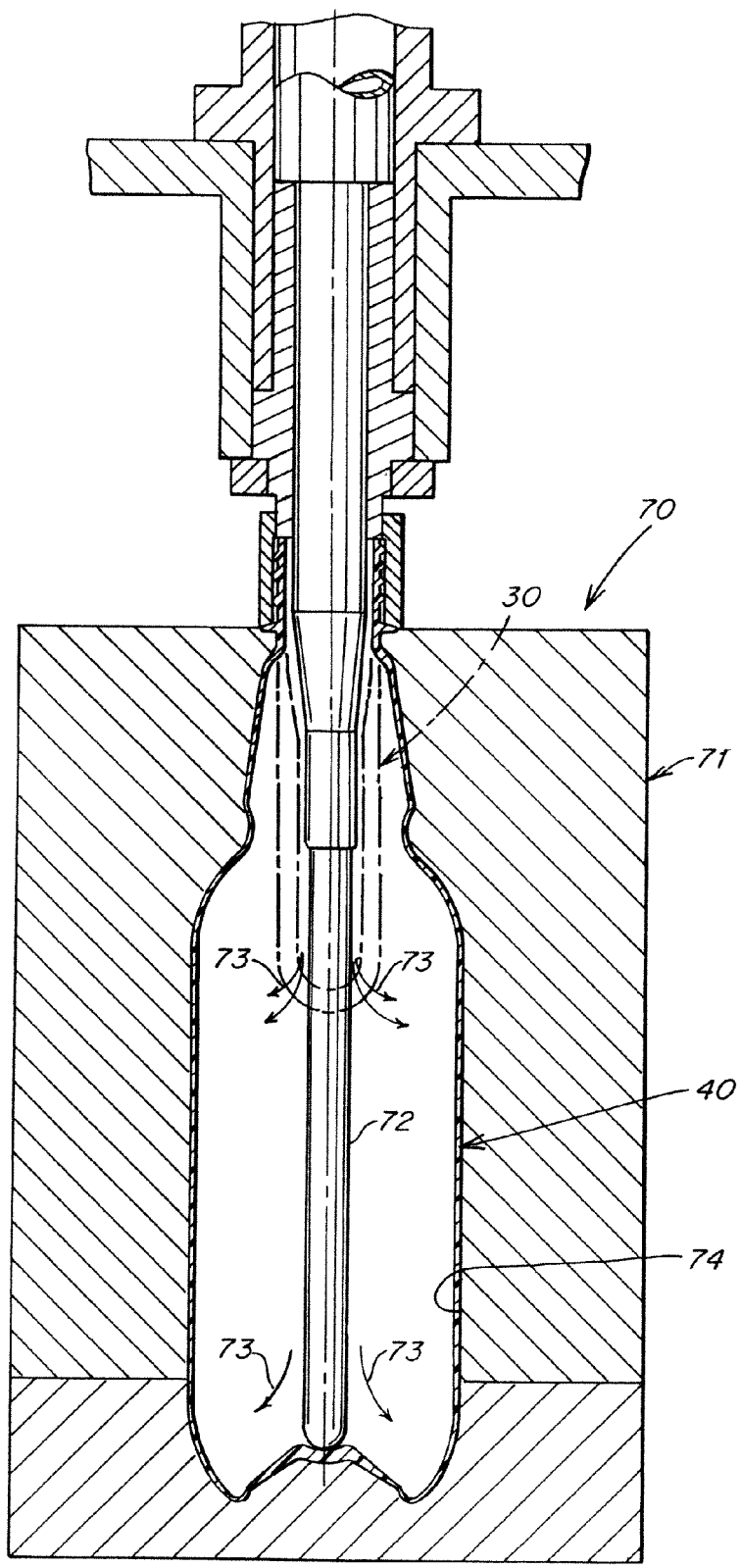
FIG. 4 is a vertical cross-section of a blow molding apparatus for making the container of FIG. 3.

FIG. 4 illustrates a stretch blow-molding apparatus 70 for making the container 40 from the preform 30. More specifically, the substantially amorphous and transparent preform body-forming section 36 is reheated to a temperature above the glass transition temperatures ($T_g$) of the inner/outer virgin PET, intermediate scavenger, and core recycled PET layers, and the heated preform then positioned in a blow mold 71. A stretch rod 72 axially elongates (stretches) the preform within the blow mold to insure complete axial elongation and centering of the preform. A blowing gas (shown by arrows 73) is introduced to radially inflate the preform to match the configuration of an inner molding surface 74 of the blow mold. The formed container remains substantially transparent but has undergone strain-induced biaxial orientation to provide the increased strength necessary to withstand the carbonation pressure.

In this embodiment the preforms are reheat stretch blow-molded on a Sidel SBO-1 into 500 ml beer bottles with an average sidewall thickness of 0.015 in. In the sidewall, the inner PET layer is 0.0037 in. thick, the inner intermediate layer is 0.0005 in., the core layer is 0.0065 in., the outer intermediate layer is 0.0005 in., and the outer layer is 0.0038 in. thick.

FIG. 2 shows the 0.5 liter multi-layer beverage bottle 40 made from the preform of FIG. 1. The preform body-forming portion 36 has been expanded to form a transparent biaxially-oriented container body 41. The upper thread finish 34 has not been expanded, but is of sufficient thickness or material construction to provide the required strength. The bottle has an open top end 42 and receives a screw-on cap (not shown).

The expanded container body 41 includes an upper conical shoulder section 43 which generally increases in diameter from below the neck finish flange 35. Below shoulder portion 43 is an indented annular rib 44 and then a dome portion 45 which joins at its lower edge to a cylindrical panel section 46. The panel section 46 preferably has been stretched at an average planar stretch ratio of 9 to 12; the virgin PET layers have an average strain-induced crystallinity of 24 to 32%, and more preferably of 26 to 30%. The champagne-type base 47 has a standing ring 48 which surrounds a central push-up dome 49.

Figure 3:
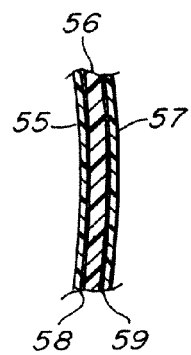
FIG. 3 is a horizontal cross-section taken along line 3-3 of FIG. 2, showing the multi-layer sidewall of the container.

FIG. 3 shows a cross-section of the container panel wall 46, including inner layer 55 of virgin PET, core layer 56 of recycled PET, outer layer 57 of virgin PET, and inner and outer intermediate layers 58, 59 of the oxygen-scavenging polymer. In this embodiment, the relative percent by total weight of the various layers in the panel section are about 25% for inner layer 55, about 41% for core layer 56, about 28% for outer layer 57, and the intermediate scavenger layers 58 and 59 together are about 5.6 weight percent. The container overall contains 7.5 weight percent of the scavenger. Depending on the application, there may be a substantially uniform thickness of the scavenger layer throughout the container, or alternatively a relatively greater amount of scavenger in the panel (thinnest wall portion) over that in the much thicker neck portion and/or base regions, where the greater thickness PET layers provide sufficient passive barrier protection. Preferably, the scavenger layer is of substantially uniform thickness in the panel.

This container provides a shelf-life for beer of no greater than 50 parts-per-billion (ppb) of oxygen over 112 days (16 weeks), as described in the following examples.

EXAMPLES

Figure 5:
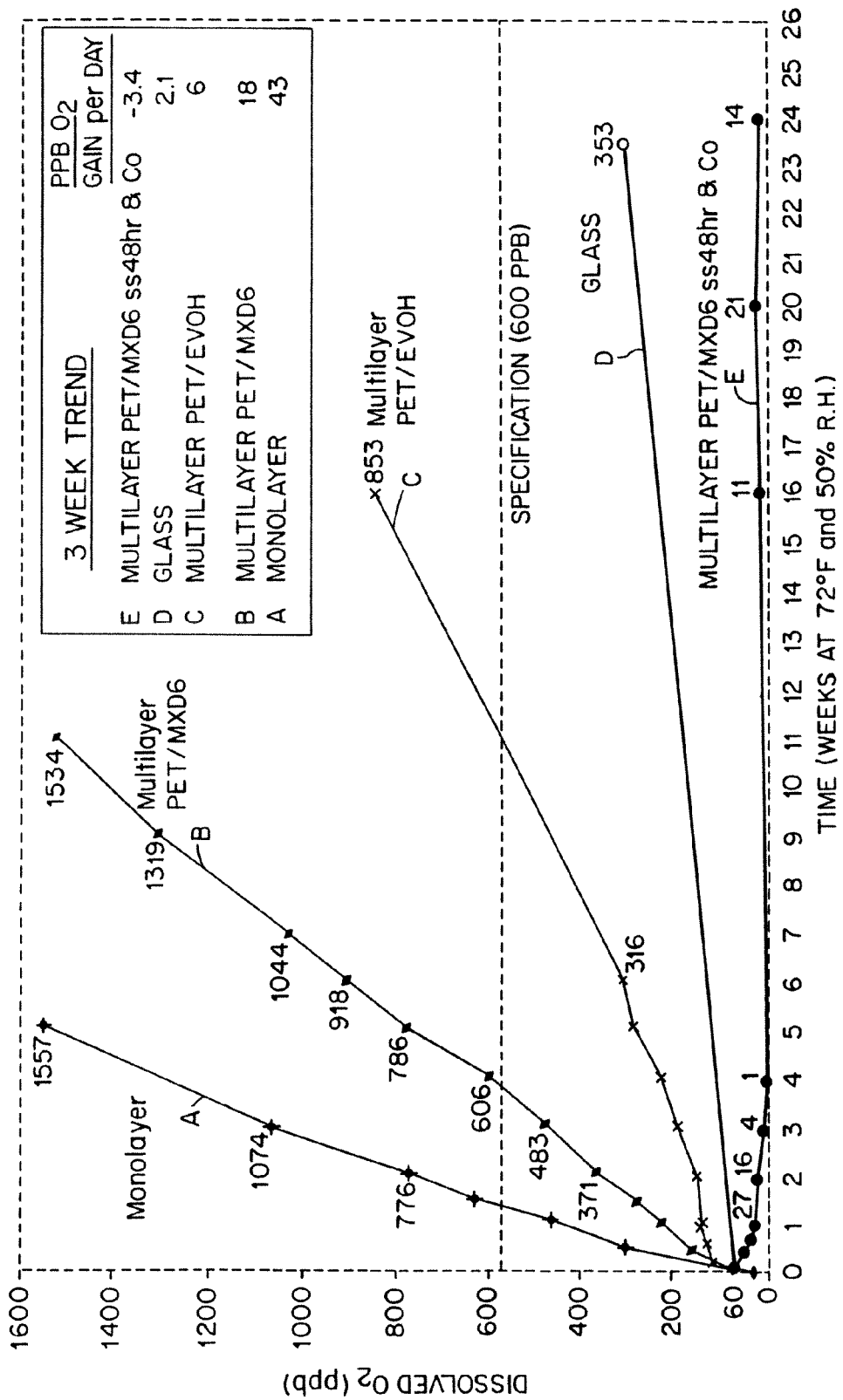
FIG. 5 is a graph of dissolved $O_2$ in a liquid in the container (ordinate) versus time in weeks (abscissa), for sample containers filled with deoxygenated water and held at 72° F. (22° C.) and 50% relative humidity, illustrating the oxygen-scavenging rate of various prior art containers compared to a container of the present invention.

The following examples describe various methods of preparing an enhanced oxygen-scavenging polymer. The scavenging polymer is then used to make a number of the three-material five-layer (3M/5L), 500 ml beer bottles previously described and shown in FIGS. 1-4. These bottles are tested according to an Orbisphere test method (described below) for determining the scavenging performance of the container. The results are illustrated in FIG. 5, which show the enhanced oxygen-scavenging performance of a container made with the solid-stated polymer of the present invention, compared to prior art monolayer, multi-layer PET/MXD-6, multi-layer PET/EVOH, and glass containers.

Example 1

In this example, an aromatic polyamide oxygen-scavenger (EMS 5227) is solid-stated, combined (tumbled) with a metal compound, and then used to form separate layers of a multi-layer beer container.

40 lbs of EMS 5227 polymer pellets with an IV (in m-cresol solvent) of 1.55 is placed in a 1-cubic foot agitated and jacketed vacuum chamber (VB-001 Double Plentary Mixer, Ross, Hauppauge, N.Y.; a 10-cubic foot chamber is also available). EMS 5227 is a polymer produced by EMS (located in Domat/EMS, Switzerland) by condensing meta-xylene-diamine with adipic acid and 11 molar percent isoph-thalic acid. The amorphous 5227 pellets are first dried and crystallized under agitation at 250° F. (120° C.) at 10 torr for 6 hours. By first crystallizing the polymer, the melting temperature is increased to allow an increase in the subsequent solid-stating temperature. The $T_g$ of the polymer is 85° C. In accordance with the solid-stating method to enhance the scavenging, the temperature is then turned up to 350° F. (177° C.) and the pressure maintained at 10 torr for an additional 42 hours. At the end of the solid-stating time the temperature of the transfer fluid heater is reduced to sub-ambient (below 25° C.). The polymer is cooled for 1 hour prior to removal. The polymer is transferred to 2-25 lb metal cans with tight sealing lids.

The polymer from one can is tumbled with 2500 ppm ground cobalt neodecanoate pastilles (The Shepherd Chemical Co. No. 03676400) for 4 hours. The resulting mixture is used to make two intermediate layers of the preforms, which are then reheat stretch blow molded into bottles, as described above with respect to FIGS. 1-4.

75 of the bottles are selected at random, filled with deoxygenated water and then capped (Alcoa aluminum cap) for Orbisphere testing. Immediately after filling, the samples have about 100 ppb oxygen content. Two to five days later they are down below 50 ppb. Two to three weeks after tilling, they are below 20 ppb and remain there for a long period of time, much longer than 16 weeks (112 days)—see FIG. 5.

Measurements of Oxygen-Scavenging Rate

The Orbisphere test components are available from Orbisphere, Geneva, Switzerland. The following is a summary of the test procedure.

1. An 80-gallon stainless steel pressure tank is filled with tap water. It is then sparged with nitrogen at a high rate, around 40 liters per minute, for 1 hour. This takes the concentration of oxygen down from 8000 ppb to under 100 ppb. After sparging, the tank is held at 22 psi of nitrogen.

2. Each of 75 500 ml beer bottles is loaded onto an Orbisphere bench top bottle filler and is sparged with nitrogen at a rate of 20 liters per minute for a period of 30 seconds to remove oxygen from the bottle. Each bottle is filled with the de-oxygenated water from the tank. The bottle is then removed from the filler and set on the bench. There is about a 15 cc headspace created by the displacement of the fill tube of the filler device.

3. A 28 mm Alcoa aluminum cap with a PET-compatible (EVA) liner is screwed onto the top of the bottle. The cap is backed off slightly while the bottle is squeezed by hand until the gas in the headspace of the bottle is squeezed out. Once the gaseous headspace has all been removed, the cap is again tightly twisted by hand onto the thread finish of the bottle.

4. After all 75 bottles have been filled, 5 are taken by random and placed in the Orbisphere model 29972 sample device connected to an Orbisphere model 3600 analyzer. The bottle cap is punctured, a tube is dropped to the bottom of the bottle, the bottle headspace is pressurized with 20 psi nitrogen, and the liquid is forced out of the bottle and through the Orbisphere analyzer sensor at a rate of 0.13 liters per minute. When 30-50% of the liquid has been removed from the bottle, the measurement is stable and the displayed number is recorded. The results of 5 bottles are averaged to support a trend analysis. Note there is a fixed headspace of 3% in these bottles; the headspace reappears over 3-4 days after filling as the nitrogen (from sparging the tank water), leaves the water in the bottle and enters the headspace.

5. 5 bottles are tested according to the following approximate schedule: 1 day, 3 days, 7 days, 11 days, 2 weeks, 4 weeks, 6 weeks, 8 weeks, 12 weeks, 16 weeks, 20 weeks, 24 weeks, 28 weeks, 32 weeks. Data is recorded and graphed for trend analysis to determine suitability for a beer package.

The Orbisphere results are shown in FIG. 5, which is a graph of the amount of oxygen in the liquid exiting the container, in parts per billion (ppb), versus the time, in weeks. As indicated, the bottles have been filled with deoxygenated water and are held in an environment at 72° F. (22° C.) and 50% relative humidity.

A desired specification for beer is represented by the dashed line in FIG. 5—i.e., the Orbisphere results described above where the 600 ppb is the $O_2$ content of the water. Thus, the desired specification is for the oxygen content in the water to remain below 600 ppb. This defines the $O_2$ shelf life for the container. It means that the oxygen present during filling, and that which permeates through the sidewall and/or leaks in through the cap and enters the liquid, must remain below 600 ppb during the entire 112 day period.

The oxygen performance of various prior art containers are also illustrated in FIG. 5. All of the containers used an Alcoa aluminum cap (nonreactive, threaded, with a PET compatible liner). A first prior art container A is a monolayer PET control container made from a single layer of virgin bottle-grade PET, having a thickness of 15 mils (0.015 in.), a diameter of 2.6 in., and a height of 4.75 in.; the estimated surface area of the container is about 60 in. squared. As shown in FIG. 5, the monolayer container exceeds the 600 ppb specification at about 1¼ week.

A second prior art container B is a two-material, five-layer (2M/5L) container made from virgin PET as the inner, outer and core layers, and MXD-6 nylon (which has not been solid-stated) as the inner and outer intermediate layers. The MXD-6 comprises three (3) weight percent of the container. This container has the same thickness and dimensions as the control container. This container fails (exceeds) the specification at about 4 weeks.

A third container C is a two-material, five-layer (2M/5L) container made from virgin PET (inner, outer and core layers) and EVOH (inner and outer intermediate layers). The EVOH comprises three (3) weight percent of the container. This container falls outside the specification at about 11 weeks.

A fourth container D is a glass container. This container stays within the specification for 24 weeks. There is oxygen leakage around the cap into the container, producing a gain in oxygen content over time.

Figure 7:
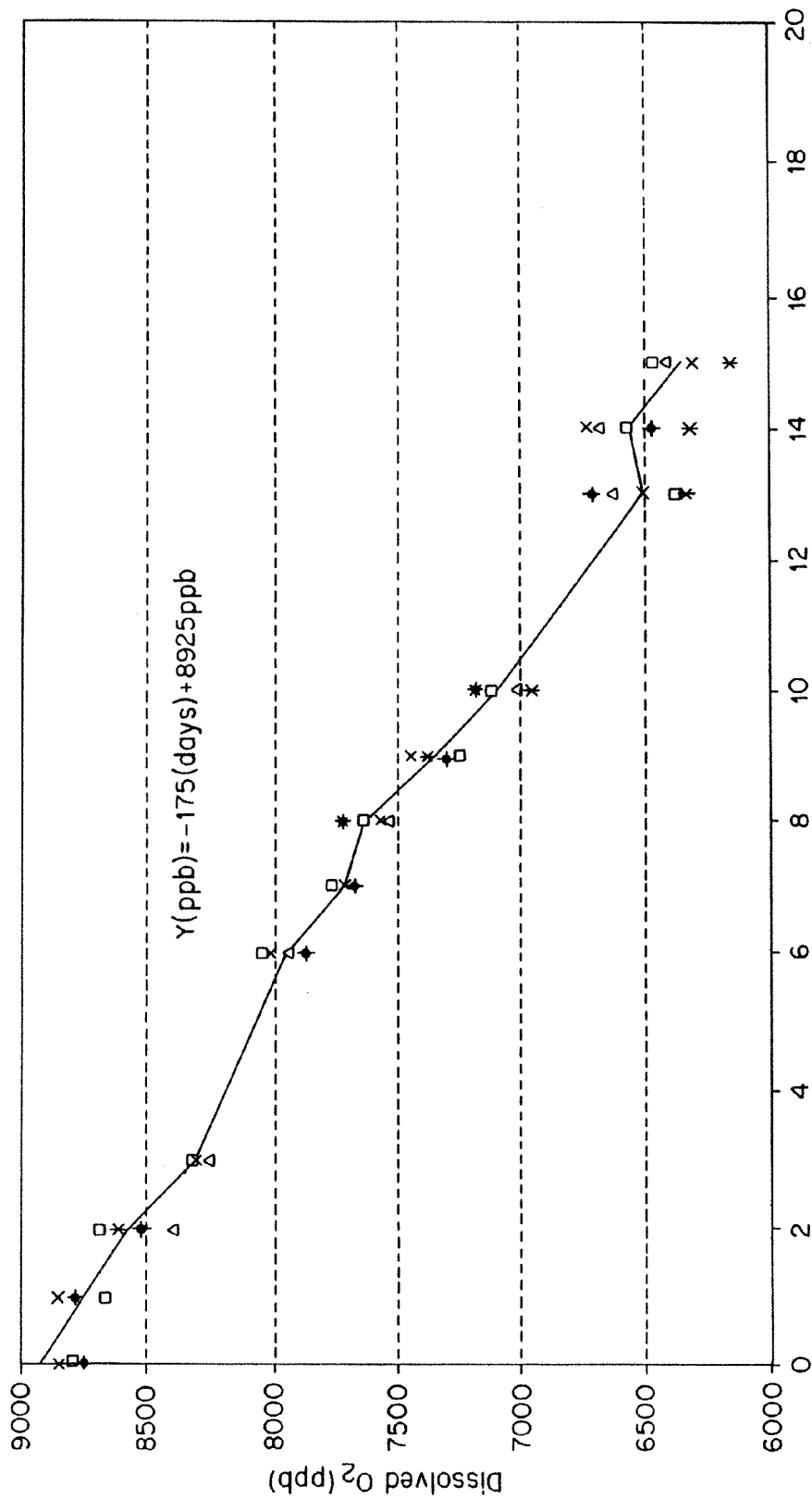
FIG. 7 is a graph similar to FIGS. 5 and 6 but showing an initial (14 days) scavenging rate for removal of dissolved $O_2$ from a liquid in a multi-layer container of this invention which has been filled with oxygenated water (tap water)

The container E of the present invention (7½% by weight solid-stated MXD-6 of the total container weight), has a reduction in oxygen content over time and a much lower level of oxygen concentration than the glass container. The oxygen concentration stays substantially below 20 ppb for most (all but the first week) of the 24 weeks. This is well beyond the 16-week requirement. During the first week the $O_2$ present during filling is being scavenged at an enhanced rate as illustrated in FIG. 7 (discussed below).

The box in the upper right corner of the graph of FIG. 5 shows a three-week trend analysis, comparing the prior art containers with the container of the present invention. Listed in the box are values for oxygen gain per day in ppb of $O_2$. As shown, the container of this invention has a negative gain of −3.4 ppb/day (trend in 3 weeks). The second best container is the glass container, having a +2.1 ppb gain per day. The other container values are +6, 18 and 43 ppb/day. Thus, there is a significant improvement even in the first three weeks of the test.

Figure 6:
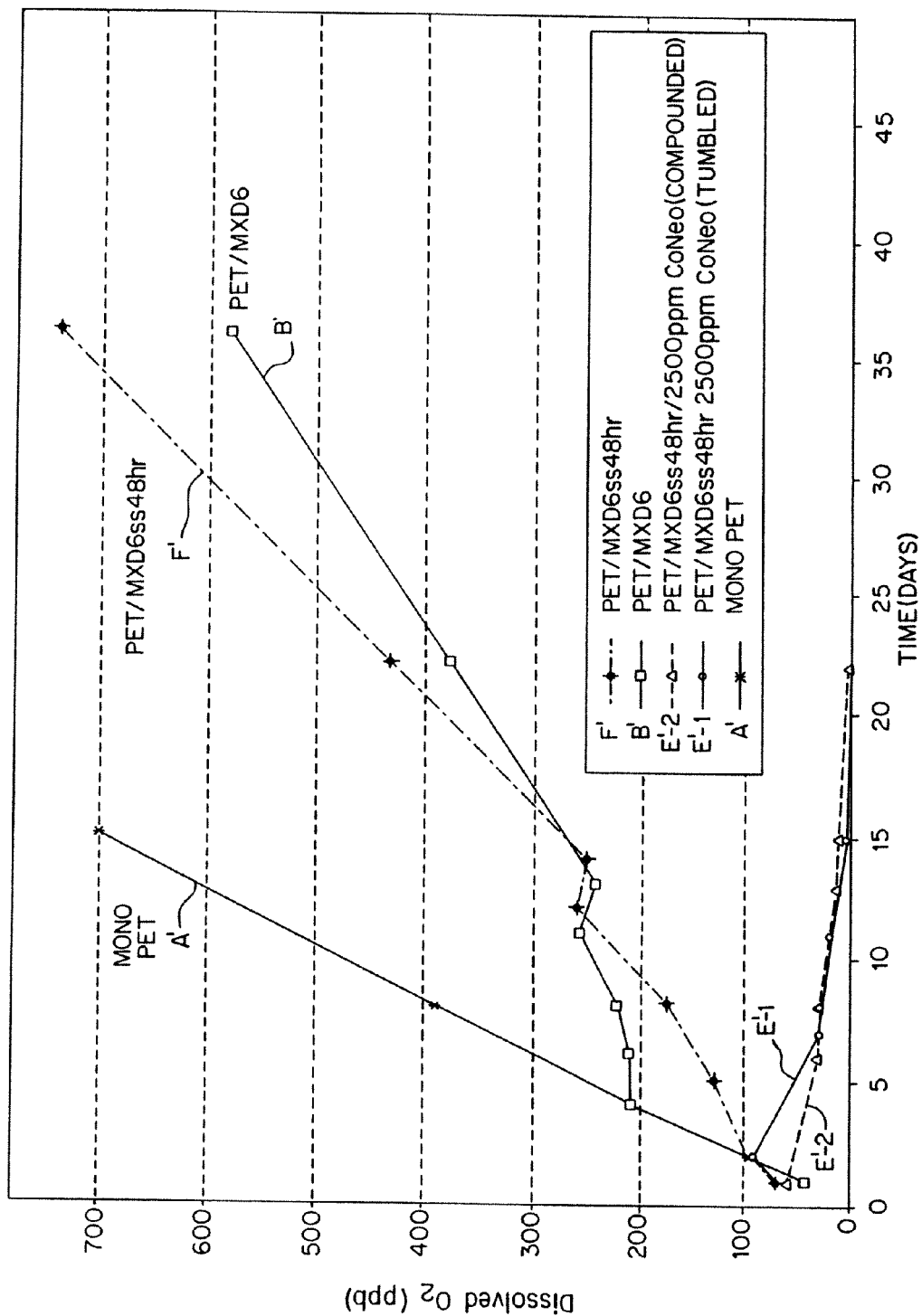
FIG. 6 is an expanded portion of a graph similar to FIG. 5, showing an initial 40 days, for comparing two sample containers of the present invention to other containers.

FIG. 6 is an exploded view comparing the scavenging performance over the first 40 days. Again, the monolayer PET container A' exceeds the 600 ppb between 10-15 days. Two containers E'-1 and E'-2 of this invention start at about 50-100 ppb and rapidly drop below 20 ppb in about 5-7 days. Note that FIGS. 5-6 show the Orbisphere test results, which measures the $O_2$ content of the fluid. In use, a typical aseptically-filled beer bottle may have an initial total package $O_2$ content of 200 ppb (includes $O_2$ in beer and headspace), which would drop to 34 ppb (total package) in 5-7 days due to the scavenging effect of the package. The initial 200 ppb total package $O_2$ content seen by the brewer is close to the 100 ppb liquid $O_2$ content (Orbisphere) value (where the liquid has an $O_2$ content of 100 ppb, the total package $O_2$ content (including liquid and headspace) would be 170 ppb).

FIG. 6 also shows the scavenging performance (over the first 35 days) of a multi-layer PET/MXD-6 container B' without solid-stating (close to 600 ppb at ~35 days), and a multi-layer PET/MXD-6 container F' where the MXD-6 has been solid-stated but no metal is used (exceeds 600 ppb at ~30 days).

FIG. 7 also illustrates the enhanced scavenging rate of the polymer of this invention. Here a sample container (from Example 3—containing solid-stated MXD-6, tumbled, 7½ weight percent) was filled with oxygenated (normal tap water) having a dissolved $O_2$ content of about 9000 ppb. The scavenging polymer reduced the $O_2$ content to below 6500 ppb in 24 days, at a rate of 175 ppb/day. This is an extremely high rate of scavenging.

Additional tests were run to determine the effect of the solid-stating process. They are described below and illustrated in FIGS. 8-15.

IR Spectroscopy

FIGS. 8A-8B show the results of infrared (IR) spectroscopy conducted on an MXD-6 sample without solid-stating (8A) and after solid-stating for 60 hours (8B). The ordinate is % transmittance, and the abscissa is wavenumbers ($cm^{-1}$). There is substantially no difference (between 8A and 8B) and thus the solid-stating appears to have no effect on the polymer structure.

NMR

Figure 9A:
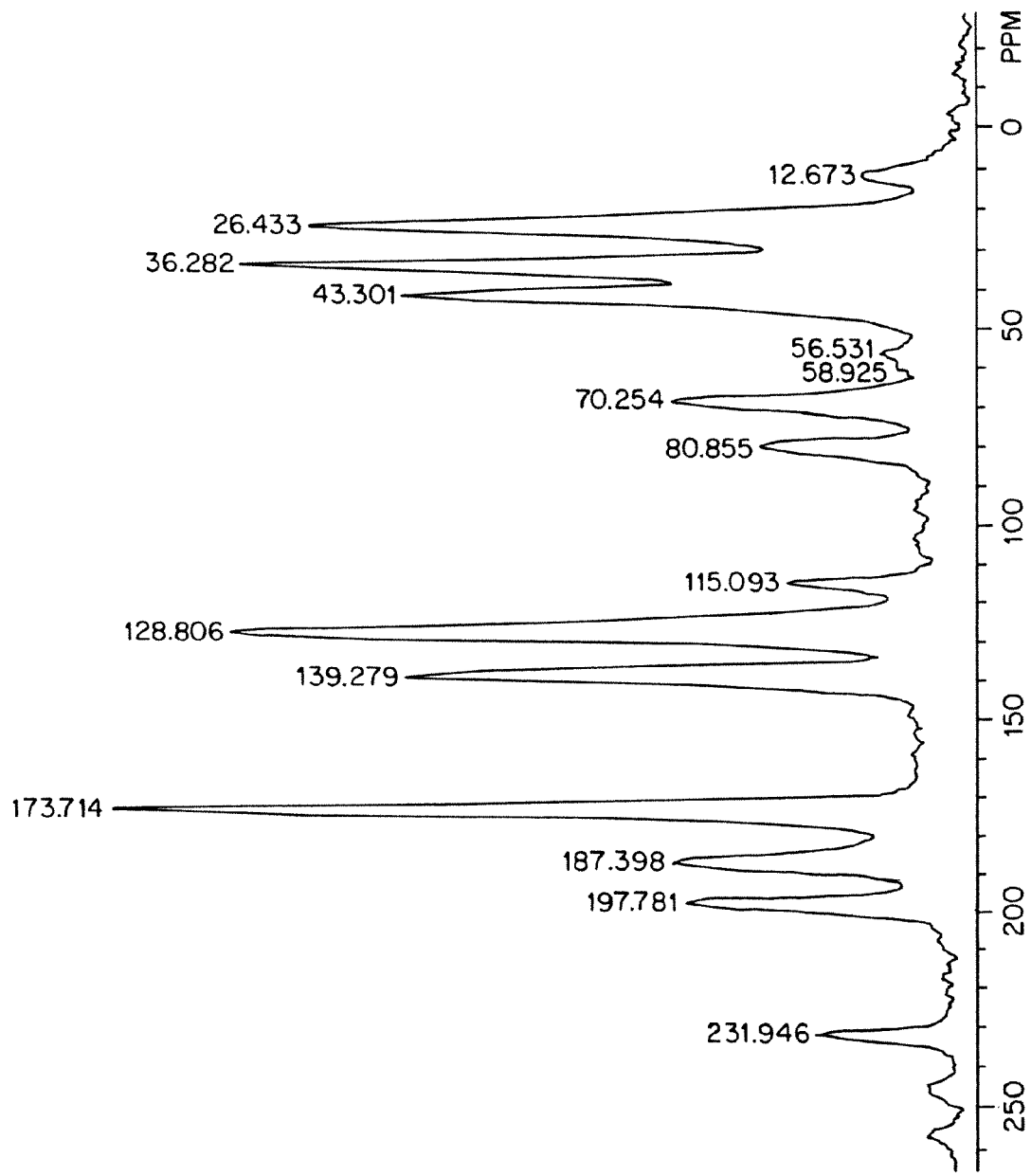
FIGS. 9A and 9B are two graphs of relative abundance (ordinate) versus wavelength converted to parts per million (ppm) (abscissa) for two samples of MXD-6, one of which has not been solid-stated (9A) and the other of which has been solid-stated for 48 hours (9B)
Figure 9B:
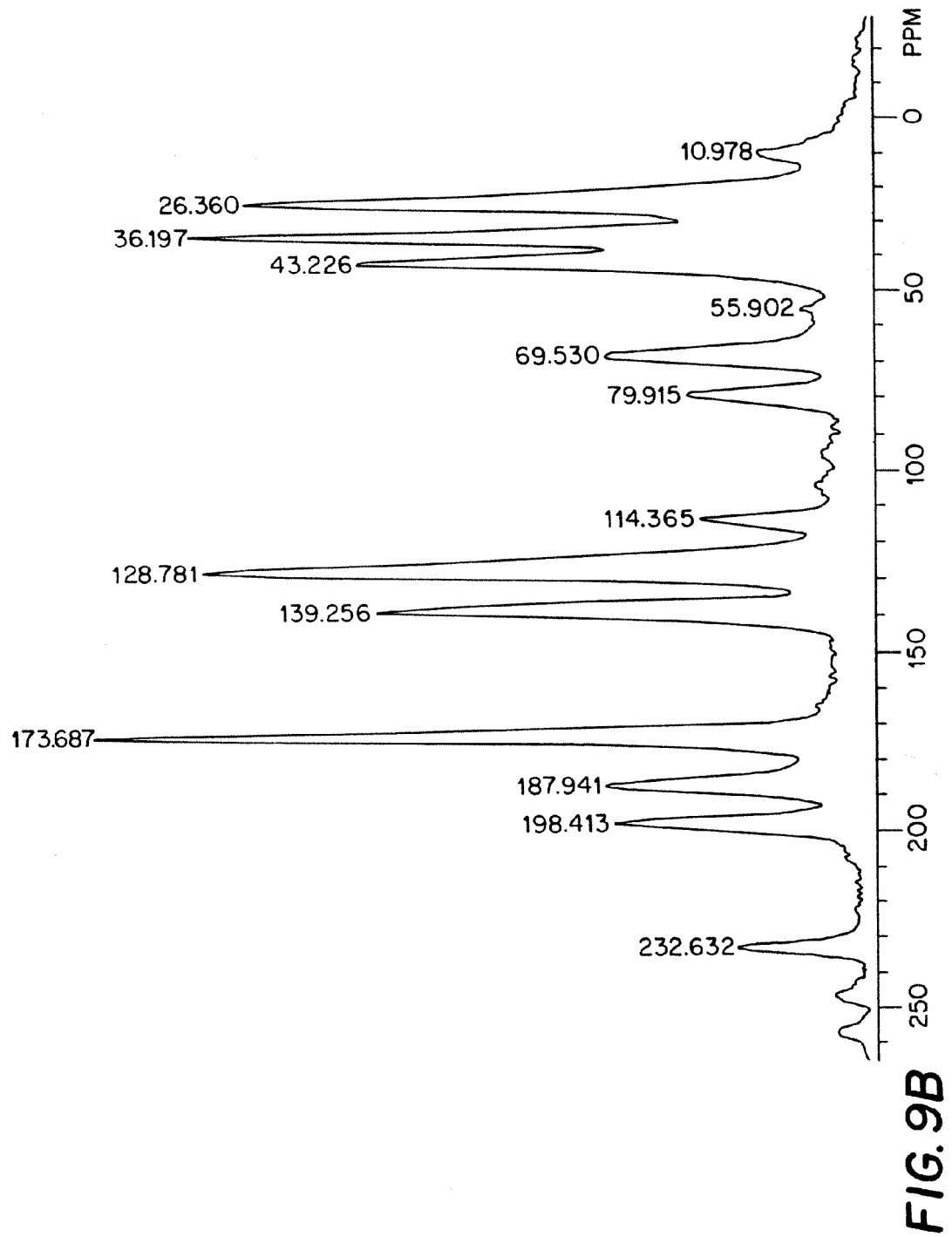

FIGS. 9A-9B show the results of nuclear magnetic resonance (NMR) on an MXD-6 sample without solid-stating (9A) and after solid-stating for 48 hours (9B). Again, there is substantially no difference and thus the solid-stating apparently has had no effect on the chemical structure. The NMR test was performed on samples after each 4-hour interval (over a total 60-hour solid-stating process) and substantially no difference was noted between any sample during the entire time.

Molecular Weight

The following discussion of molecular weight determination is taken from the published literature of LARK Enterprises, Inc., 12 Wellington Street, Webster, Mass. 01570.

The physical characteristics of polymers are determined by their chemistry and the size of the molecules. The chemistry affects characteristics such as solubility and adsorption of various metals, chemical and thermal resistance to degradation, conductivity, and adhesion. The size of the polymer molecules correlate to its rheology, or flow properties under stress conditions.

There are a number of statistical averages used by polymer scientists to describe the properties of polymers. The ones presented here are correlated to certain physical properties. Brittleness and ease of flow increase with decreasing Mn (number average molecular weight). The tensile strength and hardness increase with increasing Mw (weight average molecular weight). Flex life and stiffness increase with increasing Mz (Z average molecular weight). These averages can be obtained from a variety of separate testing procedures. End group titration, freezing point depression, boiling point elevation, osmotic pressure, or fractional vapor pressure change could be used to determine the Mn. Light scattering or viscosity could be used to determine the Mw. Ultracentrifugation can be used to determine Mz. There are other molecular weight averages used such as My (usually nearly equal to Mw) and ratios of averages, however, the three averages that are the most prevalent are Mn, Mw and Mz. The ratio of Mw/Mn is known as the dispersity of the polymer and is an estimate of the breath of the molecular weight distribution. Samples with a dispersity of close to one are considered to be nearly homogeneous. Anionically polymerized styrene with dispersities of 1.01 to 1.07 are generally used to calibrate GPC instruments. It should be noted that the dispersity of a polymer generally reflects its mode of synthesis and can vary widely—dispersities greater than 20 are not uncommon.

The technique of GPC (Gel Permeation Chromatography) or SEC (Size Exclusion Chromatography), two names that can be used interchangeably, has the advantage of being able to determine multiple parameters from one analysis. The method is applicable to all polymers that are soluble. The method of analysis uses about ten milligrams of sample (or less) dissolved in four milliliters of solvent. The dissolved polymers are pumped under high pressure (and in some cases high temperature to keep the polymer in solution) through a series of tubes packed with gel of varying pore size. In contrast to a mechanical sieve, the sieving action occurs with the larger molecules not fitting in the pores and eluting first while the smaller molecules elute last. The actual comparisons of samples and standards are made based on the size of the molecules in solution. Other than for the most exacting work the hydrodynamic radius comparisons are used directly or with minimal corrections. The time or X-axis can be calibrated logarithmically according to the size of the molecule in solution. The largest molecules are seen on the left of the chromatogram and the smallest at the right. This comparative nature of GPC requires the routine calibration of the instrument with well-defined standards. A curve is fit to the experimental standards and the molecular weight averages of interest are then calculated.

$$Mn = n_1 * M_1 / \Sigma n_i + n_2 * M_2 / \Sigma n_i + n_3 * M_3 / \Sigma n_i + \ldots$$

$$Mw = n_1 * M_1 * M_1 / \Sigma n_i * M_i + n_2 * M_2 * M_2 / \Sigma n_i * M_i + n_3 * M_3 * M_3 / \Sigma n_i * M_i + \ldots$$

$$Mz = n_1 * M_1 * M_1 * M_1 / \Sigma n_i * M_i * M_i + n_2 * M_2 * M_2 * M_2 /$$
$$\Sigma n_i * M_i * M_i + n_3 * M_3 * M_3 * M_3 / \Sigma n_i * M_i * M_i + \ldots$$

Disp.=Mw/Mn
  $n_1$=number of molecules with molecular weight $M_1$
  $M_1$=molecular weight of an individual molecule
  $n_i$=total number of molecules in the sample In addition to the averages obtained from the same sample, GPC has the advantage of giving a graphical representation of the mass as a function of molecular weight. The chromatogram that results is a good tool to quickly see trends in data that would not be immediately obvious.

Figure 10:
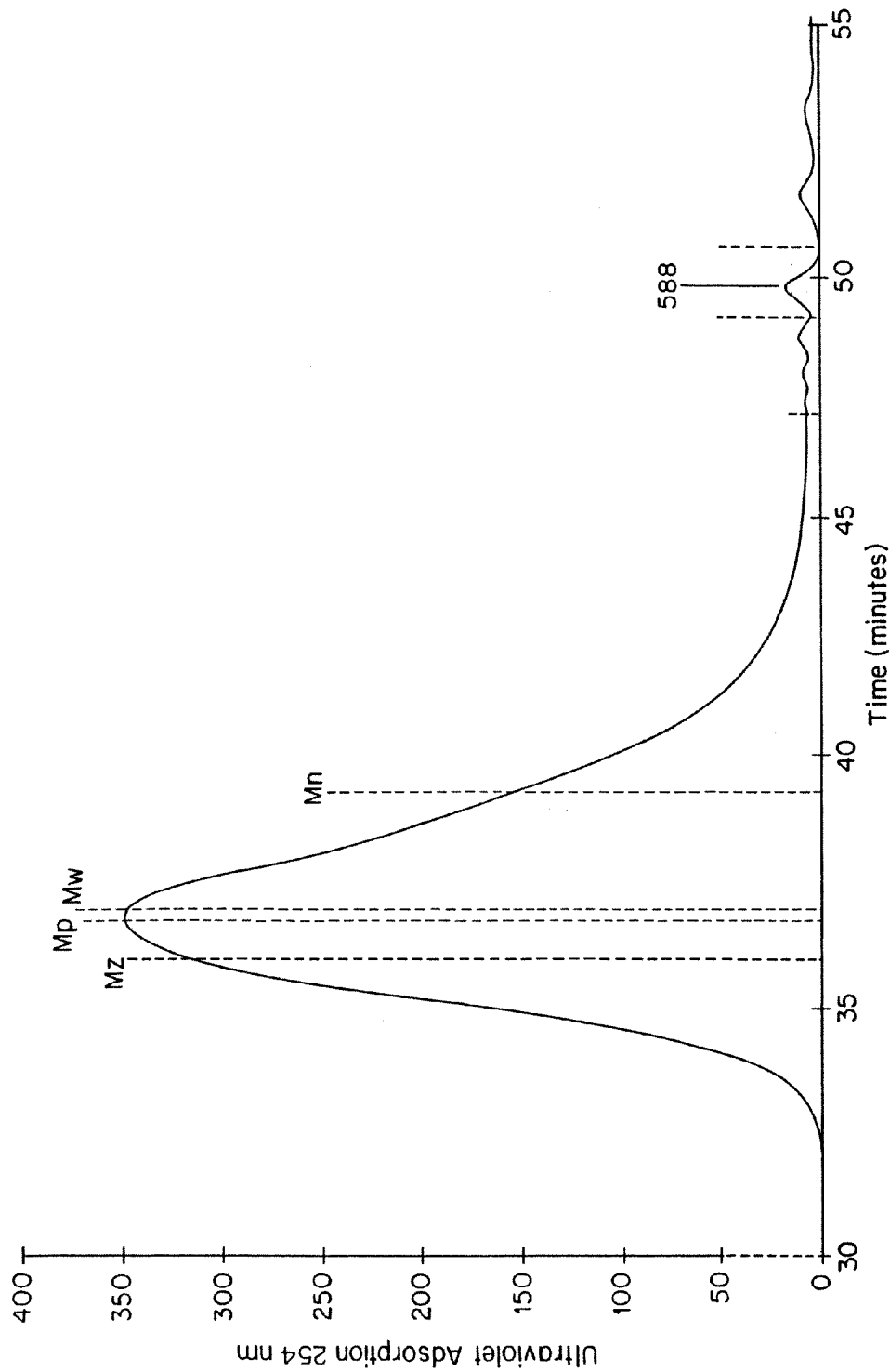
FIG. 10 is a graph of GPC output of ultraviolet absorption at 254 nm (ordinate) versus time in minutes (abscissa) for a nonsolid-stated sample of MXD-6.

FIG. 10 shows a GPC curve (chromatogram) for an MXD-6 sample which has not been solid stated.

Figure 11:
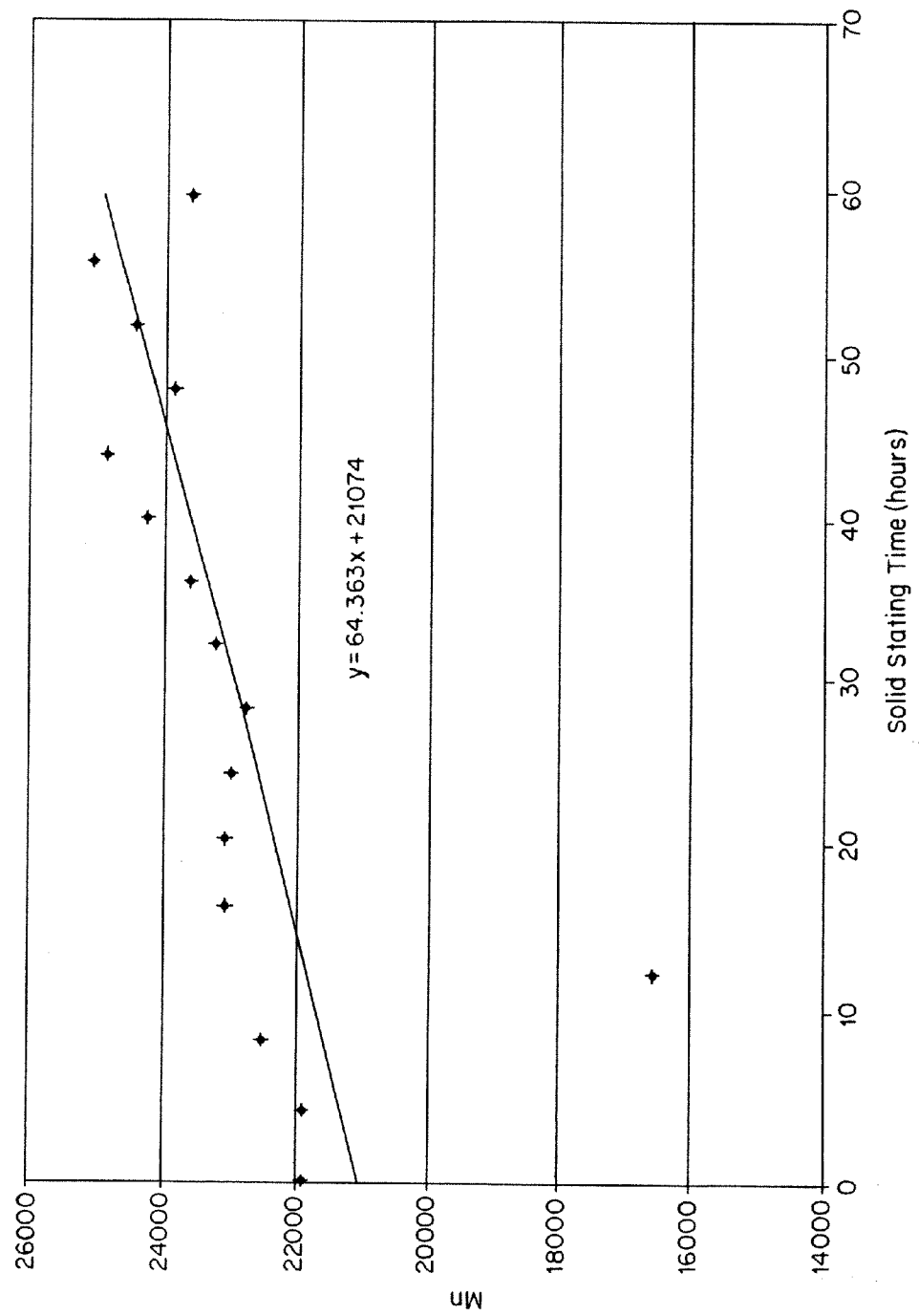
FIG. 11 is a graph of number average molecular weight Mn (ordinate) versus time of solid-stating in hours (abscissa) for an MXD-6 sample.
Figure 12:
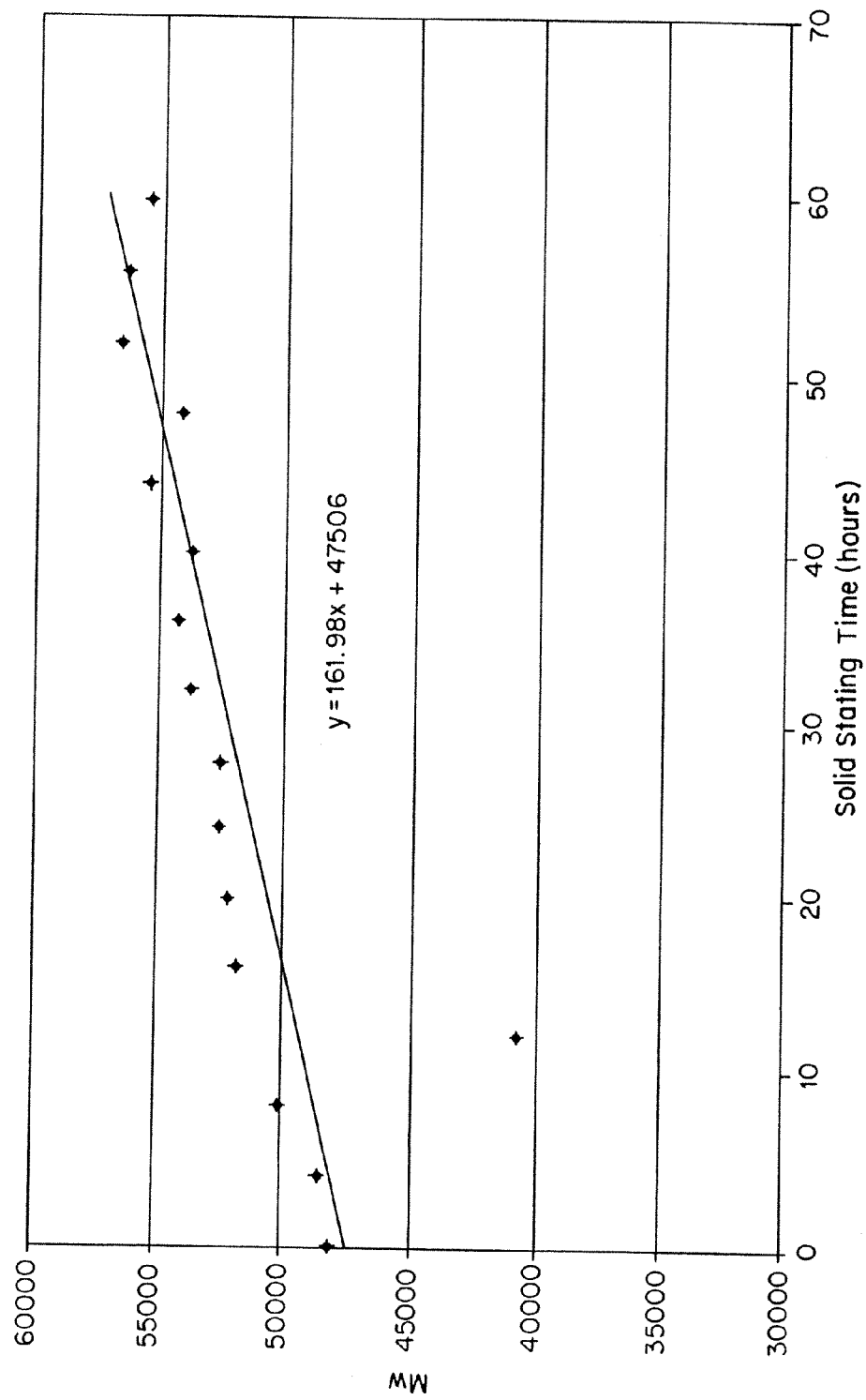
FIG. 12 is a graph of weight average molecular weight Mw (ordinate) versus solid-stating time in hours (abscissa) for an MXD-6 sample.
Figure 13:
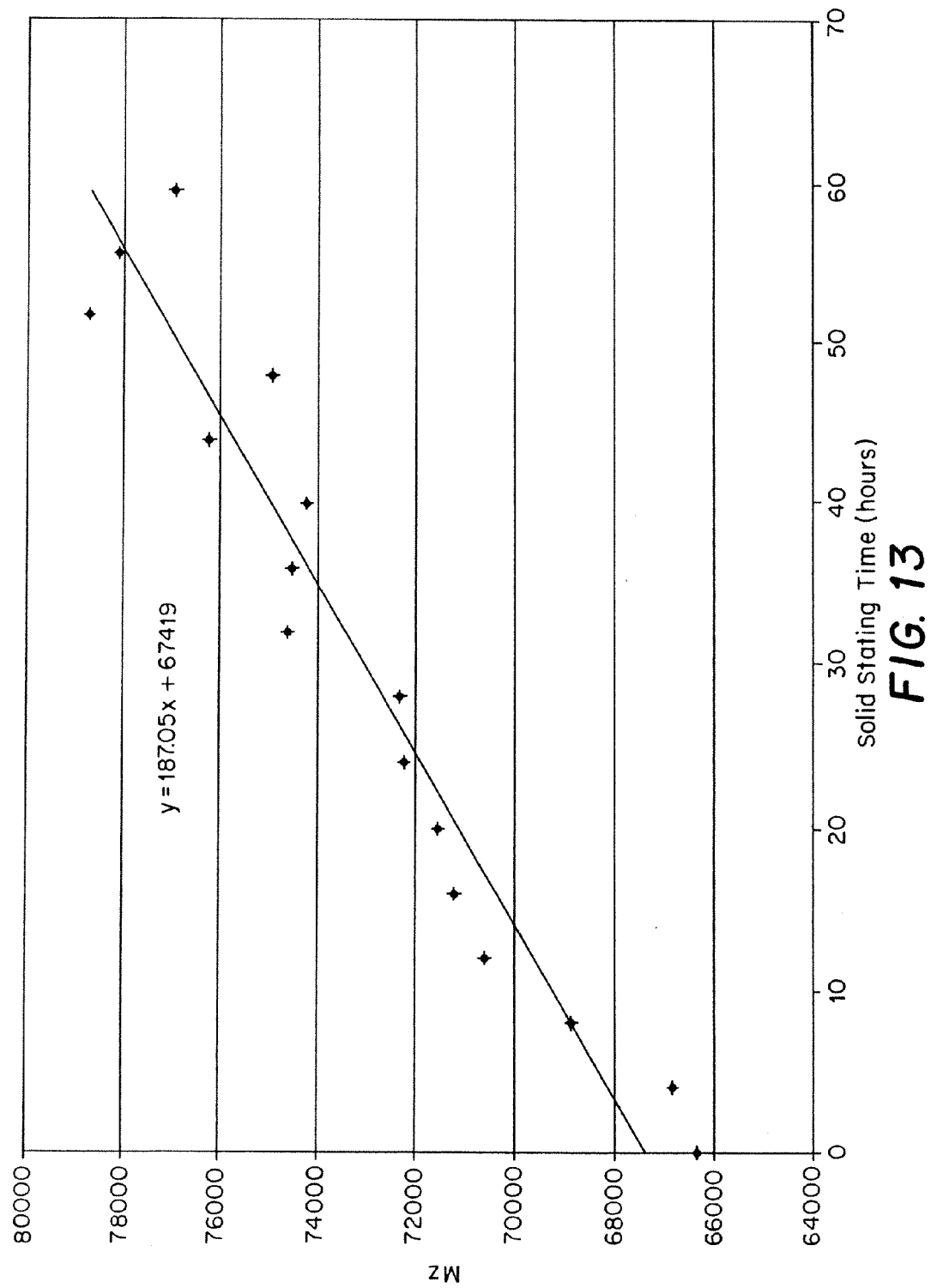
FIG. 13 is a graph of Z average molecular weight Mz (ordinate) versus solid-stating time in hours (abscissa) for a sample of MXD-6.

FIGS. 11-13 and Table 1 below show the results of a GPC for a solid-stated MXD-6 sample taken at 4-hour intervals during a total 60-hour solid-stating process according to the following parameters:

TABLE 1

|  | Mn | Mw | Mz | Mp | Disp. |
|---|---|---|---|---|---|
| 1-0 | 21902 | 48232 | 66320 | 51361 | 2.20 |
| 1-4 | 21895 | 48605 | 66864 | 51361 | 2.22 |
| 1-8 | 22511 | 50102 | 68921 | 52546 | 2.23 |
| 1-12 | * | * | * | * | * |
| 1-16 | 23117 | 51953 | 71243 | 55677 | 2.25 |
| 1-20 | 23113 | 52343 | 71566 | 57311 | 2.26 |
| 1-24 | 23028 | 52709 | 72271 | 57311 | 2.29 |
| 1-28 | 22824 | 52713 | 72355 | 58028 | 2.31 |
| 1-32 | 23256 | 53905 | 74660 | 58998 | 2.32 |
| 1-36 | 23642 | 54369 | 74559 | 60367 | 2.30 |
| 1-40 | 24296 | 53865 | 74239 | 58893 | 2.22 |
| 1-44 | 24895 | 55457 | 76255 | 61642 | 2.23 |
| 1-48 | 23882 | 54212 | 74923 | 59253 | 2.27 |
| 1-52 | 24449 | 56596 | 78701 | 63455 | 2.31 |
| 1-56 | 25088 | 56379 | 78076 | 63200 | 2.25 |
| 1-60 | 23620 | 55542 | 76921 | 62553 | 2.35 |

* Sample error

FIGS. 11-13 show the rise in Mn, Mw and Mz respectively over time during solid-stating. The rise in Mn establishes that the lower molecular weight (shorter) chains are increasing in length. The rise in Mz, at a greater rate than Mn, establishes that the higher molecular weight (longer) chains are also increasing in length (and at a greater rate). There is also a rise in Mw. Thus, the molecular weight of the MXD-6 is increasing during solid-stating in this embodiment.

The last column of Table 1 (above) is the polydispersity number, which reflects the distribution of molecular weight (as opposed to an average). This value is obtained by dividing Mw by Mn. To those skilled in the art it is apparent that there is no significant change in this ratio over the solid-stating time. It was also determined that there was no significant change in the cyclic oligomer component of the MXD-6 polymer.

Figure 14:
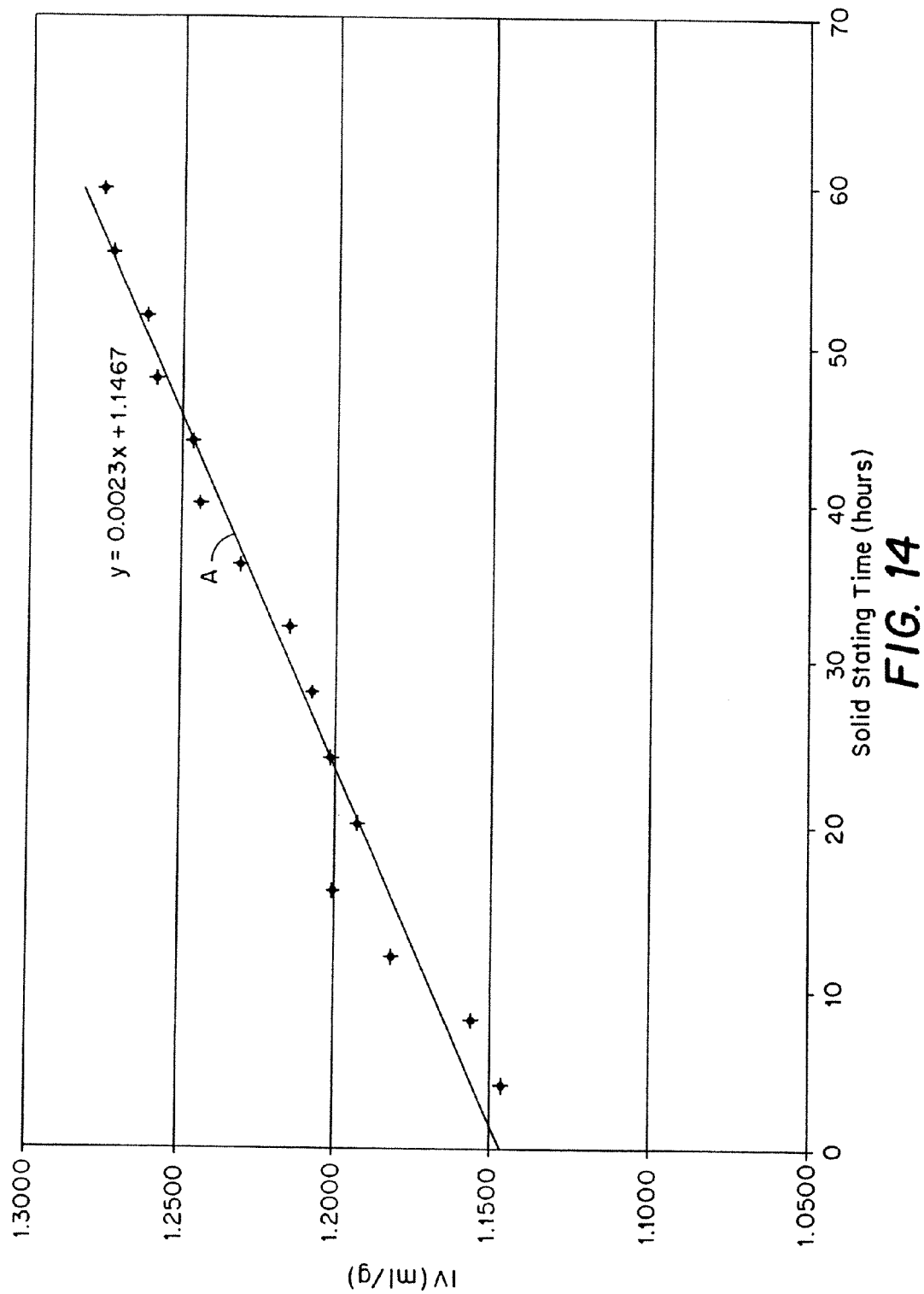
FIG. 14 is a graph of intrinsic viscosity (ordinate) versus solid-stating time in hours (abscissa) for various samples of MXD-6.

FIG. 14 and Table 2 below show the change in intrinsic viscosity (IV) for an MXD-6 sample A, taken at 4-hour intervals over the solid-stating time:

TABLE 2

| Time (hours) | A |
|---|---|
| 0 | 1.1418 |
| 4 | 1.1463 |
| 8 | 1.1564 |
| 12 | 1.1822 |
| 16 | 1.2010 |
| 20 | 1.1939 |
| 24 | 1.2023 |

TABLE 2-continued

| Time (hours) | A |
|---|---|
| 28 | 1.2085 |
| 32 | 1.2152 |
| 36 | 1.2315 |
| 40 | 1.2447 |
| 44 | 1.2473 |
| 48 | 1.2588 |
| 52 | 1.2621 |
| 56 | 1.2737 |
| 60 | 1.2772 |

FIG. 14 shows the results of IV as a function of solid-stating time for a sample of MXD-6 6007 which has been solid-stated at 10 torr vacuum and 350° F. (177° C.) for a time from 0 to 60 hours. The IV increased at a rate of 0.0023 dl/g per hour. The sample taken at 48 hours of processing time, combined with cobalt, has the superior scavenging rate illustrated in FIGS. 5-7.

Example 2

The second can of polymer from Example 1 is extrusion compounded with the metal compound. The polymer pellets are compounded with 2500 ppm cobalt neodecanoate pastilles (The Shepherd Chemical Co., Cincinnati, Ohio, cat. no. 03676400), stranded, chilled under water and then chopped into pellets. This material is then placed back in the 1-cubic foot reactor and processed at 250° F. (120° C.) and 10 torr vacuum with agitation for 12-16 hours. This step is required to dry and crystallize the material to enhance the injection molding process. Wet amorphous material will not form proper layers and will nucleate the adjacent layers of PET to form haze (nontransparent). This material is then processed into preforms and bottles the same as in Example 1. Filled bottles were tested on the Orbisphere and exhibited substantially the same oxygen performance as Example 1.

Example 3

In this example, MXD-6 6007 (Mitsubishi Chemicals, Japan) is substituted for the EMS 5227 in Example 1. Since the MXD-6 6007 is crystalline as received, the initial lower temperature drying process was not necessary. The polymer was processed at 350° F. (177° C.) and 10 torr for the entire 48 hours. All 55 lbs (the standard weight of a bag of MXD-6) was loaded into the reactor. The resulting solid-stated polymer filled both of the 25 lb cans (with about ½ of a 5-quart can left over). One can (25 lbs) of this material was then tumbled with 2500 ppm of ground cobalt neodecanoate pastilles (The Shepherd Chemical Co. No. 03676400) and then processed into preforms and bottles as described in Example 1. Filled bottles were tested on the Orbisphere and exhibited substantially the same oxygen performance as Examples 1 and 2.

Example 4

This is the same as Example 3 except the second can of solid-stated MXD-6 from Example 3 was extrusion compounded as in the process of Example 2. Bottles tested by the Orbisphere method exhibited the same excellent performance as Examples 1-3.

Example 5

In this example, meta (m)-xylenediamine (MXDA), isophthalic acid and adipic acid are copolymerized in solution, with water catalyzing the polymerization reaction, and cobalt neodecanoate is combined therewith as the metal. Sodium hypophosphite is added later in the reaction to increase the molecular weight (see WO92/02584 to Eastman Chemical). The resulting copolymer (with dispersed cobalt) has an IV of about 0.88 (60/40 phenol/1,1,2,3-tetrachloro-ethane solvent); it is then granulated and solid-stated as 350° F. (177° C.) for 48 hours to raise the molecular weight (IV=0.99).

More specifically, 656 g of MXDA (CAS no. 1477-55-0), 113.6 g of isophthalic acid (CAS no. 121-91-5), 604 g adipic acid (CAS no. 124-04-9), 3 grams cobalt neodecanoate (CAS no. 27253-31-2), and 1000 g of water are mixed in a 4-liter glass 2-neck 2-piece reaction vessel. The reaction chamber is placed in a mantle and the mantle temperature is raised to 400° F. (205° C.) with paddle agitation at 50 RPM (revolutions per minute) under an 8.5 psi (0.586 bars) nitrogen blanket. A small stream of the nitrogen is split off of the top to remove water and any volatile byproducts. After one hour the mantle temperature is raised to 500° F. (260° C.). After 2½ hours the temperature is raised to 575° F. (300° C.). After 30 minutes the pressure is dropped to 6 psi (0.414 bars). After 30 minutes the pressure is dropped to 4 psi (0.276 bars). After 30 minutes the pressure is dropped to 1 psi (0.0689 bars) and 6 grams of sodium hypophosphite powder (CAS no. 123333-67-5), is dissolved in 20 cc (cubic centimeters) of water and then injected into the reaction. The reaction is continued until the torque on the agitator reaches 500 in-oz (36,000 cm/g) at 50 RPM. Then the heat is removed and the agitation is shut off. The sample is allowed to cool to room temperature under 6 psi (0.414 bars) of nitrogen.

The polymer has an IV of about 0.80 dl/g (60/40 phenol/1,1,2,3-tetrachloro-ethane solvent). The IV is increased by solid-stating as described below.

The polymer is cut off of the paddle with a band saw and is then granulated to a medium texture with a high level of fines using a model Gran 220 bench grinder (Dynisco/Kayeness, of Morgantown, Pa.) with a 10 mm screen. The granulated polymer is then spread in a Pyrex oven pan and solid-stated in a vacuum oven at 350° F. (177° C.) at 1 torr pressure for 48 hours.

The IV of the solid-stated polymer is about 1.2, and has a melt index in the range of 15-35 grams per 10 minutes in the 50-100 ppm moisture range (ASTM #D1238-89 with a 2.16 kg total weight and a 0.0825 inch (2.0955 mm) diameter orifice at 275° C.).

The solid-stated scavenging polymer is then fed into a sequential multi-layer injection molding apparatus to produce 3M/5L performs (as per FIGS. 1-4) having inner and outer layers of virgin PET (Shell 8006, 0.81 IV nominal, 2 molar percentage isophthalic acid copolymer, available from Shell Oil Co., Houston, Tex., USA), a core layer of post-consumer PET (IV=0.74 dl/g), and inner and outer intermediate layers of the scavenging polymer.

The preforms are blown into 500 ml bottles and subjected to the Orbisphere test (same as Example 1). The results show an initial oxygen concentration in the fluid after 24 hours of around 100 ppb, dropping to under 40 ppb within 4 days, down under 20 ppb within 1 week and remaining under 20 ppb, for a period of six months (26 weeks).

Example 6

In this example, an aromatic ester alpha-hydrogen carbonyl is the scavenging polymer. The aromatic ester polymer is prepared from bisphenol A diacetate and suberic acid in accordance with the process described below and illustrated in FIG. 16.

Figure 16:
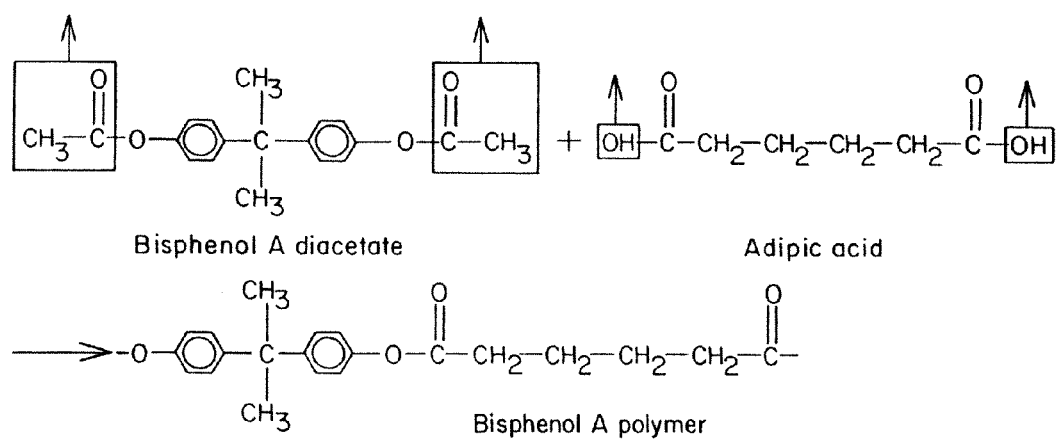
FIG. 16 shows a method of making an aromatic ester oxygen-scavenging polymer from bisphenol A diacetate and adipic acid.

FIG. 16 shows the condensation of bisphenol-A diacetate and adipic acid to make a polymer having two alpha-hydrogen carbonyl groups, two esters, one aromatic backbone structure (with two rings), and a 4-carbon chain aliphatic group. This polymer has relatively high $T_g$ of 91° C. A modified polymer made with suberic acid (as opposed to adipic acid) has a lower $T_g$ of 79° C., which is in the preferred range for use with PET orientation temperatures.

The following process may be used to prepare a polymer from bisphenol A diacetate and suberic acid (see for example Preparative Methods Of Polymer Chemistry, 2nd Edition, Sorensen, Campbell, page 149):

In a first step, diacetate of bisphenol A is prepared by dissolving 11 g (grams) of bisphenol A in a solution of 9 g (0.22 mole) sodium hydroxide in 45 ml water in a 250 ml Erlenmeyer flask. The mixture is cooled in an ice bath and a small quantity of ice is added to the flask. Then, 22.4 g (0.22 mole) acetic anhydride is added and the flask is shaken vigorously in an ice bath for 10 minutes. The white solid is filtered, washed with water, and recrystallized from ethanol.

A mixture of bisphenol A diacetate 312 g (1 mole), suberic acid 174 g (1 mole), 0.60 g toluenenesulfonic acid (monohydrate) is placed in a 2-liter, 2-neck flask with agitator. The flask is purged with nitrogen while agitating for 20 minutes. The temperature is then raised to 180° C. while agitating and purging with nitrogen at ambient pressure. Acetic acid distills as the temperature is slowly raised from 180° C. to 250° C. while the pressure is slowly reduced to about 1 torr. The melt is maintained at 250° C. and 1 torr for 1 hour.

When using an aliphatic acid, it may be advantageous that pyridine be substituted for sodium hydroxide and water in the above reaction.

The polymer may be extrusion compounded with cobalt neodecanoate and solid-stated, as follows. Thirty pounds of the aromatic ester alpha-hydrogen carbonyl polymer is compounded on an extruder with 2500 ppm cobalt neodecanoate, stranded and cut into pellets. The extruder has a 1½ in. diameter and a 36:1 L/D ratio and a compression ratio of 3:1. The entire transition zone is of a barrier design with a 0.010 in. clearance between the screw and barrel. The output of the extruder is directed into a stranding dye; molten strands are then pulled through a water bath for cooling, and are finally chopped into ¼ in. long by ⅛ in. diameter pellets. The pellets are then placed in a 1-cubic foot jacketed, agitated, vacuum reactor (VB-001 Double Plentary Mixer, Ross, Hauppauge, N.Y.) and heated to 250° F. (120° C.) for 3 hours under 10 torr vacuum with agitation to dry and crystallize the pellets. The temperature is then raised to 470° F. (240° C.) at a pressure of 10 ton-, solid-stating the pellets for an additional 36 hours. The pellets are then cooled and loaded into a sequential multi-layer injection molding apparatus for making 3M/5L performs (same as Example 1), and blown into bottles (same as Example 1). The bottles are expected to have an oxygen performance similar to Example 1.

Example 7

In this example, the cobalt is added to MXD-6 6007 in the solid-stating reactor (after the MXD-6 has been solid-stated). This method has several benefits over that described in Example 1.

55 lbs of MXD-6 is solid stated as described in Example 3, except the temperature is 205° C. and the pressure is 0.1 torr Table 3 shows the intrinsic viscosity as a function of solid-stating time, where the intrinsic viscosity has been determined with each of 60/40 phenol/1,1,2,3-tetrachloroethane as the solvent and m-cresol as the solvent.

TABLE 3

| Time (hours) | IV (60/40 phenol/1,1,2,3-tetrachloroethane solvent) | IV (m-cresol solvent) |
|---|---|---|
| 0 h | 1.154 | 1.689 |
| 8 h | 1.184 | 1.725 |
| 24 h | 1.245 | 1.776 |
| 48 h | 1.268 | 1.800 |
| 54 h | 1.347 | 1.867 |

Cobalt neodecanoate pastilles (not ground) are added at 2500 ppm to the solid-stated MXD-6 in the solid-stating reactor and the material is agitated under vacuum at 300° F. (150° C.) for 30 minutes. The material is cooled in the reactor for 1 hour and stored in a covered can sealed under ambient atmosphere.

This process can provide a more uniform cobalt coating on the surface of the MXD-6 pellets, resulting in better scavenging performance. There is no need to grind the cobalt neodecanoate pastilles. Also, because the prior method involved transferring the MXD-6 from the solid-stating reactor to a tumbling vessel for addition of cobalt, excess moisture could be extracted from the atmosphere by the polymer during such transfer; it would thus be beneficial to dry such mixture prior to injection molding. In contrast, by adding the cobalt directly to the MXD-6 in the solid-stating reactor, there is less need for a subsequent drying procedure.

Example 8

In this example, the oxygen-scavenging performance is compared for plaques made from either solid-stated, or non-solid-stated, polyamide having a cobalt neodecanoate concentration of 2500 ppm (500 ppm cobalt).

The solid stating is carried out as described in Example 1, for 48 hours. The plaques are tested according to the wet plaque test previously described under "Performance Tests".

Figure 15A:
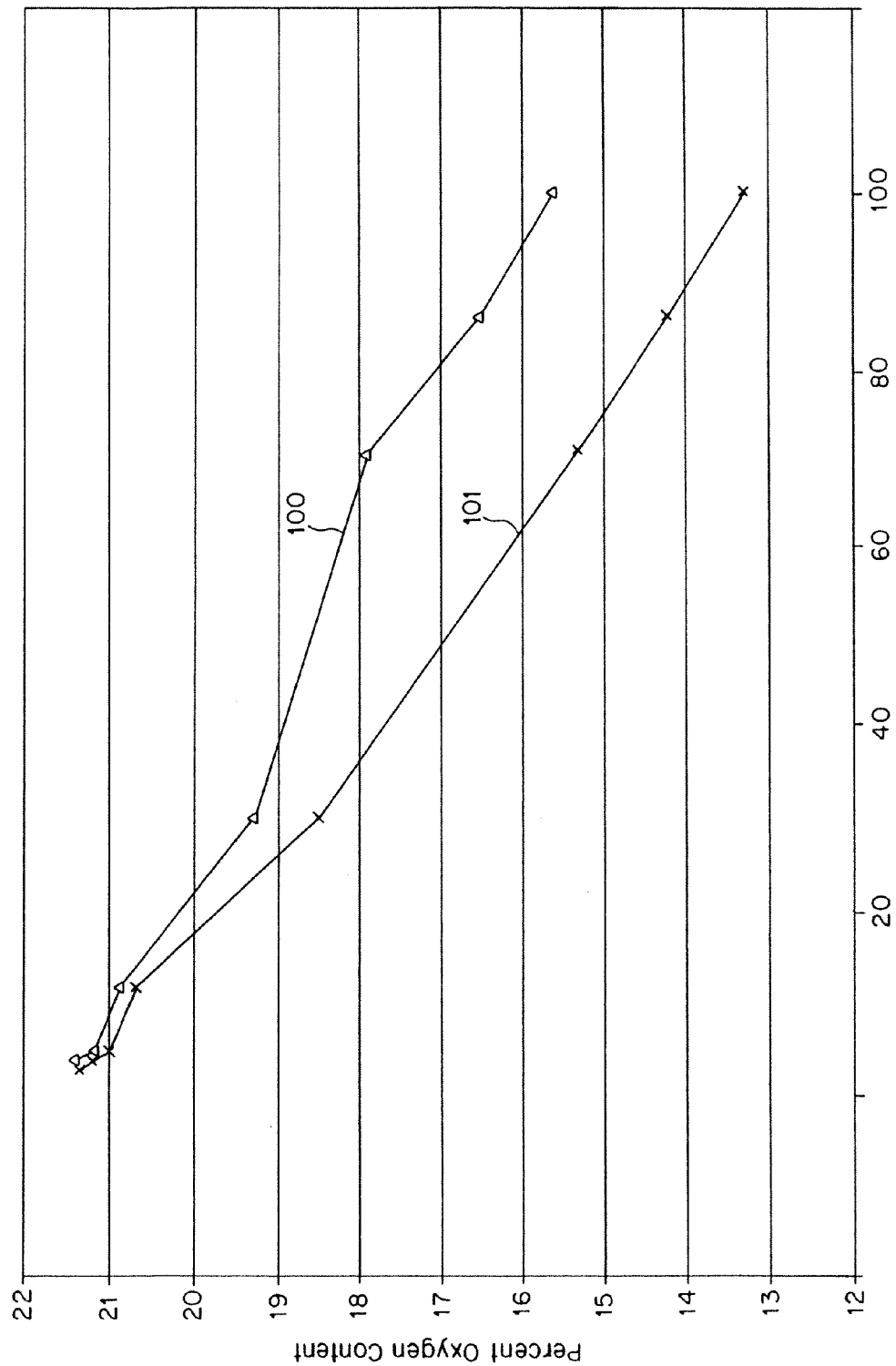
Figure 15B:
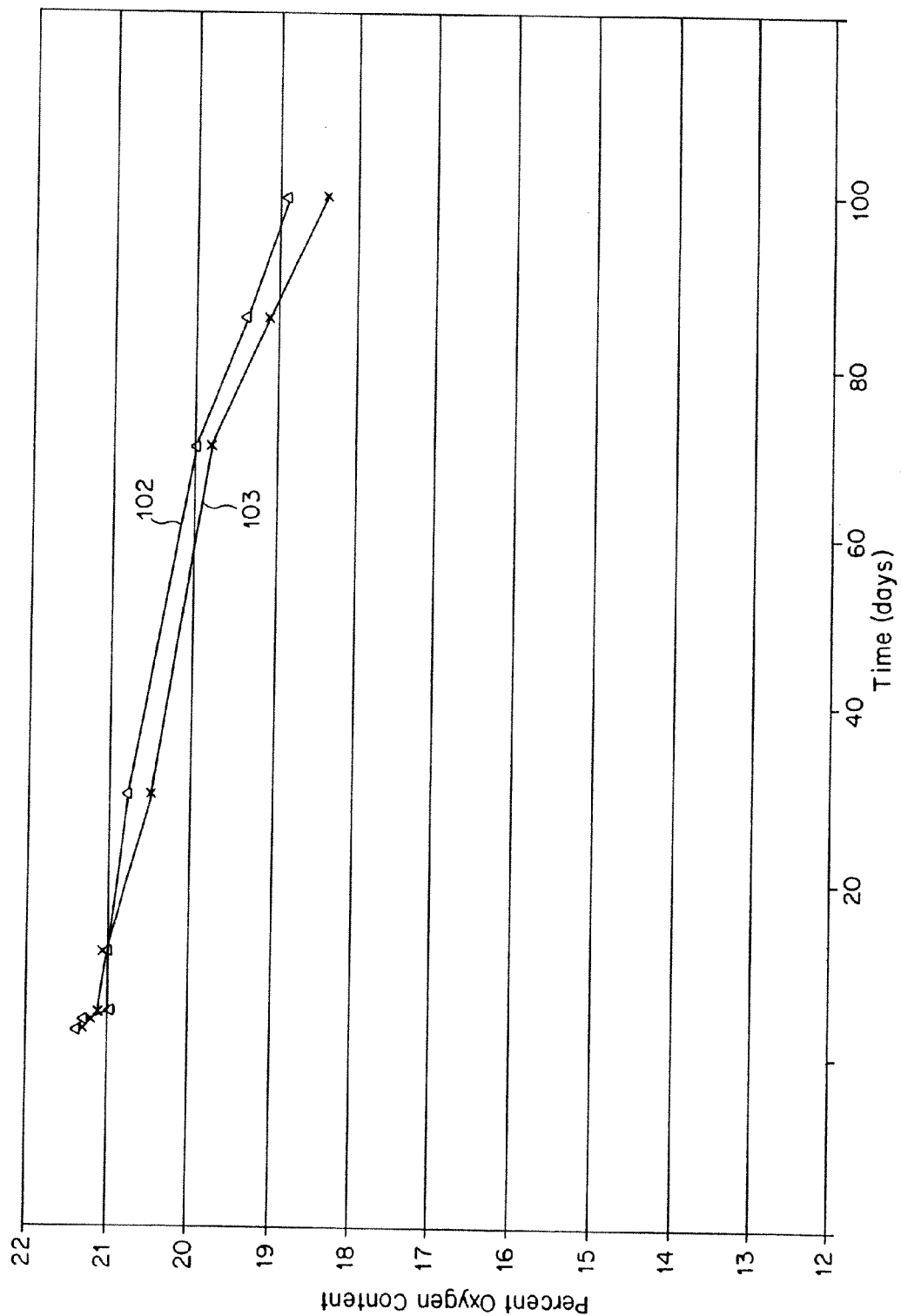
Figure 15D:
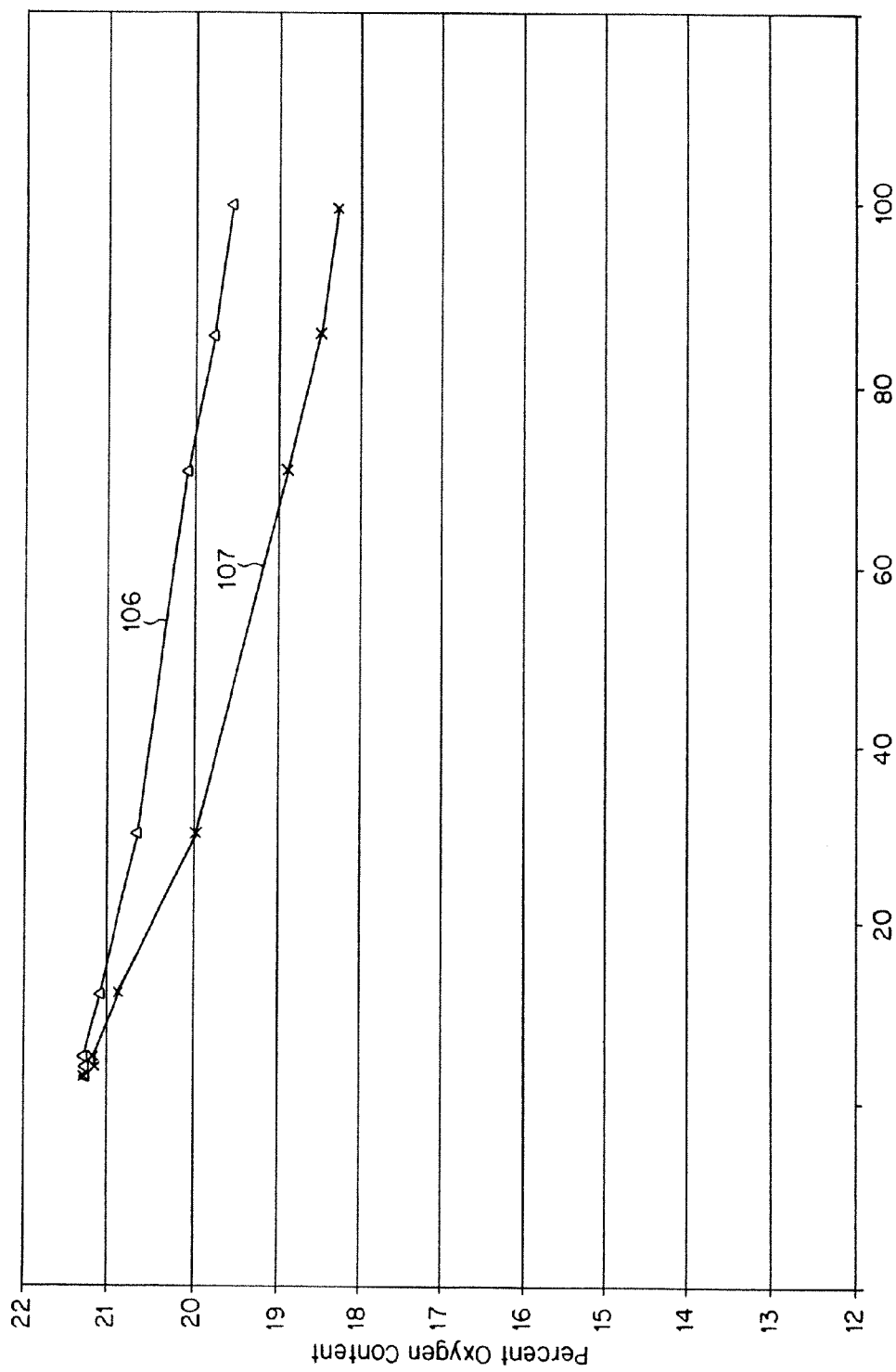

FIGS. 15A-15D illustrate the oxygen-scavenging performance (% oxygen content in the jar) for plaques of solid-stated and non-solid-stated polymers as a function of time in days. In FIG. 15A, the data for the non-solid-stated MXD-6 6007 is shown as line 100; the solid-stated plaque data is shown as line 101. In FIG. 15B, the data for the non-solid-stated MXD-6 6001 is shown as line 102; the solid-stated plaque data is shown as line 103. In FIG. 15C, the data for EMS non-solid-stated is shown as line 104; the solid-stated plaque data is shown as line 105. In FIG. 15D, the data for nylon 6 non-solid-stated is shown as line 106; the solid-stated plaque data is shown as line 107.

From FIGS. 15A-D it is seen that the solid-stated oxygen-scavenging polymers exhibit enhanced performance compared to the non-solid-stated scavenger. This enhanced performance is evidenced by the greater (more negative) slopes of the respective lower lines and the resulting lower levels of measured percent oxygen content over time.

Example 9

Material Distribution in Bottle

Table 4 below shows the effect of solid-stating time (8, 20 and 36 hours) on the distribution of scavenger material in the neck finish (flange 35 and above in FIG. 2), body (the cylindrical sidewall 46), and the neck (the shoulder portion 43 between the finish and body) in the 5-layer bottle embodiment. The third example in Table 4, solid stating for 36 hours, resulted in the greatest percentage of scavenger in the body (the thinnest wall portion of the container), providing the best scavenging performance.

TABLE 4

Barrier Distribution in Finish, Neck, and Body of Bottle

| | example | | |
|---|---|---|---|
| | 1 | 2 | 3 |
| hours of solid-stating 177° C., 3 torr | 8 | 20 | 36 |
| barrier layer % in body | 3.63 | 5.07 | 5.83 |
| IV | 0.971 | 1.16 | 1.25 |
| finish weight complete (g) | 6.725 | 6.725 | 6.725 |
| neck weight complete (g) | 4.755 | 4.755 | 4.755 |
| body weight complete (g) | 18.99 | 18.99 | 18.99 |
| end cap not used (g) | 2.96 | 2.96 | 2.96 |
| grams of barrier in finish | 0.934 | 0.722 | 0.716 |
| grams of barrier in neck | 0.483 | 0.388 | 0.382 |
| grams of barrier in body | 0.689 | 0.963 | 1.107 |
| total grams in neck + body | 1.172 | 1.351 | 1.49 |
| total grams in bottle | 2.106 | 2.073 | 2.206 |
| % of barrier in finish | 13.88 | 10.73 | 10.65 |
| % of barrier in neck | 10.15 | 8.152 | 8.04 |
| % of barrier in body | 3.63 | 5.07 | 5.83 |
| % of barrier in neck + body | 4.936 | 5.687 | 6.272 |
| % of barrier in bottle | 6.30 | 6.20 | 6.60 |

Example 10

Figure 17:
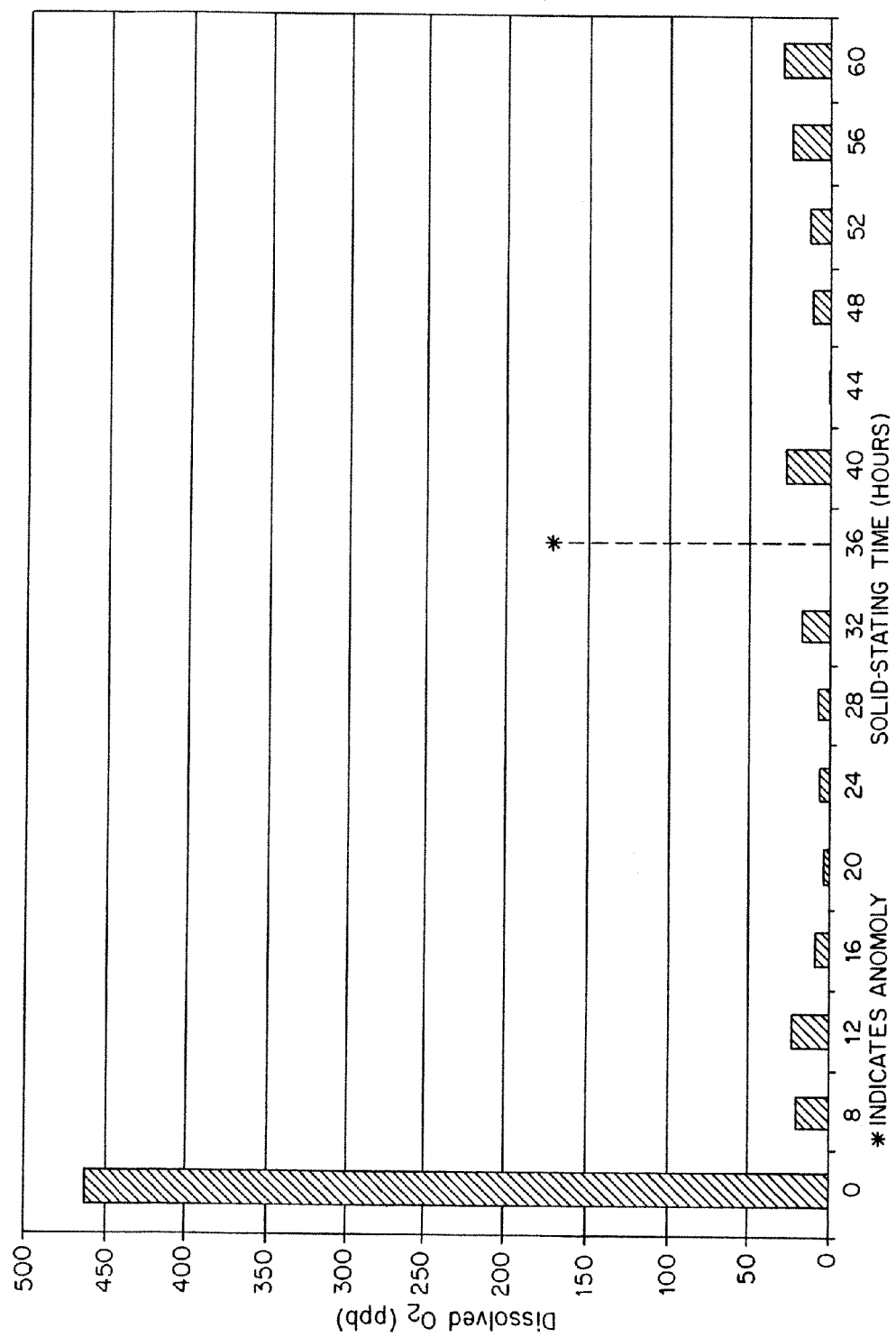
FIG. 17 is a bar graph of dissolved oxygen concentration after 9 weeks (ordinate) versus solid-stating time (abscissa) for containers including enhanced polyamide and cobalt and filled with tank water.

In this example, samples of the 5-layer bottle previously described were filled with tank water (100 ppb oxygen). The scavenger in the bottles was solid-stated at 350° F. (177° C.) for a period of time ranging from 0 h to 60 h. FIG. 17 illustrates the oxygen concentration of the water contained in each bottle. It can be seen that within the first 8 hours, there was a very sharp reduction in oxygen content. Thus, even without an extended solid-stating time, and before a substantial increase in IV has occurred, there is a remarkable increase in scavenging performance obtained by the solid-stating process of this invention.

Example 11

In this example, the effects on oxygen-scavenging performance are illustrated where the scavenging polymer, MXD-6 6007, is prepared by different methods and incorporated as two layers in the 5-layer bottle previously described. The results for both tap water and tank water are displayed in Tables 5A and 5B, after 3 weeks and 9 weeks, respectively.

The different methods are designated by column headings A-D as follows: "A" indicates that the scavenger comprises only MXD-6 6007 without any cobalt; "B" indicates that 2500 ppm cobalt neodeconoate as a powder (500 ppm cobalt) has been tumbled into the MXD-6 6007 at 150° C. for 30 minutes; "C" indicates that the same amount of cobalt has been added to the MXD-6 6007 but in the solid-stating vessel and tumbled; "D" indicates that the cobalt has been added as in "C" followed by an additional step of subjecting the polymer to a vacuum of 0.1 torr at 63° C.

The headings for each row are: "Air Dry," indicates that the polymer has been subjected to air-drying 130° C.; "Vac Dry" indicates that the polymer has been subjected to a to vacuum of 2.1 torr at a temperature of 150° C.; and "SS" indicates that the polymer has been solid-stated at 205° C. for 48 h at 0.1 torr.

The bottles are filled with either tap water ($O_2$ concentration ~8600 ppb) or tank water ($O_2$ concentration ~100 ppb). By three weeks, the oxygen concentration of the water is measured by the Orbisphere method and these results are tabulated in Table 5A; similarly the 9-week results are tabulated in Table 5B.

The data of Tables 5A-5B shows the advantageous effects of solid-stating in combination with the addition of cobalt to the polymer (row SS, column D). The improved oxygen-scavenging performance is especially noted for the tank water results where the dissolved oxygen content steadily decreases in each of "B" to "C" and "D" (row SS).

TABLE 5A

OXYGEN CONCENTRATION AFTER 3 WEEKS (ppb)

| | TapWater - 8600 ppb | | | | TankWater - 100 ppb | | | |
|---|---|---|---|---|---|---|---|---|
| | A | B | C | D | A | B | C | D |
| Air Dry | 7100 | 7100 | 7100 | 7100 | 780 | 700 | 450 | 450 |
| Vac Dry | 6900 | 7000 | 7200 | 6600 | 560 | 450 | 380 | 240 |
| SS | 7000 | 4400 | 4900 | 4200 | 540 | 35 | 15 | 4 |

TABLE 5B

OXYGEN CONCENTRATION AFTER 9 WEEKS (ppb)

| | TapWater - 8600 ppb | | | | TankWater - 100 ppb | | | |
|---|---|---|---|---|---|---|---|---|
| | A | B | C | D | A | B | C | D |
| Air Dry | 6483 | 5677 | 5108 | 4705 | 1792 | 1457 | 840 | 980 |
| Vac Dry | 6498 | 5254 | 5418 | 4076 | 1162 | 867 | 686 | 550 |
| SS | 5985 | 973 | 1377 | 870 | 1222 | 21 | 19 | 1 |

Example 12

The following example illustrates a selection technique for the amount of metal in the enhanced oxygen scavenger.

The oxygen-scavenging performance of EMS FE5270 nylon (MXD-6 6007 solid stated at 193° C. for 16 hours under nitrogen) was studied at varying concentrations (0, 50, 100, 200, 300, 400, 500, 600, 700, 800, 900, 1000, 1500, and 2000 ppm) of cobalt (cobalt neodecanoate (CoNeo) concentration=cobalt concentration*5). Plaque samples (as previously described in the wet plaque test) for each concentration were prepared by heat-treating the resins in a 10 cubic foot vertical blender (ROSS V-10 Vertical blender) at 150° C. for 12 hours. Once the samples were cooled to room temperature, the appropriate amount of cobalt neodecanoate was added. Each sample was then tumbled in a metal paint can for about 30 minutes. To drive out any remaining moisture in the material, each sample was then redried in a vacuum drier at 62° C. for about 24 hours.

To compare wet and dry conditions, half of the plaque samples for each concentration were placed in jars according to the wet plaque test previously described, and the other half were placed in jars according to a "dry plaque test" (same as wet plaque test but no water in the jars). Oxygen testing was done approximately twice per week for 54 days; the dry and wet results are listed in Tables 6A-6B respectively and illustrated in the bar graphs of FIGS. 18-19 respectively.

Figure 18:
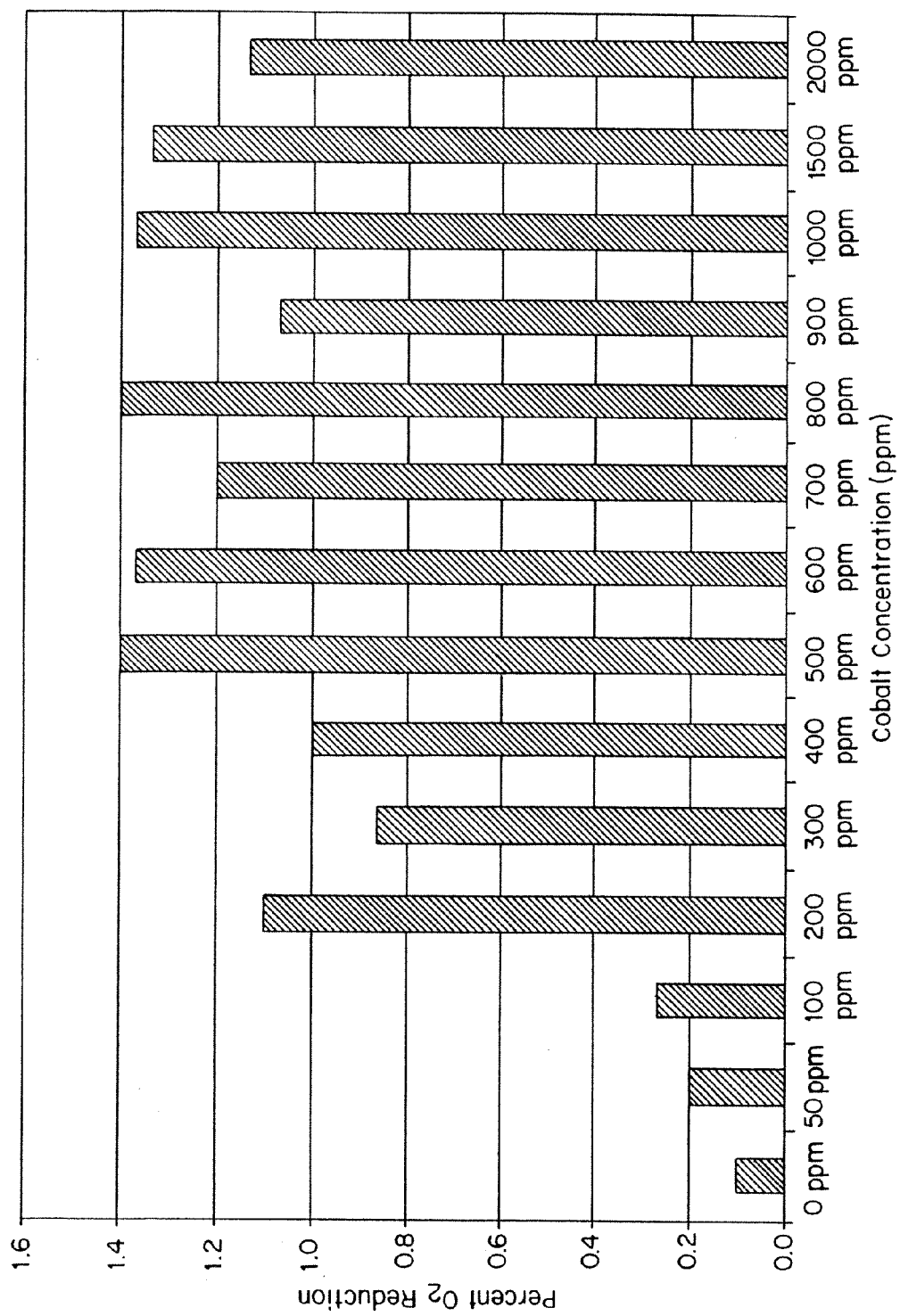
FIG. 18 is a bar graph of a percent oxygen reduction (ordinate) after 54 days by injection-molded plaque samples made from polyamide with various cobalt concentrations, under dry conditions.
Figure 19:
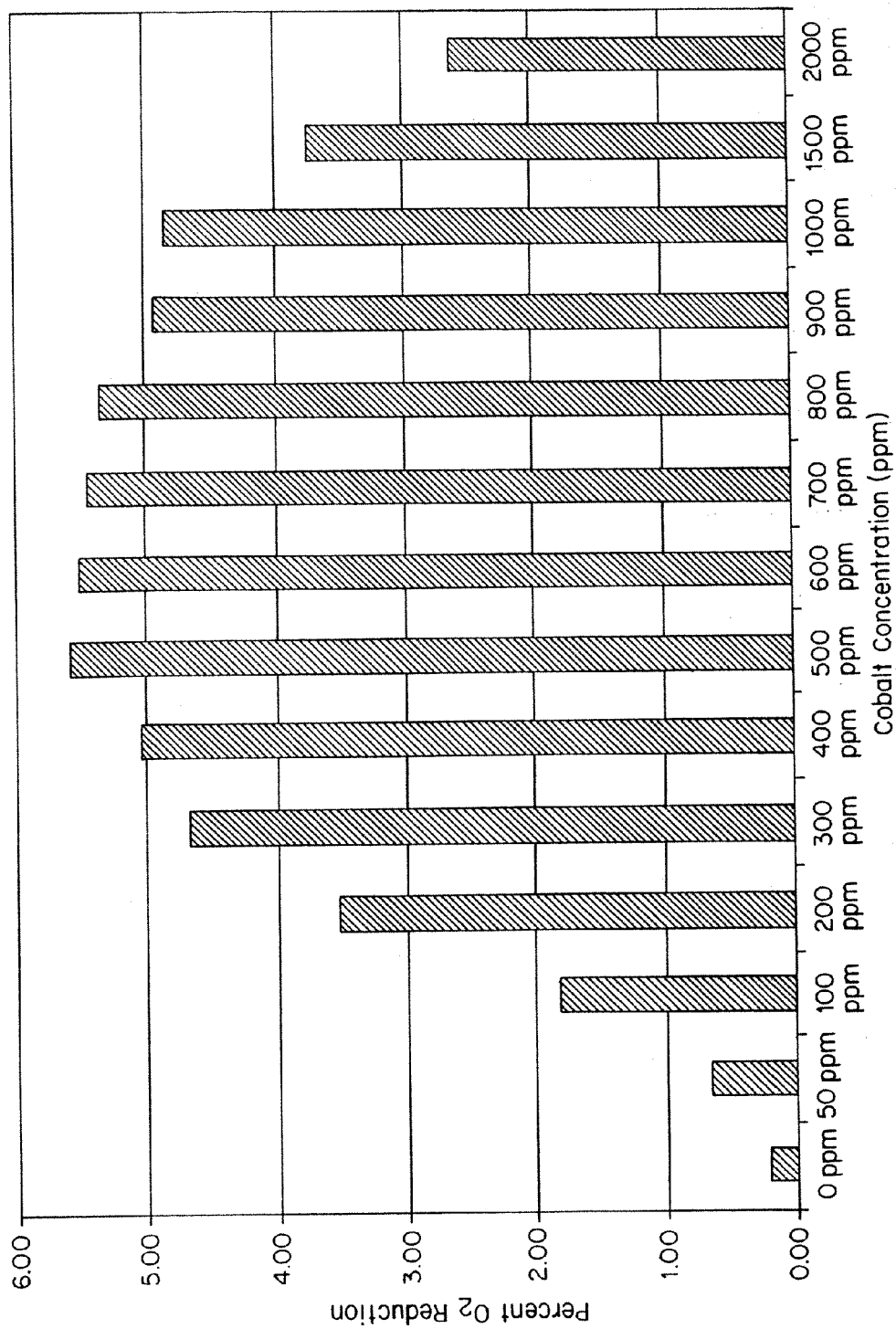
FIG. 19 is a bar graph of a percent oxygen reduction (ordinate) after 54 days by injection-molded plaque samples made from polyamide with various cobalt concentrations, under wet conditions.

As shown in FIGS. 18-19, the wet plaque test samples displayed a higher oxygen-scavenging performance than the dry plaque test samples. After 54 days, none of the dry samples displayed greater than a 1.6% oxygen reduction, whereas the oxygen content in some of the wet samples was reduced by amounts greater than 5%. For the wet samples, optimum performance occurred with a cobalt concentration of 500 ppm with a 5.57% total oxygen reduction. Each of the wet samples from 300 to 1000 ppm had close to or greater than 5% reduction.

Figure 21:
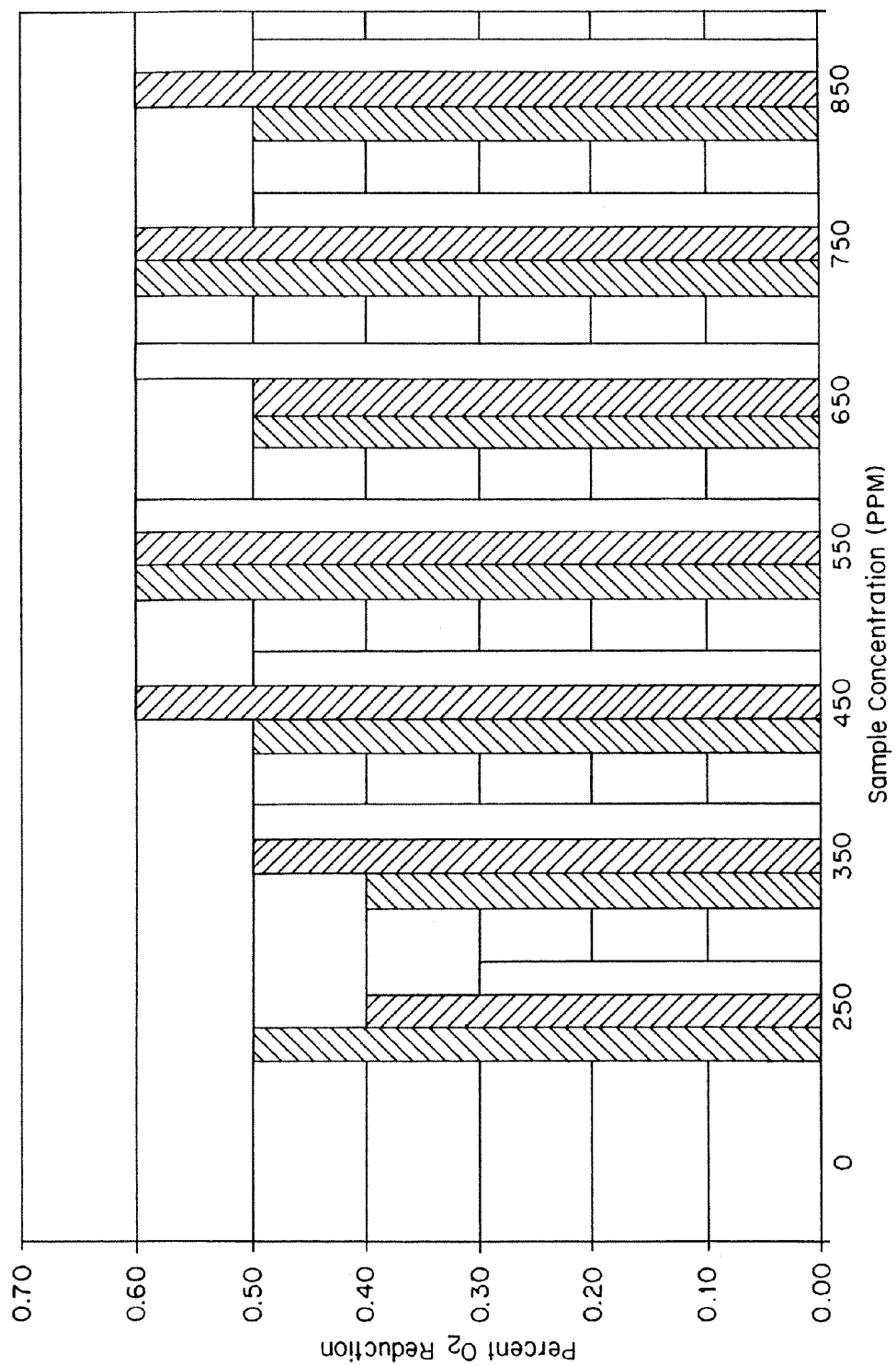
FIGS. 21-22 are similar bar graphs to FIGS. 18-19.
Figure 22:
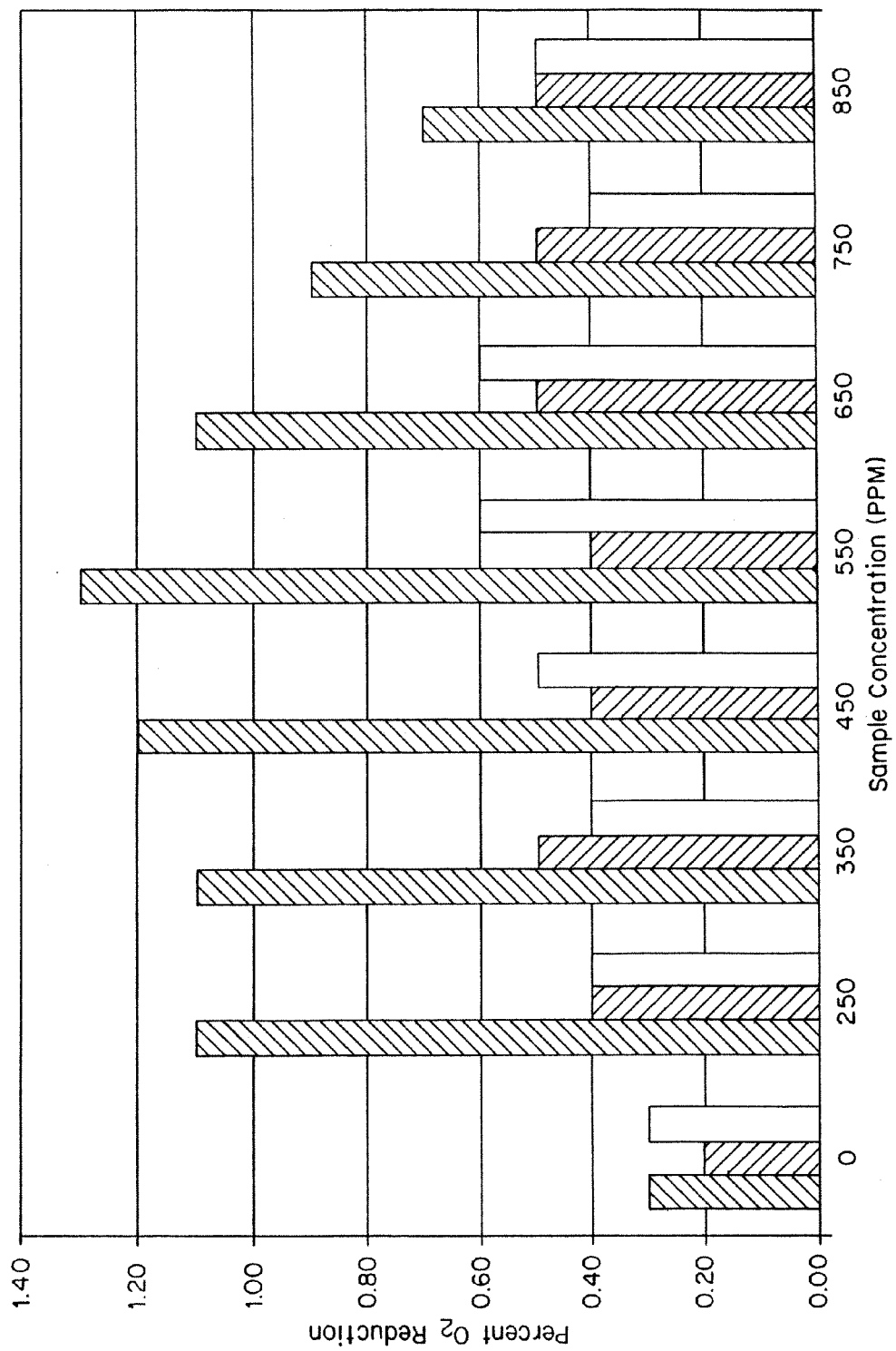

FIGS. 21-22 are bar graphs of percent oxygen reduction vs. sample concentration for dry and wet samples respectively, illustrating the effect of cobalt concentration (from 0 to 850 ppm cobalt based on the nylon) for three different processing techniques: solid-stated (dark shaded bars); vacuum dried (light shaded); and air dried (white bars). The dry samples (per the dry plaque test) showed similar percent $O_2$ reduction for all three processes, none greater than 0.60. In contrast, the wet samples (per the wet plaque test) from the solid-stated process showed a clearly superior result, both compared to the dry samples and compared to the other two processes. The air dried and vacuum dried samples were made from MXD-6 6007. The solid-stated samples were made from EMS nylon as previously described, except the resin was heat-treated in the blender for 11 hours and re-dried in the vacuum dryer at 62° C. for 4 hours.

TABLE 6A

Average Oxygen Content (%) Over 54 Days for Dry Plaque Test

| Sample (PPM) | 1 Day | 4 Day | 9 Day | 15 Day | 18 Day | 22 Day | 25 Day | 29 Day | 32 Day | 36 Day | 38 Day | 43 Day | 54 Day |
|---|---|---|---|---|---|---|---|---|---|---|---|---|---|
| 0 | 21.0 | 21.1 | 21.0 | 21.1 | 21.0 | 21.2 | 21.0 | 21.1 | 21.2 | 21.0 | 21.1 | 21.1 | 21.0 |
| 50 | 21.0 | 21.1 | 21.0 | 21.1 | 21.0 | 21.1 | 21.0 | 21.0 | 21.0 | 20.8 | 20.8 | 20.9 | 20.9 |
| 100 | 21.0 | 21.1 | 21.0 | 21.0 | 20.3 | 21.0 | 21.0 | 21.0 | 21.0 | 20.8 | 20.8 | 20.9 | 20.8 |
| 200 | 20.9 | 20.9 | 20.7 | 20.6 | 20.5 | 20.5 | 20.4 | 20.4 | 20.3 | 20.1 | 20.1 | 20.1 | 20.0 |
| 300 | 20.7 | 20.9 | 20.6 | 20.4 | 20.6 | 20.5 | 20.5 | 20.5 | 20.5 | 20.4 | 20.2 | 20.3 | 20.2 |
| 400 | 20.8 | 20.8 | 20.7 | 20.4 | 20.6 | 20.4 | 20.5 | 20.4 | 20.4 | 20.2 | 20.1 | 20.2 | 20.1 |
| 500 | 20.8 | 20.9 | 20.6 | 20.4 | 20.5 | 20.2 | 20.3 | 20.2 | 20.1 | 20.0 | 19.8 | 19.9 | 19.7 |
| 600 | 20.8 | 20.8 | 20.6 | 20.4 | 20.4 | 20.2 | 20.2 | 20.1 | 20.1 | 19.9 | 19.8 | 19.8 | 19.7 |
| 700 | 20.8 | 20.8 | 20.6 | 20.5 | 20.5 | 20.2 | 20.4 | 20.3 | 20.3 | 20.0 | 19.9 | 20.1 | 19.9 |
| 800 | 20.8 | 20.8 | 20.6 | 20.4 | 20.4 | 20.2 | 20.2 | 20.2 | 20.1 | 19.8 | 19.8 | 19.8 | 19.7 |
| 900 | 20.8 | 20.8 | 20.7 | 20.6 | 20.6 | 20.4 | 20.4 | 20.4 | 20.3 | 20.1 | 20.1 | 20.1 | 20.0 |
| 1000 | 20.8 | 20.8 | 20.6 | 20.4 | 20.4 | 20.2 | 20.2 | 20.1 | 20.1 | 19.9 | 19.8 | 19.8 | 19.7 |
| 1500 | 20.8 | 20.7 | 20.6 | 20.4 | 20.4 | 20.2 | 20.1 | 20.1 | 20.2 | 20.0 | 19.8 | 19.9 | 19.8 |
| 2000 | 20.8 | 20.9 | 20.8 | 20.5 | 20.6 | 20.4 | 20.4 | 20.3 | 20.4 | 20.1 | 20.0 | 20.0 | 20.0 |

TABLE 6B

Average Oxygen Content (%) Over 54 Days for Wet Plaque Test

| Sample (PPM) | 1 Day | 4 Day | 9 Day | 15 Day | 18 Day | 22 Day | 25 Day | 29 Day | 32 Day | 36 Day | 38 Day | 43 Day | 54 Day |
|---|---|---|---|---|---|---|---|---|---|---|---|---|---|
| 0 | 20.8 | 20.9 | 20.9 | 20.8 | 20.9 | 20.9 | 20.7 | 20.9 | 20.9 | 20.7 | 20.7 | 20.7 | 20.9 |
| 50 | 20.8 | 20.8 | 20.8 | 20.6 | 20.7 | 20.6 | 20.6 | 20.6 | 20.6 | 20.4 | 20.3 | 20.4 | 20.4 |
| 100 | 20.7 | 20.6 | 20.5 | 20.3 | 20.2 | 20.1 | 20.0 | 19.9 | 19.9 | 19.5 | 19.6 | 19.4 | 19.3 |
| 200 | 20.4 | 20.3 | 19.9 | 19.7 | 19.6 | 19.2 | 19.0 | 18.8 | 18.6 | 18.1 | 18.1 | 17.9 | 17.5 |
| 300 | 20.3 | 20.0 | 19.6 | 19.3 | 19.1 | 18.6 | 18.3 | 18.0 | 17.7 | 17.2 | 17.2 | 17.0 | 16.4 |
| 400 | 20.4 | 20.0 | 19.7 | 19.3 | 19.1 | 18.5 | 18.2 | 17.8 | 17.6 | 17.0 | 17.0 | 16.7 | 16.1 |
| 500 | 20.5 | 20.3 | 20.0 | 19.5 | 18.7 | 18.1 | 17.9 | 17.4 | 17.1 | 16.5 | 16.4 | 16.1 | 15.5 |
| 600 | 20.7 | 20.5 | 20.3 | 19.8 | 19.1 | 18.4 | 18.1 | 17.7 | 17.4 | 16.9 | 16.6 | 16.2 | 15.6 |
| 700 | 20.7 | 20.5 | 20.3 | 20.0 | 19.3 | 18.6 | 18.3 | 17.8 | 17.5 | 16.8 | 16.7 | 16.3 | 15.7 |
| 800 | 20.7 | 20.4 | 20.3 | 19.8 | 19.2 | 18.5 | 18.2 | 17.7 | 17.4 | 16.8 | 16.7 | 16.4 | 15.8 |
| 900 | 20.6 | 20.6 | 20.6 | 20.0 | 20.4 | 19.8 | 19.0 | 18.6 | 18.1 | 17.5 | 17.3 | 16.8 | 16.2 |
| 1000 | 20.6 | 20.6 | 20.5 | 20.2 | 20.2 | 19.6 | 19.3 | 18.6 | 18.5 | 17.9 | 17.5 | 17.1 | 16.3 |
| 1500 | 20.7 | 20.6 | 20.6 | 20.3 | 20.4 | 20.0 | 19.9 | 19.6 | 19.4 | 18.8 | 18.7 | 18.3 | 17.4 |
| 2000 | 20.7 | 20.5 | 20.6 | 20.3 | 20.3 | 20.2 | 19.7 | 19.8 | 19.7 | 19.2 | 19.0 | 18.9 | 18.5 |

Example 13

The following example further illustrates the effect of increased weight percentages of the scavenger layers on oxygen-scavenging performance in one embodiment.

MXD-6 was treated as in Example 3; 2500 ppm of cobalt neodecanoate was added. The previously described 5-layer bottles were made with varying weight percentages of the combined two scavenging layers (1%, 2%, 4%, 6%, 8%, 10%). Oxygen-scavenging, as measured by the Orbisphere method, was tested for each of tap water (8600 ppb) and tank water (100 ppb). The results are listed in Table 7.

From Table 7, it can be seen that scavenging performance generally decreases as the amount of the scavenging layer decreases. Optimal amounts of scavenger in this embodiment range from 6% to 10%.

TABLE 7

% Oxygen Content (ppb) Over 91 Days

| Wt % of MXD-6 | 1 wk slope | 2 wk slope | 3 wk slope | overall slope | 1 day | 7 days | 14 days | 21 days | 35 days | 63 days | 91 days |
|---|---|---|---|---|---|---|---|---|---|---|---|
| 10% (tap) | 232 | 51 | −33 | −56 | 6575 | 7881 | 7463 | 6320 | 6062 | 4151 | 2571 |
| 10% (tank) | −13 | −6 | −4 | 0 | 87 | 11 | 9 | 2 | 1 | 34 | 8 |
| 8% (tap) | −96 | 50 | 31 | −30 | 7161 | 6586 | 7723 | 7370 | 6308 | 5272 | 4530 |
| 8% (tank) | −11 | −4 | −2 | 0 | 68 | 3 | 1 | 0 | 6 | 4 | 1 |
| 6% (tap) | −141 | 50 | 35 | −33 | 7175 | 6328 | 7759 | 7423 | 6323 | 5287 | 4144 |
| 6% (tank) | −10 | −3 | −2 | 0 | 73 | 13 | 20 | 11 | 3 | 39 | 55 |
| 4% (tap) | −75 | 64 | 48 | −28 | 7142 | 6694 | 7873 | 7712 | 6785 | 5722 | 4658 |
| 4% (tank) | −3 | 9 | 8 | 4 | 87 | 71 | 190 | 202 | 294 | 420 | 350 |
| 2% (tap) | −71 | 74 | 59 | −12 | 7183 | 6755 | 7947 | 7865 | 6971 | 6772 | 5946 |
| 2% (tank) | 14 | 23 | 22 | 18 | 88 | 173 | 373 | 500 | 760 | 1275 | 1650 |
| 1% (tap) | 185 | 94 | 47 | −25 | 6900 | 7826 | 7782 | 7504 | 6737 | 5475 | 5097 |
| 1% (tank) | 34 | 29 | 29 | 24 | 195 | 392 | 562 | 763 | 1147 | 1801 | 2278 |

Other Packages (e.g., Juice)

Other applications may allow the use of lesser amounts of the enhanced oxygen-scavenger of this invention and still provide adequate protection. For example, fruit juice is less oxygen sensitive than beer and thus a lower amount of scavenger may be sufficient. Also, the lower amount may not actually reduce the enclosed oxygen content over time, but simply maintain it at or below some specified upper limit. Thus, the enhanced scavenger is capable of reducing the rate at which the oxygen content of the container is increased.

In one embodiment, a 5-layer bottle is prepared as previously described where the oxygen-scavenging layer thickness is selected such that the oxygen content of an aqueous liquid is maintained at less than 9,000 ppb for a designated time period (e.g., 3 months, preferably 6 months), and more preferably less than 8,000 ppb. The bottle may have an initial oxygen content of 5,000-6,000 ppb, i.e. the oxygen content of the package when first sealed.

In one example, a 5-layer bottle for fruit juice may have two intermediate scavenger layers at a total weight percent of 3.5% scavenger in the bottle. During hot filling at 82° C., the headspace is initally flushed with steam to reduce the initial oxygen content of the bottle. This bottle can maintain the oxygen content at an acceptable level for at least 3 months. The lower weight percentage of enhanced scavenger is both cost-effective and provides better delamination resistance and a longer shelf life than prior PET/EVOH bottles.

Other variations of the heat treatment may also produce compositions with increased scavenging performance but which may only reduce the rate at which the oxygen content in the package is increased, rather than providing an actual reduction in oxygen content.

While there have been shown and described several embodiments of the present invention, it will be obvious to those skilled in the art that various changes and modifications may be made without departing from the scope of the invention as defined by the appending claims.

The invention claimed is:

1. A composition comprising:
an oxygen scavenging composition comprising a solid-stated polyamide and a transition metal in an amount of at least 200 ppm in the polyamide, the solid-stated polyamide formed by heat treatment at a temperature above the glass transition temperature and below the melting temperature of the polyamide while under a low oxygen content atmosphere and in the presence of the metal or the metal being added to the polyamide after being solid-stated, and having an oxygen scavenging performance greater by a factor of at least 1.3 as compared to a composition of the transition metal and non solid-stated polyamide.

2. The composition of claim 1, wherein the composition comprises 200 to 2000 ppm of the transition metal.

3. The composition of claim 2, wherein the composition comprises 300 to 1000 ppm of the transition metal.

4. The composition of claim 1, wherein the polyamide is selected from an aromatic polyamide, an aliphatic polyamide, nylon, an MXD polyamide and a xyliene-substituted polyamide.

5. The composition of claim 4, wherein the transition metal is selected from a cobalt compound, cobalt carboxylate and cobalt neodecorate.

6. The composition of claim 1, wherein the polyamide comprises an MXD polyamide and the comprises cobalt carboxylate.

7. The composition of claim 1, wherein the oxygen scavenging performance is greater by a factor of at least 2.

8. The composition of claim 1, wherein the oxygen scavenging performance is greater by a factor of at least 4.

9. A package having a wall, the wall including an internal layer comprising the oxygen-scavenging composition of claim 1, wherein the package when filled with an aqueous liquid having an oxygen concentration of 9000 ppb or less and sealed, removes dissolved oxygen from the liquid.

10. The package of claim 9, wherein the package maintains the oxygen content of the liquid below 200 ppb for at least 3 months.

11. The package of claim 9, maintains the oxygen content of the liquid below 100 ppb for at least 3 months.

12. The package of claim 9, wherein the package reduces the oxygen content of the liquid at a rate of at least 50 ppb/day.

13. The package of claim 9, wherein the package can be stored unfilled in an ambient atmosphere containing 21% oxygen for at least 3 months prior to said filling with an aqueous liquid.

14. The package of claim 9, wherein the wall comprises one or more internal layers of the oxygen-scavenging composition between one or more layers of aromatic polyester polymers.

15. The package of claim 9, wherein the wall includes at least one layer of the oxygen-scavenging composition between polyethylene terephthalate layers.

16. The package of claim 9, wherein the wall of the package is substantially transparent and biaxially-oriented.

17. The package of claim 9, wherein the package is a substantially transparent and biaxally-oriented multilayer plastic bottle.

18. The package of claim 17, wherein the bottle includes at least one internal layer of the oxygen-scavenging composition between layers of aromatic polyester polymers.

19. The package of claim 18, wherein the package is filled with a food or beverage product.

20. The package of claim 18, wherein the product is selected from a tomato-based food product, beer and juice.

21. The package of claim 18, wherein the oxygen-scavenging composition comprises no more than 10% of the weight of the package.

22. A plastic package comprising:
at least one internal layer comprising an oxygen-scavenging composition comprising a solid-stated polyamide and a transition metal in an amount of at least 200 ppm in the polyamide,
the solid-stated polyamide formed by heat treatment at a temperature above the glass transition temperature and below the melting temperature of the polyamide while under a low oxygen content atmosphere and in the presence of the metal or the metal being added to the polyamide after being solid stated, and
the composition having an oxygen scavenging performance greater by a factor of at least 1.3 as compared to a composition of the transition metal and non solid-stated polyamide.

23. The package of claim 22, wherein the package is stored unfilled in an ambient atmosphere for at least 3 months prior to filling with an aqueous liquid.

24. The package of claim 23, wherein the package is filled with an aqueous liquid having an oxygen concentration of 200 ppb or less and sealed, and the sealed container reducing and maintaining the oxygen concentration of the liquid below 200 ppb for 32 weeks.

25. the package of claim 24, the package having a substantially transparent, biaxially-oriented multi-layer wall including the at least one internal layer of the oxygen-scavenging composition and one or more layers of polyester.

26. The package of claim 24, wherein the aqueous liquid comprises beer, juice or a tomato-based food product.

27. A plastic package comprising:
a package having at least one internal layer comprising an oxygen scavenging composition comprising a solid-stated polyamide and a transition metal in an amount of at least 200 ppm in the polyamide, and
the package being filled with an aqueous liquid having an oxygen concentration of 100 ppb or less and sealed, the sealed package reducing and maintaining the oxygen concentration of the liquid below 100 ppb for 32 weeks; and
the solid-stated polyamide formed by heat treatment at a temperature above the glass transition temperature and below the melting temperature of the polyamide while under a low oxygen content atmosphere and in the presence of the metal or the metal being added to the polyamide after being solid stated, and
the composition having an oxygen scavenging performance greater by a factor of at least 1.3 as compared to a composition of the transition metal and non solid-stated polyamide.

* * * * *

UNITED STATES PATENT AND TRADEMARK OFFICE
CERTIFICATE OF CORRECTION

| | | |
|---|---|---|
| PATENT NO. | : 8,309,622 B2 | Page 1 of 1 |
| APPLICATION NO. | : 13/349069 | |
| DATED | : November 13, 2012 | |
| INVENTOR(S) | : Schmidt et al. | |

It is certified that error appears in the above-identified patent and that said Letters Patent is hereby corrected as shown below:

On the title page item (63) under Related US Application Data: should read

CON of Application No. 12/022,319 01/30/2008 PAT 8097662 which is a CON of 10/647,276 08/26/2003 ABN which is a CON of 10/268,933 10/11/2002 ABN which is a CON of 09/745,010 12/20/2000 ABN which is a CON of 09/241,598 02/02/1999 ABN which is a CIP of 09/236,498 01/26/1999 ABN which is a CIP of 09/169,439 10/09/1998 ABN and is a CIP of 09/018,217 02/03/1998 ABN Col. 39, line 20, claim 5:

Please change "neodecorate" to -- neodecanoate --

Col. 39, line 11, claim 6:

After "the" insert -- transition metal --

Col. 39, line 36, claim 11:

After "," insert -- wherein the package --

Signed and Sealed this
Twenty-first Day of May, 2013

Teresa Stanek Rea
*Acting Director of the United States Patent and Trademark Office*